(12) United States Patent
Van Zandwijk

(10) Patent No.: US 8,141,218 B2
(45) Date of Patent: Mar. 27, 2012

(54) METHOD FOR MANUFACTURING A DOUBLE WALLED PIPELINE

(76) Inventor: Cornelis Van Zandwijk, Waddinxveen (NL)

( * ) Notice: Subject to any disclaimer, the term of this patent is extended or adjusted under 35 U.S.C. 154(b) by 1918 days.

(21) Appl. No.: 11/036,096

(22) Filed: Jan. 14, 2005

(65) Prior Publication Data
US 2006/0156530 A1  Jul. 20, 2006

(51) Int. Cl.
*B23P 19/04* (2006.01)
(52) U.S. Cl. ....... 29/234; 29/33 D; 29/282; 29/890.036; 29/890.14; 285/47; 285/123.1; 285/123.2; 285/123.15; 285/288.1
(58) Field of Classification Search ............. 29/890.036, 29/890.14, 33 D, 234, 282; 165/141, 179; 285/47, 123.1, 123.2, 123.15, 288.1; 130/113, 130/137, 141, 148, DIG. 3
See application file for complete search history.

(56) References Cited

U.S. PATENT DOCUMENTS

| | | | | |
|---|---|---|---|---|
| 2,703,921 A | * | 3/1955 | Brown, Jr. | 29/890.036 |
| 5,611,373 A | * | 3/1997 | Ashcraft | 138/113 |
| 6,179,523 B1 | | 1/2001 | Langner et al. | |

FOREIGN PATENT DOCUMENTS

| GB | 2 362 696 A | 11/2001 |
|---|---|---|
| WO | WO 03/085312 A1 | 10/2003 |

\* cited by examiner

*Primary Examiner* — Richard Chang
(74) *Attorney, Agent, or Firm* — Haynes and Boone, LLP

(57) ABSTRACT

A method for manufacturing a double walled pipeline comprises providing a pipeline section including an inner tubular member and an outer tubular member, providing a coupling member, and controlling the stress distribution in the inner tubular member and the outer tubular member by coupling the inner tubular member and the outer tubular member directly to the coupling member.

24 Claims, 45 Drawing Sheets

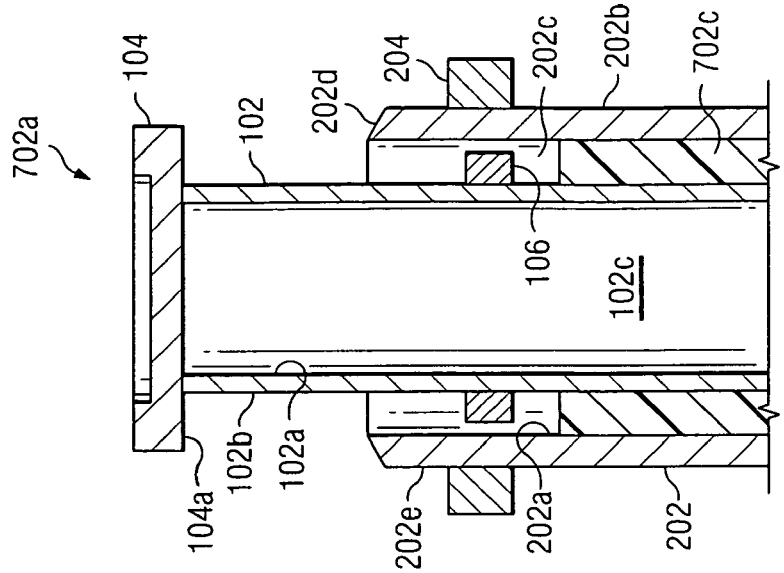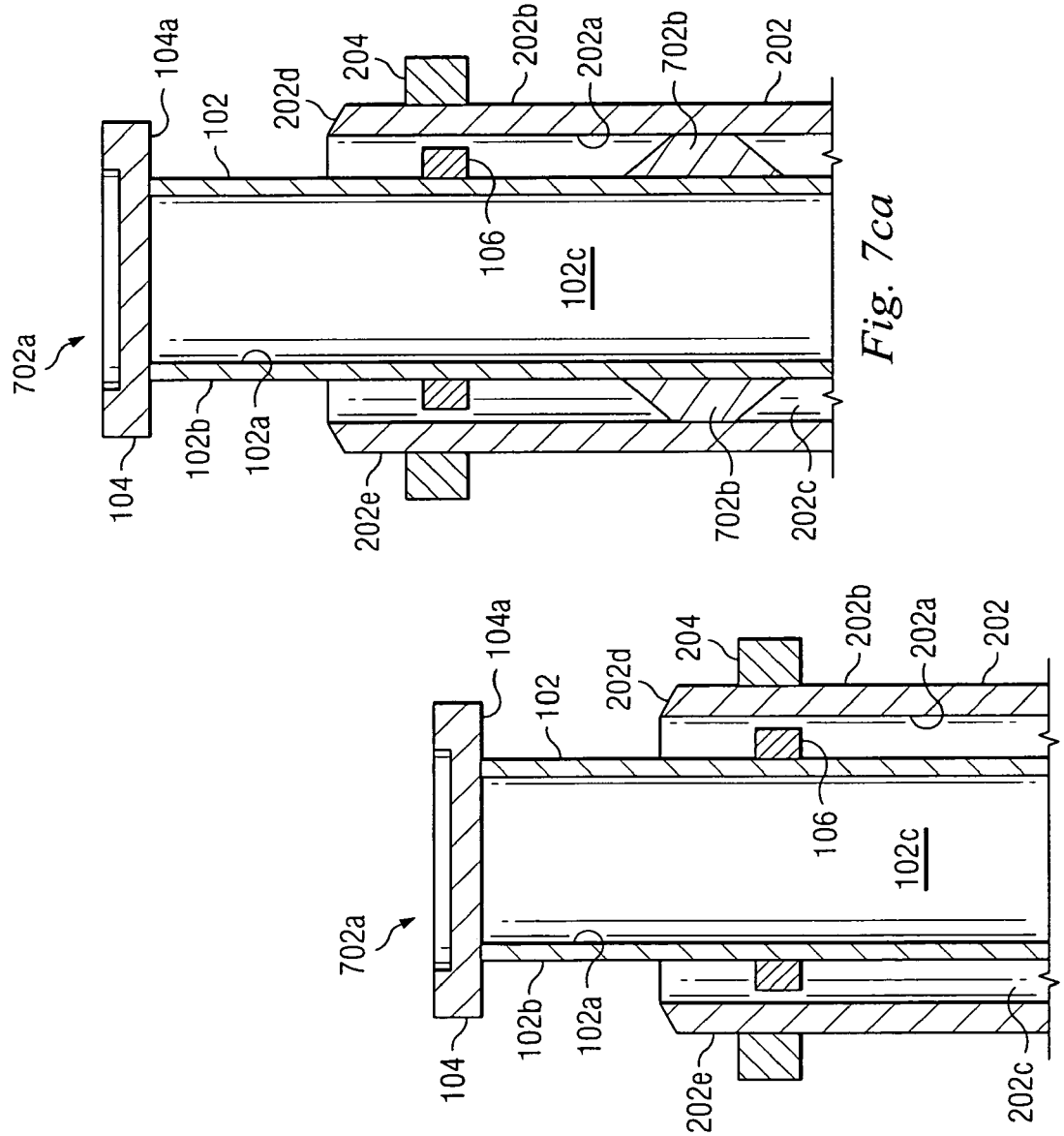

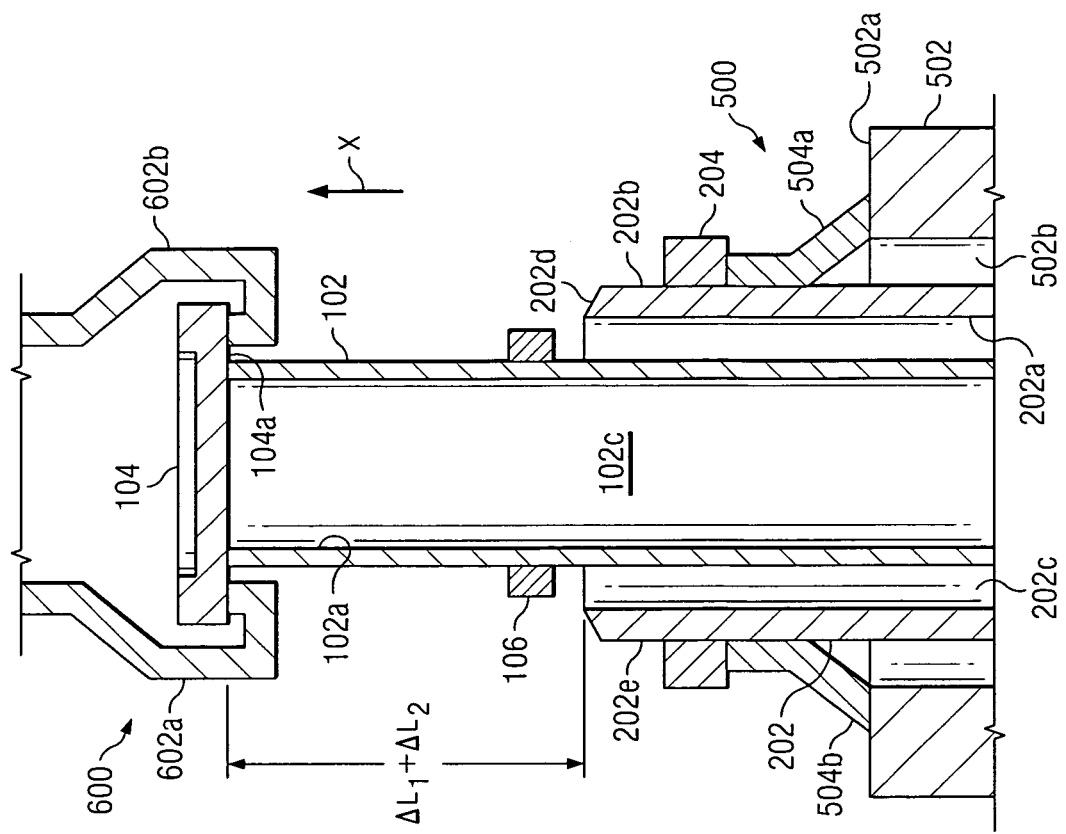
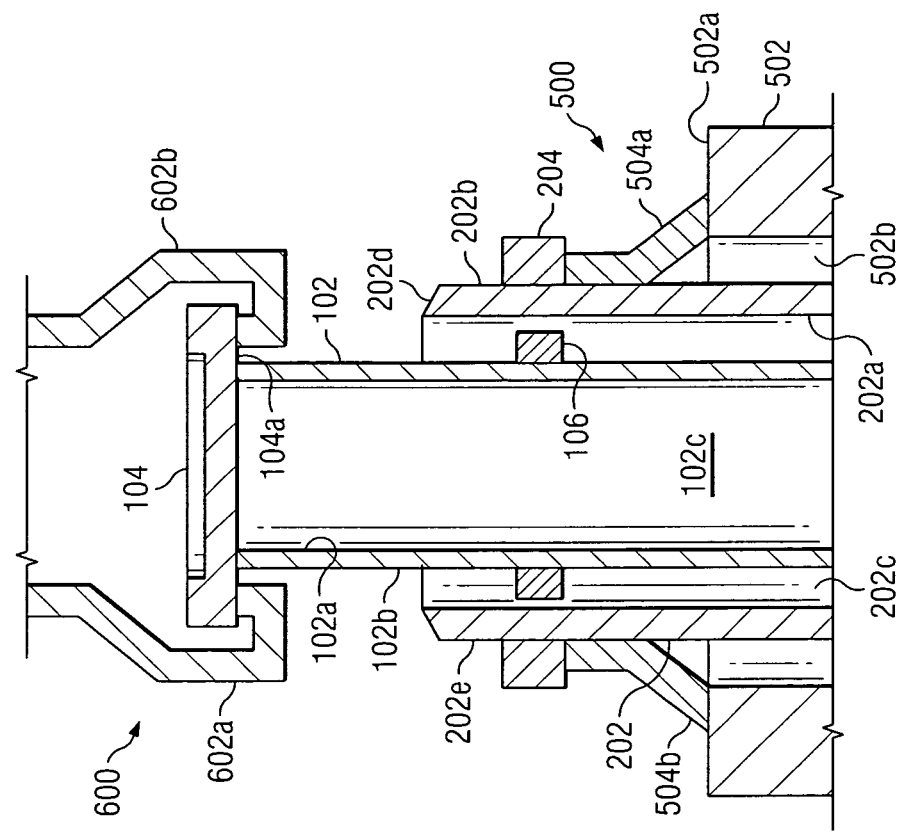

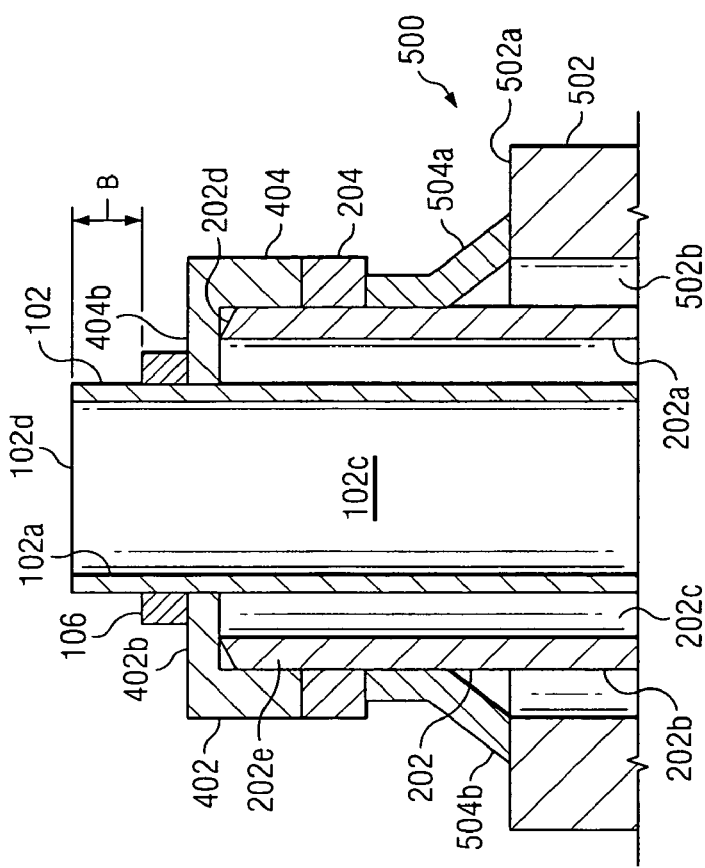
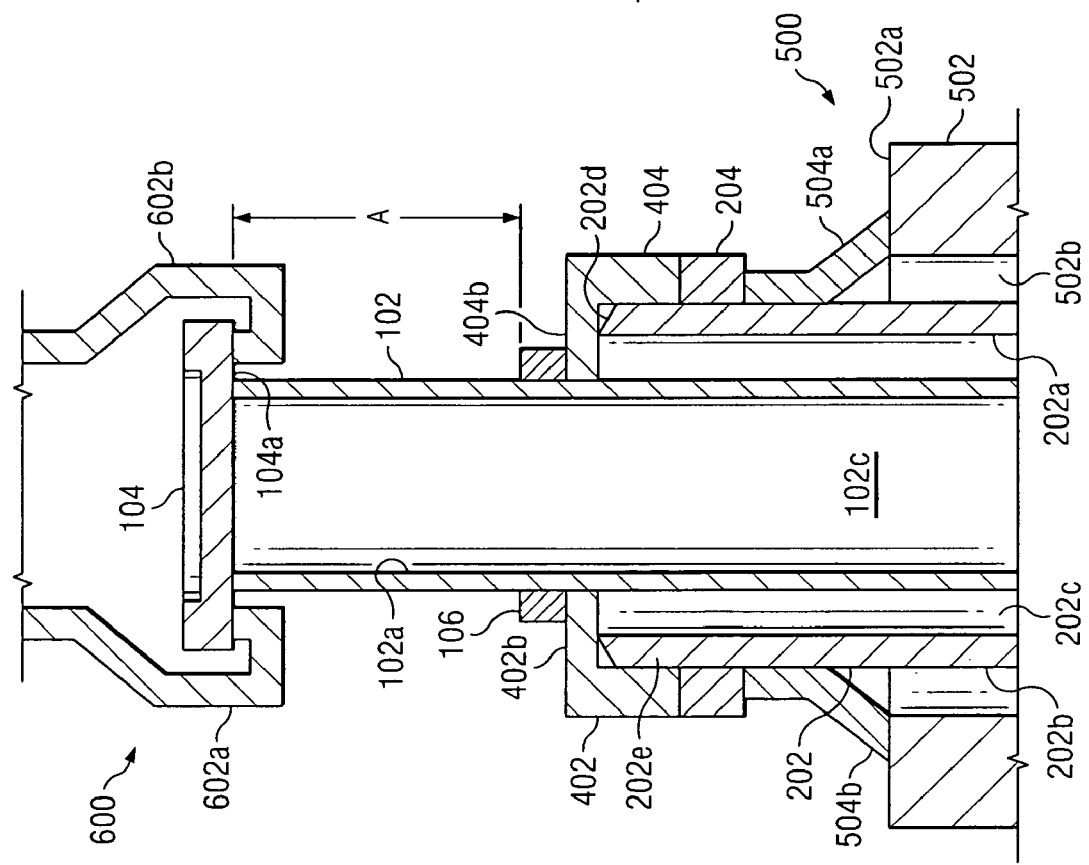
Fig. 7g
Fig. 7h

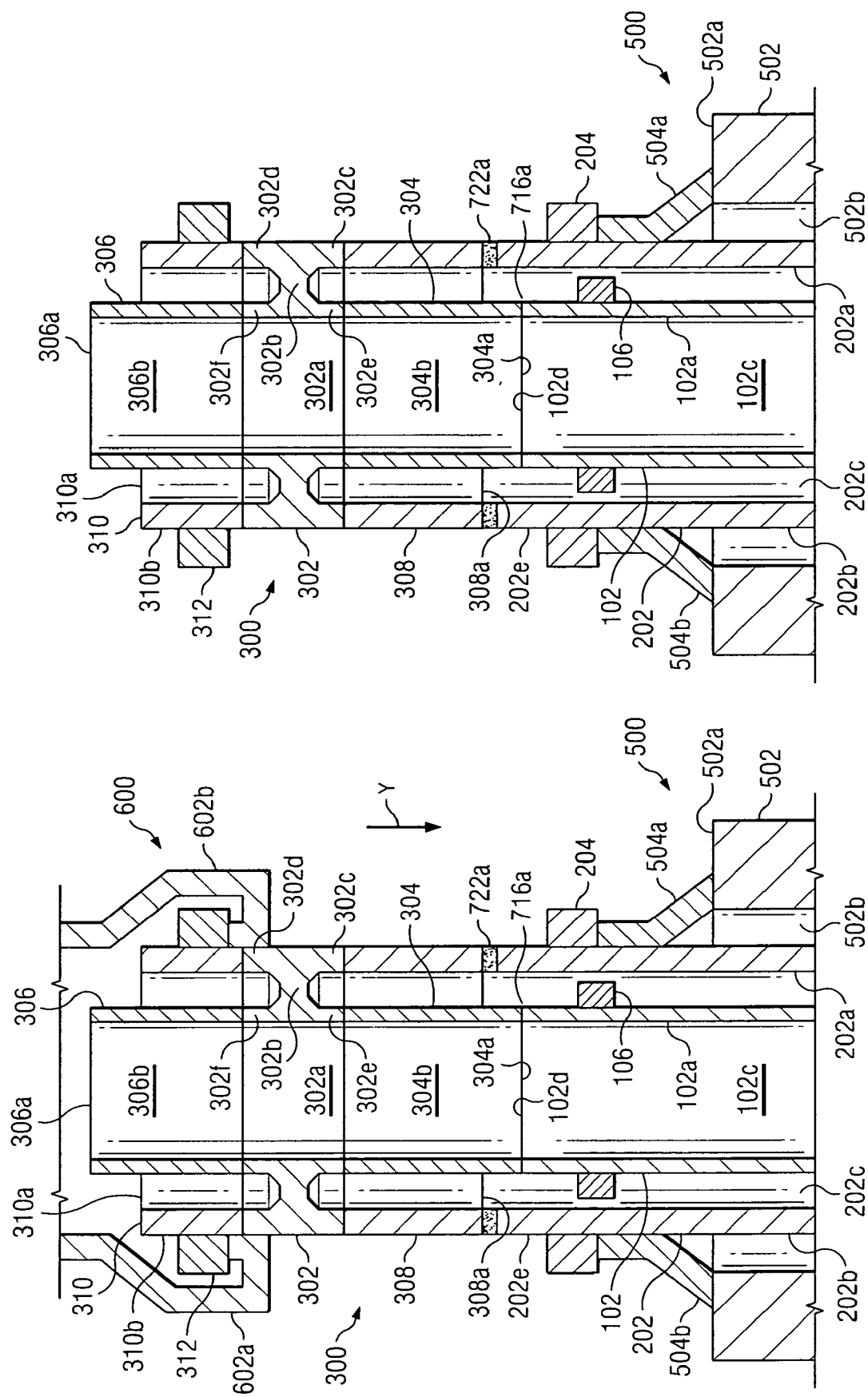

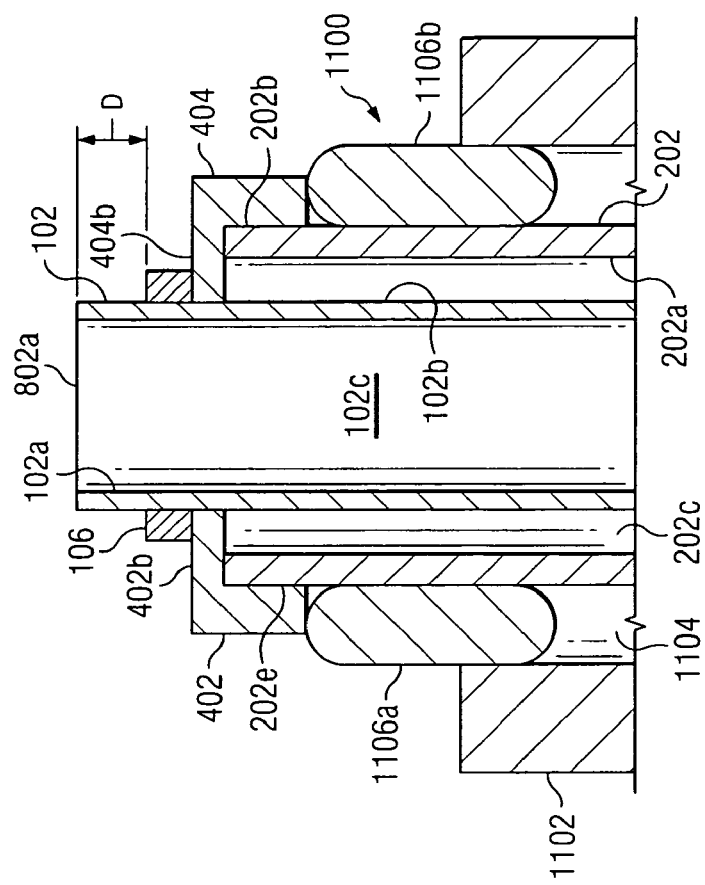
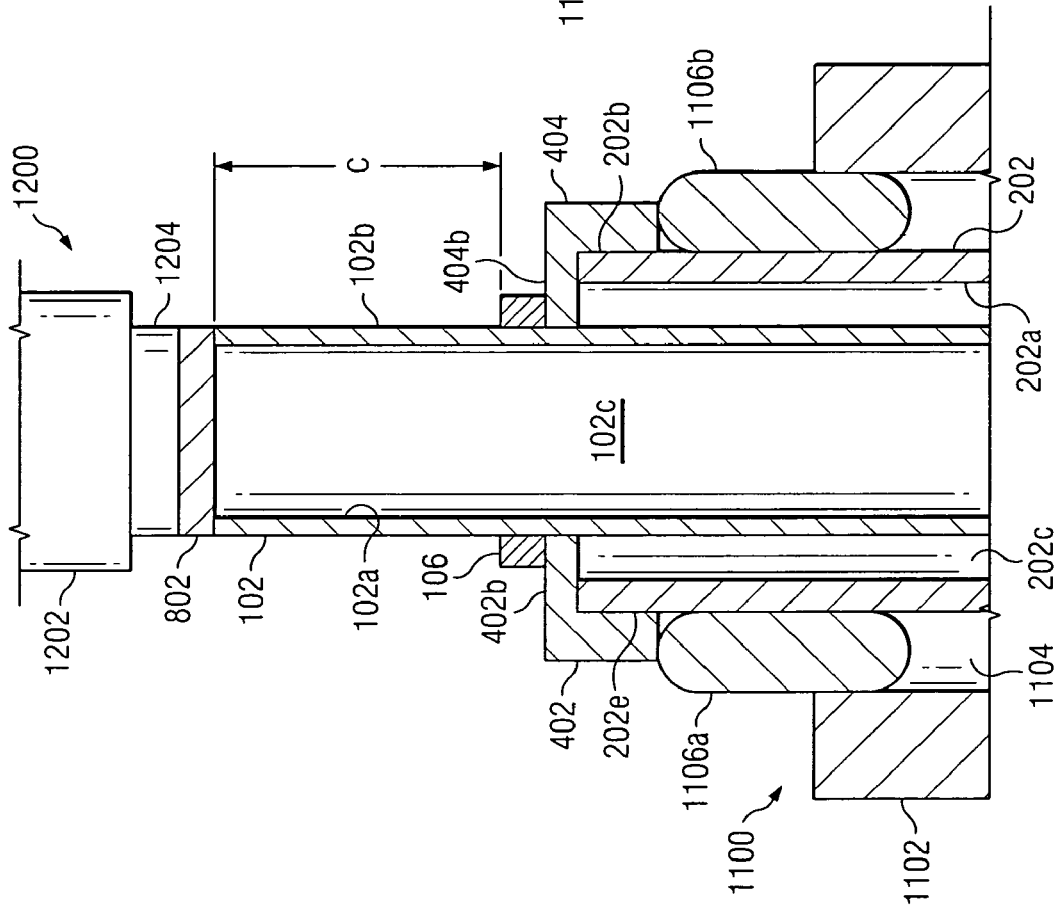
Fig. 13h
Fig. 13g

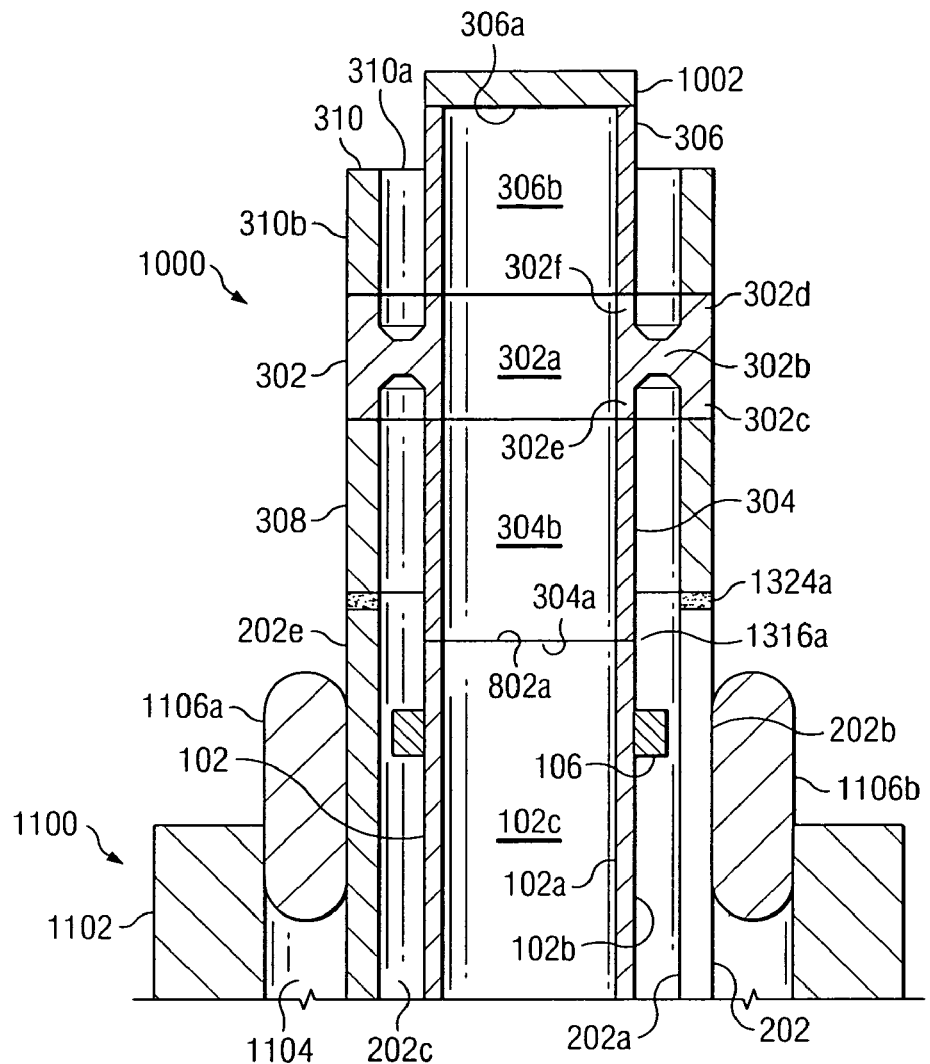
*Fig. 13o*
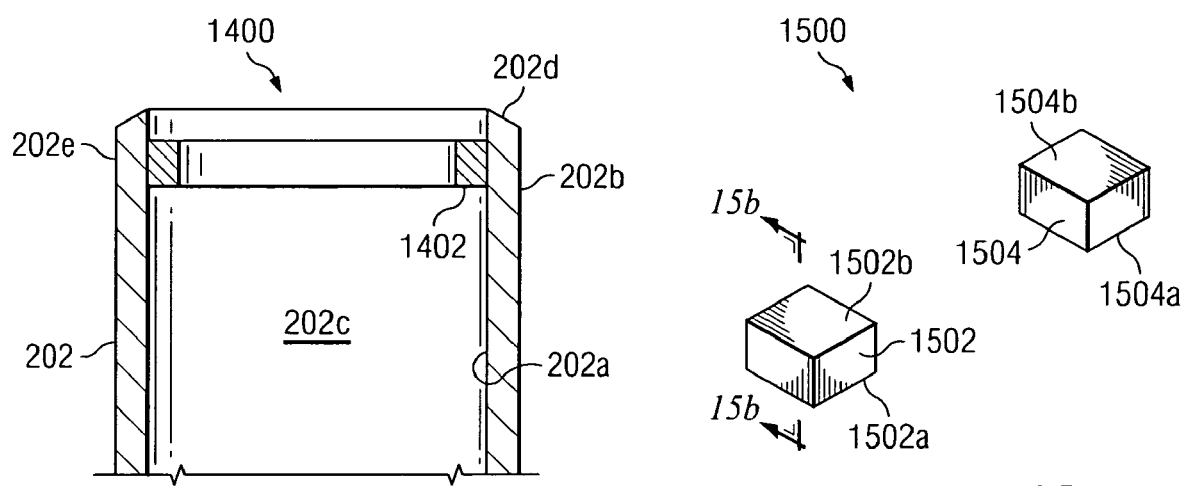
*Fig. 14*
*Fig. 15a*

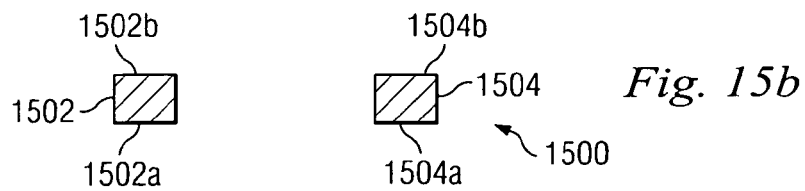
*Fig. 15b*
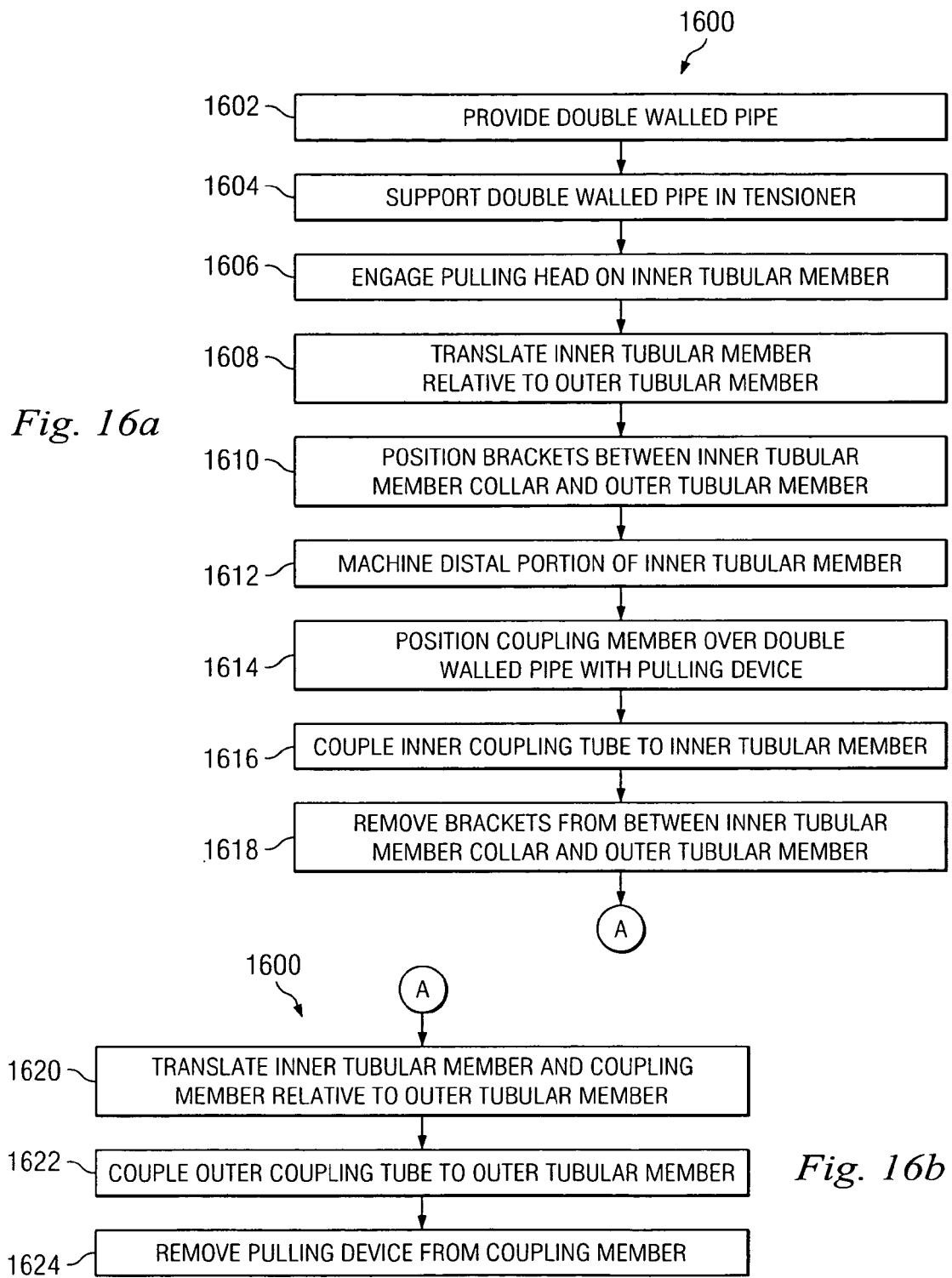
*Fig. 16a*
*Fig. 16b*

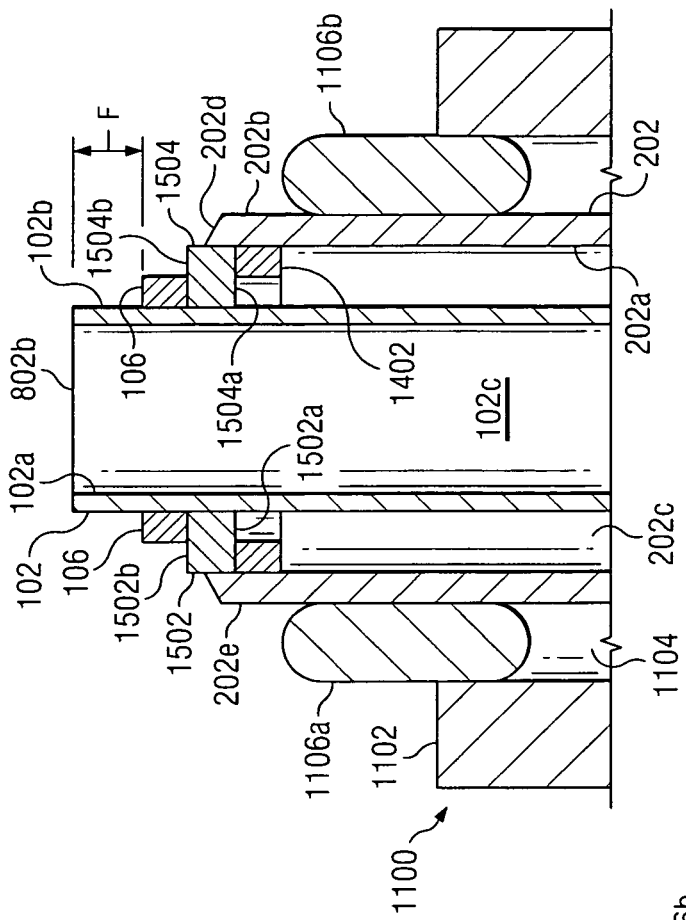
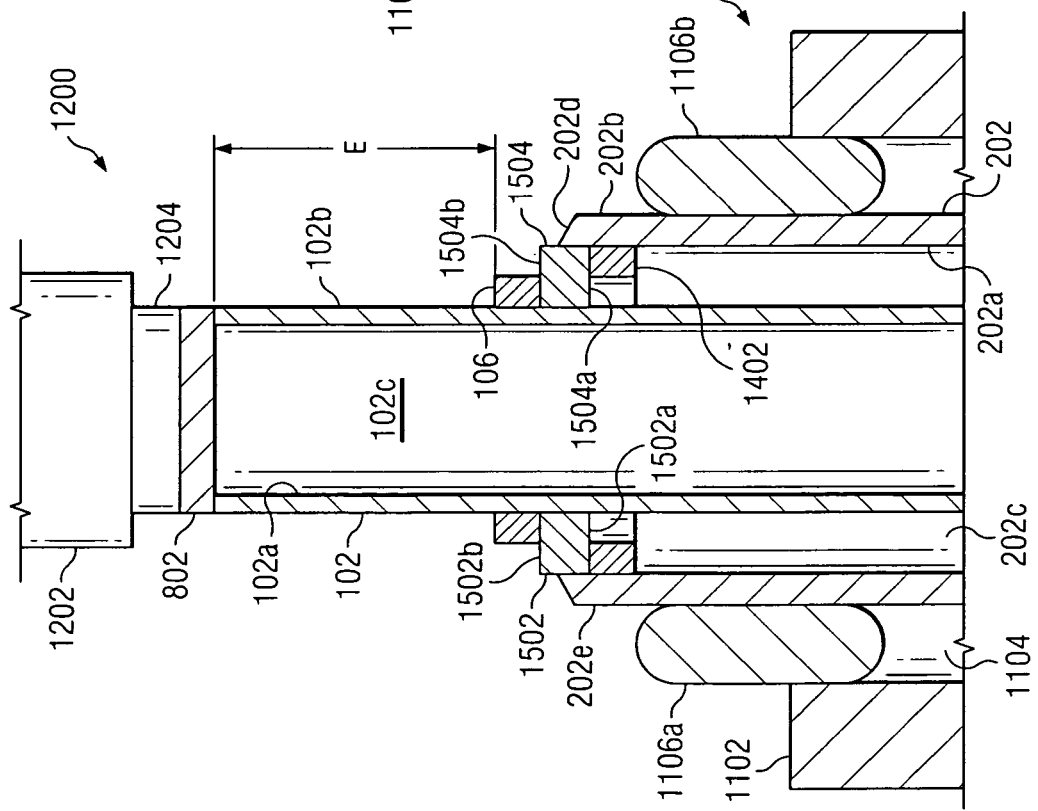
Fig. 16h
Fig. 16g

METHOD FOR MANUFACTURING A DOUBLE WALLED PIPELINE

BACKGROUND

The disclosures herein relate generally to deep water pipeline construction and more particularly to a method and apparatus for manufacturing a double walled pipeline.

Double-walled pipe, also called pipe-in-pipe, is often used in deep water pipeline construction and includes an inner pipe positioned within an outer pipe in order to provide a number of advantages such as, for example, providing thermal insulation to the oil flow. Adding new pipe sections to a double-walled pipe is typically accomplished by providing an add-on section with an inner pipe protruding from one of its ends. The inner pipe of the add-on section is welded to the inner pipe of the pipeline. After completion of the inner pipe welding, the outer pipe of the add-on section is slid over the inner pipe until it abuts the outer pipe of the pipeline. The outer pipe welds are then made.

Bulkheads may be used to couple sections of the double-walled pipe together, as well as to couple the double-walled pipe to pipeline components such as, for example, wells, sub-sea manifolds, and pipeline terminations. However, when the add-on section contains a bulkhead the procedure described above is not possible, as the outer pipe cannot slide over the inner pipe. The typical procedure for an add-on section with a bulkhead is to first weld the protruding inner pipe of the add-on section to the inner pipe of the pipeline and then close the remaining opening between the outer pipes of the add-on section and the pipeline with half-shells. The length of the half-shells is chosen such that predetermined stress distributions are achieved in the inner and outer pipes.

The coupling of the double-walled pipe with half-shells raises a number of issues. In order to achieve the desired stresses in the inner and outer pipes, the half-shells often require a significant length, which makes it difficult to achieve high quality welds and results in longer weld times. The half shells also require separate welding procedures, which increases cost and produces welds that are extremely sensitive to fatigue damage.

Accordingly, it would be desirable to provide a method and apparatus for manufacturing a double walled pipeline absent the disadvantages found in the prior methods discussed above.

SUMMARY

According to one aspect of the present invention, a method for manufacturing a double walled pipeline comprises providing a pipeline section including an inner tubular member and an outer tubular member, providing a coupling member, and controlling the stress distribution in the inner tubular member and the outer tubular member by coupling the inner tubular member and the outer tubular member directly to the coupling member.

According to another aspect of the present invention, a double walled pipeline comprises an outer tubular member, an inner tubular member coupled to the outer tubular member and positioned within the outer tubular member, and a coupling member comprising a support member, an outer coupling tube extending from the support member and coupled directly to the outer tubular member, and an inner coupling tube extending from the support member and coupled directly to the inner tubular member, whereby the direct coupling of the outer coupling tube with the outer tubular member and the direct coupling of the inner coupling tube with the inner tubular member provides a predetermined stress distribution in the inner tubular member and a predetermined stress distribution in the outer tubular member.

According to another aspect of the present invention, a pipeline comprises an outer tubular member comprising a collar positioned on its outer surface, an inner tubular member coupled to the outer tubular member and positioned within the outer tubular member, the inner tubular member comprising a collar positioned on its outer surface, and a bulkhead section comprising a bulkhead, a collar positioned on its outer surface, an outer coupling tube extending from the bulkhead and coupled directly to the outer tubular member about their circumferences, and an inner coupling tube extending from the bulkhead and coupled directly to the inner tubular member about their circumferences, whereby the direct coupling of the outer coupling tube with the outer tubular member and the direct coupling of the inner coupling tube with the inner tubular member provides a predetermined stress distribution in the inner tubular member and the outer tubular member.

According to another aspect of the present invention, a pipeline comprises an outer tubular member, an inner tubular member coupled to the outer tubular member and positioned within the outer tubular member, the inner tubular member comprising a collar positioned on its outer surface, and a bulkhead section comprising a bulkhead, a pulling head positioned on a distal end of the bulkhead section, an outer coupling tube extending from the bulkhead and coupled directly to the outer tubular member about their circumferences, and an inner coupling tube extending from the bulkhead and coupled directly to the inner tubular member about their circumferences, whereby the direct coupling of the outer coupling tube with the outer tubular member and the direct coupling of the inner coupling tube with the inner tubular member provides a predetermined stress distribution in the inner tubular member and the outer tubular member.

According to another aspect of the present invention, a pipeline comprises an outer tubular member comprising a collar positioned on its inner surface, an inner tubular member coupled to the outer tubular member and positioned within the outer tubular member, the inner tubular member comprising a collar positioned on its outer surface, and a bulkhead section comprising a bulkhead, a pulling head positioned on a distal end of the bulkhead section, an outer coupling tube extending from the bulkhead and coupled directly to the outer tubular member about their circumferences, and an inner coupling tube extending from the bulkhead and coupled directly to the inner tubular member about their circumferences, whereby the direct coupling of the outer coupling tube with the outer tubular member and the direct coupling of the inner coupling tube with the inner tubular member provides a predetermined stress distribution in the inner tubular member and the outer tubular member.

According to another aspect of the present invention, a double-walled pipe comprises an outer tubular member, and an inner tubular member coupled to the outer tubular member and positioned within the outer tubular member, the inner tubular member comprising a collar positioned on its outer surface and a pulling head coupled to its terminating end.

According to another aspect of the present invention, a method for manufacturing a double walled pipeline comprises providing a pipeline comprising an outer tubular member and an inner tubular member coupled to the outer tubular member and positioned within the outer tubular member, the outer tubular member comprising a outer tubular member collar positioned on its outer surface, and the inner tubular member comprising a pulling head positioned on its distal end and an inner tubular member collar positioned on its outer surface, providing a bulkhead section comprising a bulkhead, a bulkhead collar positioned on the outer surface of the bulkhead section, an outer coupling tube extending from the bulkhead, and an inner coupling tube extending from the bulkhead and positioned within the outer coupling tube, holding the outer tubular member stationary by engaging the outer tubular member collar, translating the inner tubular member a predetermined distance relative to the outer tubular member and axially through the outer tubular member in a first direction by engaging the pulling head, positioning a bracket between the outer tubular member collar and the inner tubular member collar, removing a predetermined portion of the inner tubular member on the distal end of the inner tubular member, whereby removal of the predetermined portion removes the pulling head from the inner tubular member, welding the inner coupling tube directly to the inner tubular member, removing the bracket from between the outer tubular member collar and the inner tubular member collar, translating the inner tubular member relative to the outer tubular member and axially through the outer tubular member in a second direction by engaging the bulkhead collar, the second direction opposite the first direction, and welding the outer coupling tube directly to the outer tubular member.

According to another aspect of the present invention, a method for manufacturing a double walled pipeline comprises providing a pipeline comprising an outer tubular member and an inner tubular member coupled to the outer tubular member and positioned within the outer tubular member, the inner tubular member comprising an inner tubular member pulling head positioned on its distal end and an inner tubular member collar positioned on its outer surface, providing a bulkhead section comprising a bulkhead, a bulkhead pulling head positioned on its distal end, an outer coupling tube extending from the bulkhead, and an inner coupling tube extending from the bulkhead and positioned within the outer coupling tube, holding the outer tubular member stationary by engaging the outer tubular member with a friction support tool, translating the inner tubular member a predetermined distance relative to the outer tubular member and axially through the outer tubular member in a first direction by engaging the inner tubular member pulling head, positioning a bracket between the inner tubular member collar and a distal end of the outer tubular member, removing a predetermined portion of the inner tubular member on the distal end of the inner tubular member, whereby removal of the predetermined portion removes the inner tubular member pulling head from the inner tubular member, welding the inner coupling tube directly to the inner tubular member, removing the bracket from between the inner tubular member collar and the distal end of the outer tubular member, beveling the distal end of the outer tubular member, translating the inner tubular member relative to the outer tubular member and axially through the outer tubular member in a second direction by engaging the bulkhead pulling head, the second direction opposite the first direction, and welding the outer coupling tube directly to the outer tubular member.

According to another aspect of the present invention, a method for manufacturing a double walled pipeline comprises providing a pipeline comprising an outer tubular member and an inner tubular member coupled to the outer tubular member and positioned within the outer tubular member, the outer tubular member comprising an outer tubular member collar on its inner surface, and the inner tubular member comprising a inner tubular member pulling head positioned on its distal end and an inner tubular member collar positioned on its outer surface, providing a bulkhead section comprising a bulkhead, a bulkhead pulling head positioned on its distal end, an outer coupling tube extending from the bulkhead, and an inner coupling tube extending from the bulkhead and positioned within the outer coupling tube, holding the outer tubular member stationary by engaging the outer tubular member with a friction support tool, translating the inner tubular member a predetermined distance relative to the outer tubular member and axially through the outer tubular member in a first direction by engaging the inner tubular member pulling head, positioning a bracket between the inner tubular member collar and the outer tubular member collar, removing a predetermined portion of the inner tubular member on the distal end of the inner tubular member, whereby removal of the predetermined portion removes the pulling head from the inner tubular member, welding the inner coupling tube directly to the inner tubular member, removing the bracket from between the inner tubular member collar and the outer tubular member collar, translating the inner tubular member relative to the outer tubular member and axially through the outer tubular member in a second direction by engaging the bulkhead pulling head, the second direction opposite the first direction, and welding the outer coupling tube directly to the outer tubular member.

According to another aspect of the present invention, a double walled pipeline comprises a pipeline section comprising an outer tubular member and an inner tubular member, the inner tubular member positioned within and coupled to the outer tubular member, and means coupled to the pipeline section for controlling the stress distribution in the inner tubular member and the outer tubular member

BRIEF DESCRIPTION OF THE DRAWINGS

FIG. 4b is a cross sectional view illustrating an exemplary embodiment of the plurality of brackets of FIG. 4a.

FIG. 5b is a cross sectional view illustrating an exemplary embodiment of the hang-off table of FIG. 5a.

FIG. 6b is a cross sectional view illustrating an exemplary embodiment of the lowering clamp of FIG. 6a.

FIG. 7b is a flow chart illustrating an exemplary embodiment of another portion of the method for coupling tubular members of FIG. 7a.

FIG. 7c is a cross sectional view illustrating an exemplary embodiment of the inner tubular member of FIG. 1 and the outer tubular member of FIG. 2 during the method of FIGS. 7a and 7b.

FIG. 7ca is a cross sectional view illustrating an exemplary embodiment of the inner tubular member and the outer tubular member of FIG. 7c including a plurality of annular spacers between them.

FIG. 7cb is a cross sectional view illustrating an exemplary embodiment of the inner tubular member and the outer tubular member of FIG. 7c including an insulating material between them.

FIG. 7da is a graph illustrating an exemplary embodiment of the stress distribution in the inner tubular member of FIG. 7d.

FIG. 7db is a graph illustrating an exemplary embodiment of the stress distribution in the outer tubular member of FIG. 7d.

FIG. 7e is a cross sectional view illustrating an exemplary embodiment of the lowering clamp of FIG. 6 engaging the inner tubular member of FIG. 7c during the method of FIGS. 7a and 7b.

FIG. 7fa is a graph illustrating an exemplary embodiment of the stress distribution in the inner tubular member of FIG. 7f.

FIG. 7fb is a graph illustrating an exemplary embodiment of the stress distribution in the outer tubular member of FIG. 7f.

FIG. 7g is a cross sectional view illustrating an exemplary embodiment of the plurality of brackets of FIG. 4 positioned between the inner tubular member and outer tubular member of FIG. 7c during the method of FIGS. 7a and 7b.

FIG. 7h is a cross sectional view illustrating an exemplary embodiment of the removal of a distal portion of the inner tubular member of FIG. 7c during the method of FIGS. 7a and 7b.

FIG. 7ma is a graph illustrating an exemplary embodiment of the stress distribution in the inner tubular member of FIG. 7m.

FIG. 7mb is a graph illustrating an exemplary embodiment of the stress distribution in the outer tubular member of FIG. 7m.

FIG. 7n is a cross sectional view illustrating an exemplary embodiment of the lowering clamp of FIG. 6 being removed from the coupling member of FIG. 3 during the method of FIGS. 7a and 7b.

FIG. 11b is a cross sectional view illustrating an exemplary embodiment of the friction support tool of FIG. 11a.

FIG. 13b is a flow chart illustrating an exemplary embodiment of another portion of the method for coupling tubular members of FIG. 13a.

FIG. 13ca is a cross sectional view illustrating an exemplary embodiment of the inner tubular member and the outer tubular member of FIG. 13c including a plurality of annular spacers between them.

FIG. 13cb is a cross sectional view illustrating an exemplary embodiment of the inner tubular member and the outer tubular member of FIG. 13c including an insulating material between them.

FIG. 13da is a graph illustrating an exemplary embodiment of the stress distribution in the inner tubular member of FIG. 13d.

FIG. 13db is a graph illustrating an exemplary embodiment of the stress distribution in the outer tubular member of FIG. 13d.

FIG. 13fa is a graph illustrating an exemplary embodiment of the stress distribution in the inner tubular member of FIG. 13f.

FIG. 13fb is a graph illustrating an exemplary embodiment of the stress distribution in the outer tubular member of FIG. 13f.

FIG. 13g is a fragmentary cross sectional view illustrating an exemplary embodiment of the plurality of brackets of FIG. 4 positioned between the inner tubular member and outer tubular member of FIG. 13c during the method of FIGS. 13a and 13b.

FIG. 13h is a cross sectional view illustrating an exemplary embodiment of the removal of a distal portion of the inner tubular member of FIG. 13c during the method of FIGS. 13a and 13b.

Figure 13C:
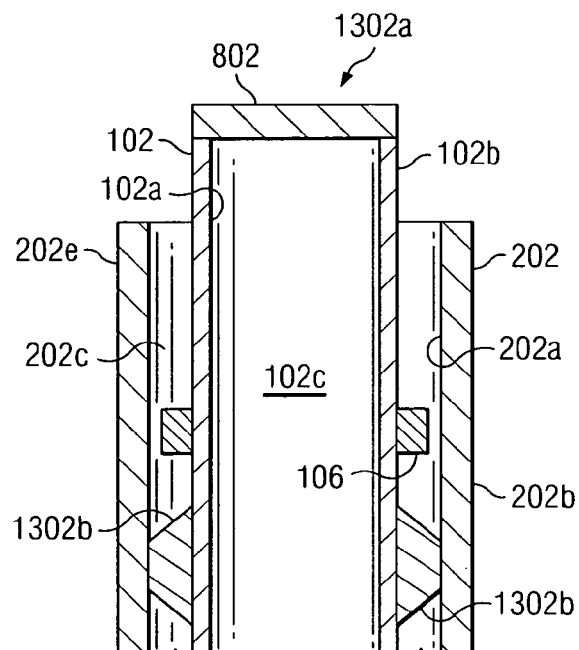
FIG. 13c is a cross sectional view illustrating an exemplary embodiment of the inner tubular member of FIG. 8 and the outer tubular member of FIG. 9 during the method of FIGS. 13a and 13b.
Figure 13C:
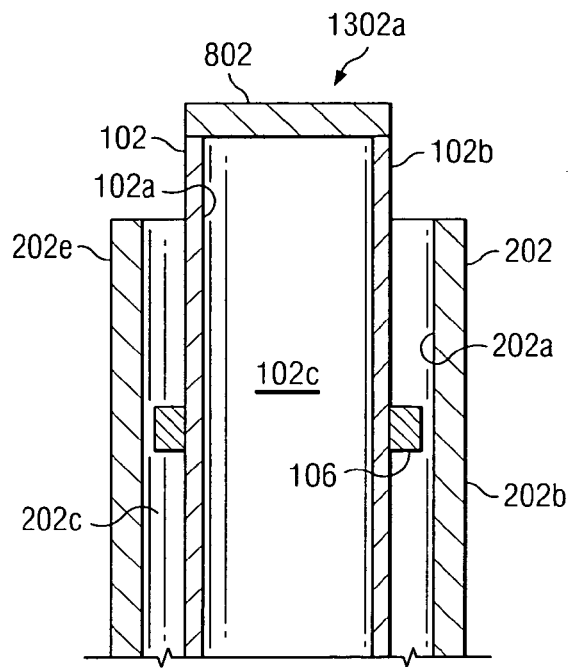
Figure 13A:
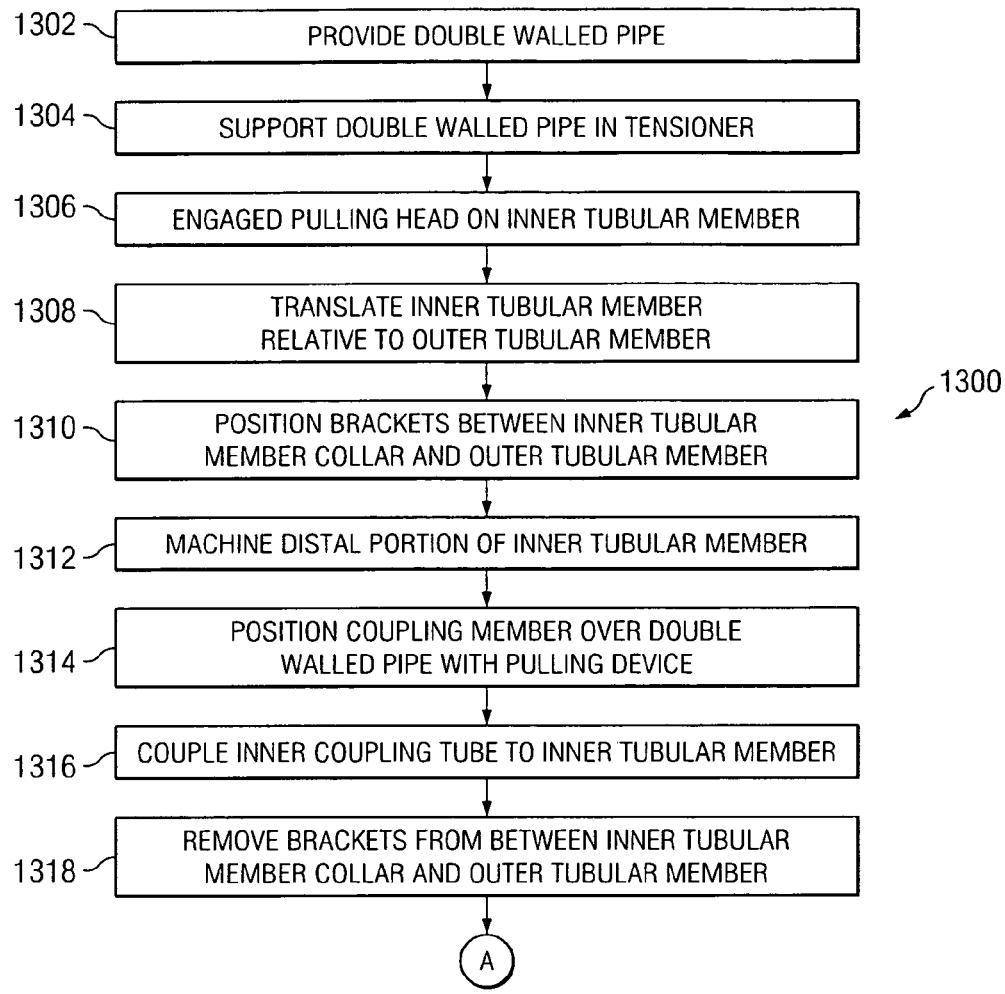
FIG. 13a is a flow chart illustrating an exemplary embodiment of a portion of a method for coupling tubular members.
Figure 13B:
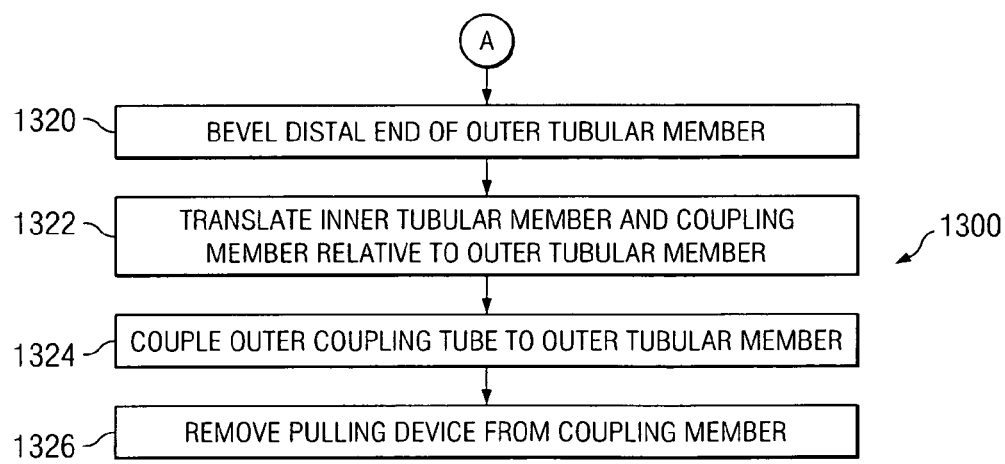
Figure 13C:
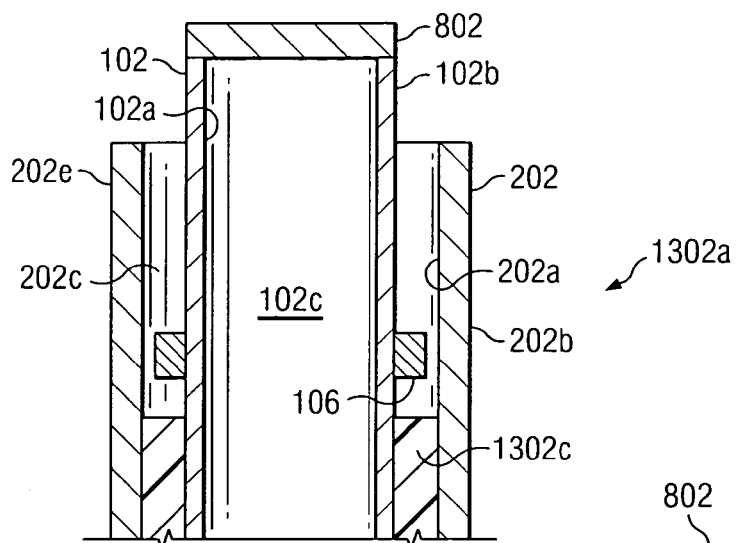

10 being positioned over the inner tubular member and outer tubular member of FIG. 13c during the method of FIGS. 13a and 13b.

Figure 10:
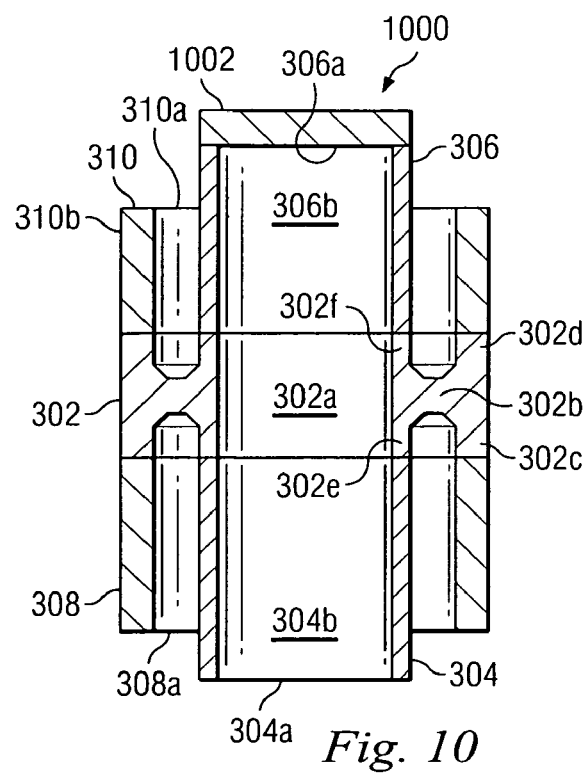
FIG. 10 is a cross sectional view illustrating an exemplary embodiment of a coupling member.
Figure 13D:
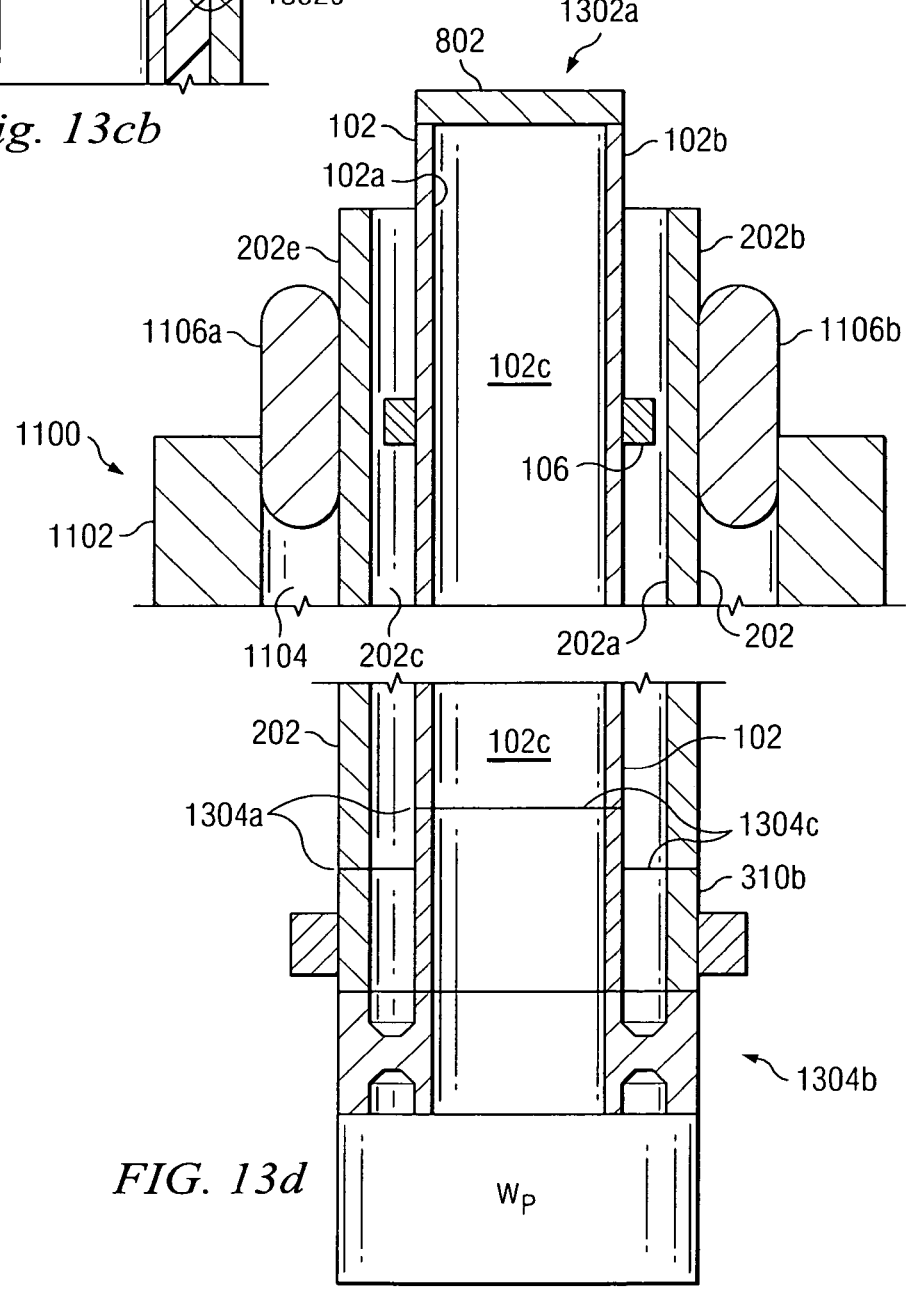
FIG. 13d is a cross sectional view illustrating an exemplary embodiment of the inner tubular member and outer tubular member of FIG. 13c in the friction support tool of FIG. 11 during the method of FIGS. 13a and 13b.
Figure 13D:
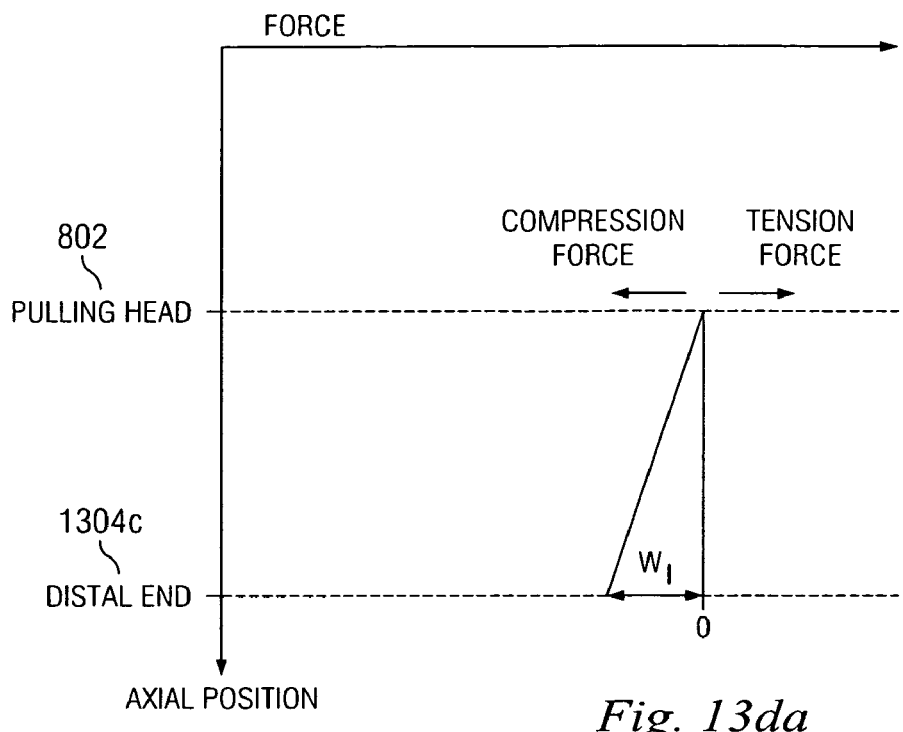
Figure 13D:
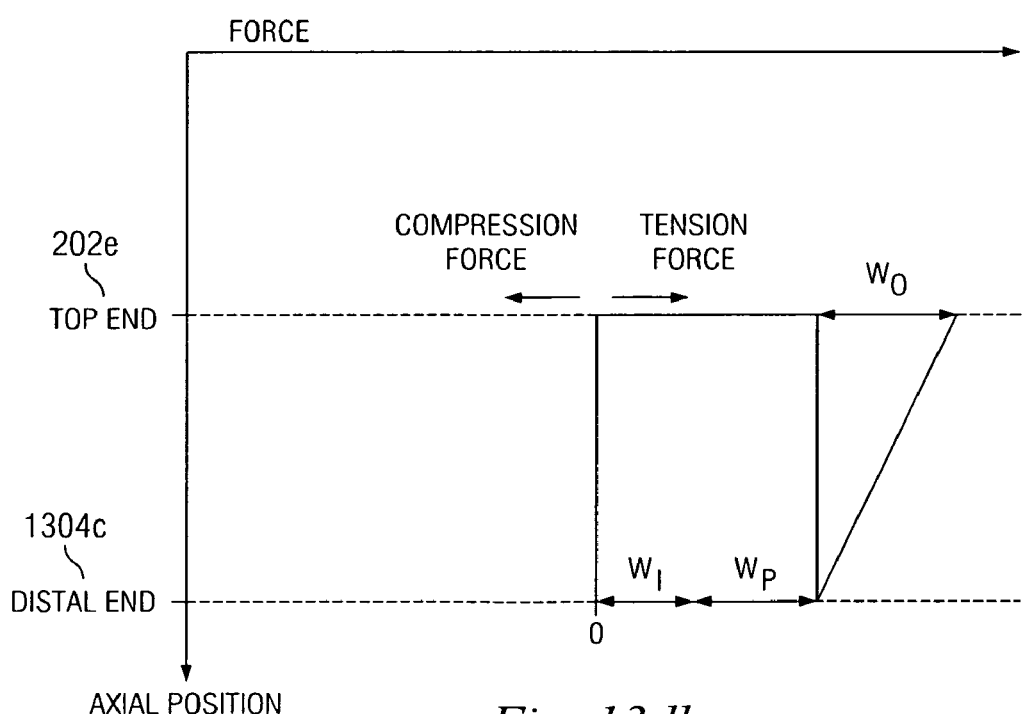
Figures 13E, 13F:
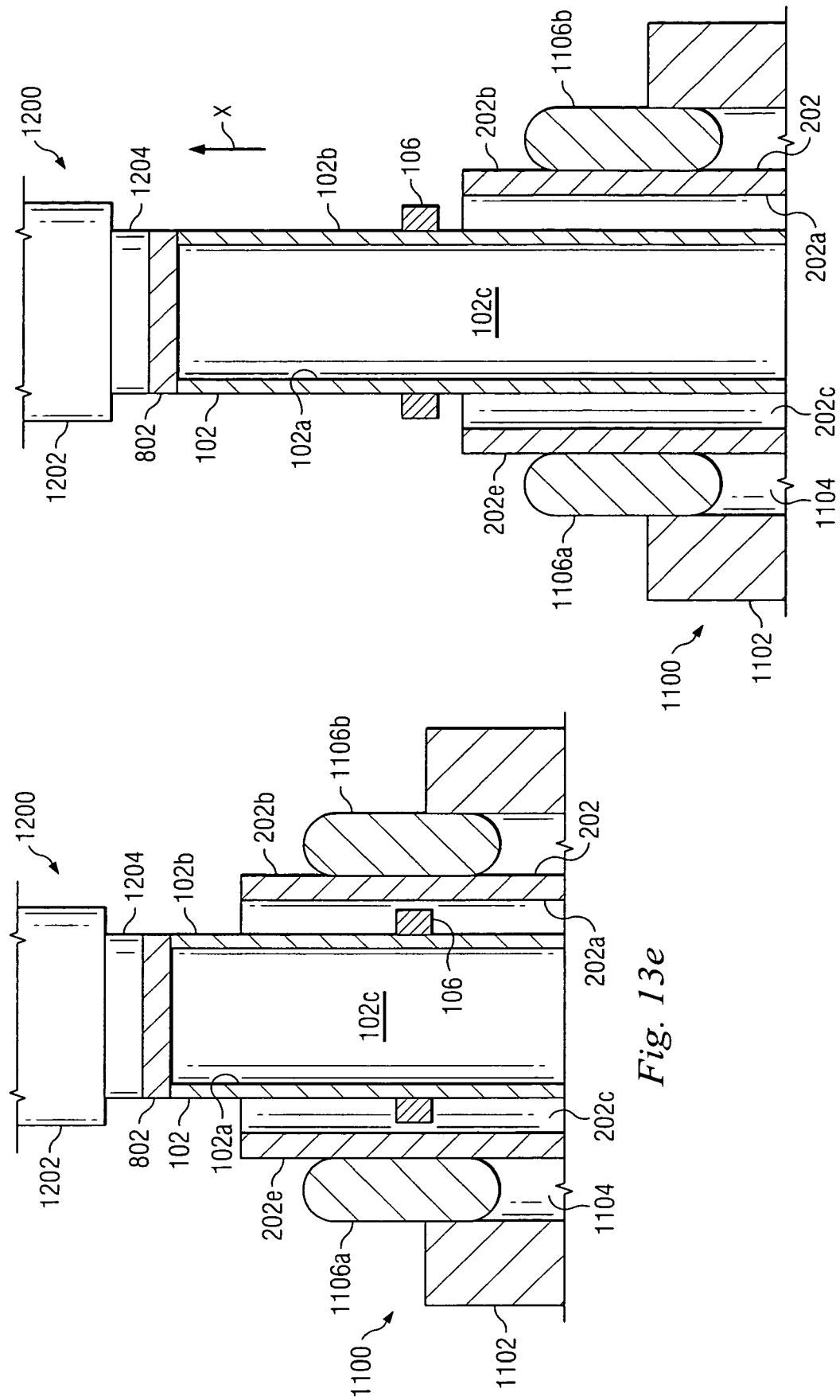
FIG. 13e is a fragmentary cross sectional view illustrating an exemplary embodiment of the pulling device of FIG. 12 engaging the inner tubular member of FIG. 13c during the method of FIGS. 13a and 13b.
FIG. 13f is a fragmentary cross sectional view illustrating an exemplary embodiment of the pulling device of FIG. 12 translating the inner tubular member of FIG. 8 through the outer tubular member of FIG. 9 during the method of FIGS. 13a and 13b.
Figure 13F:
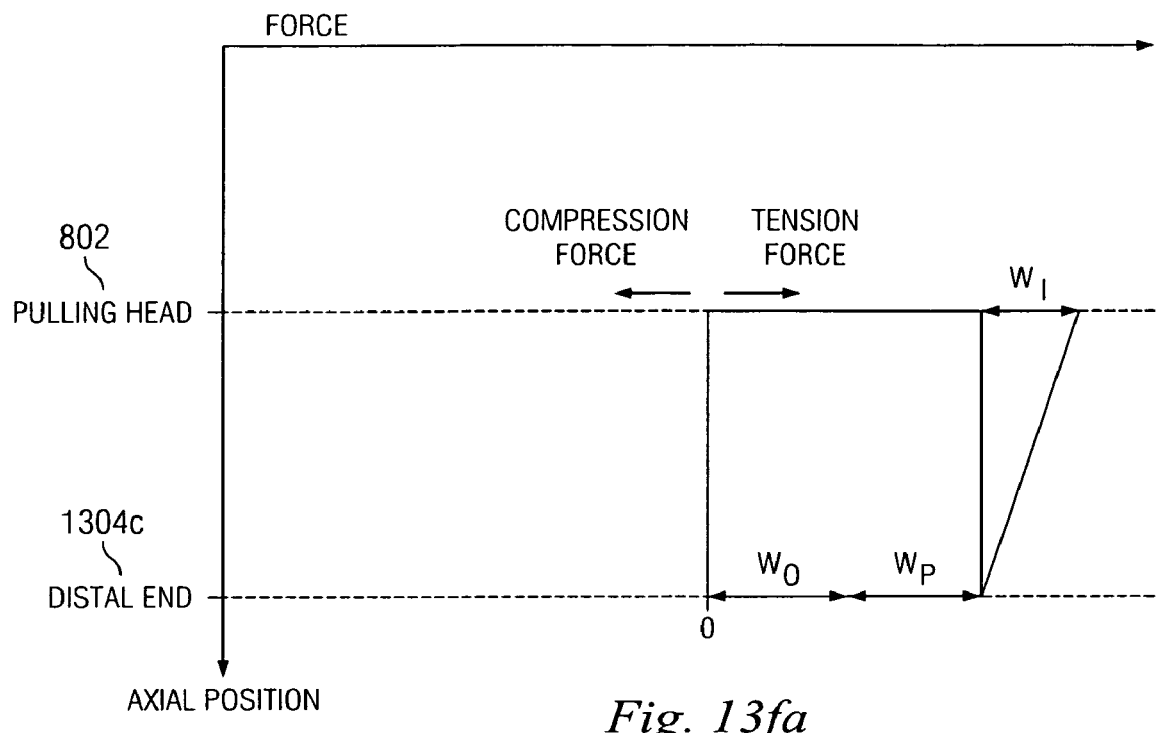
Figure 13F:
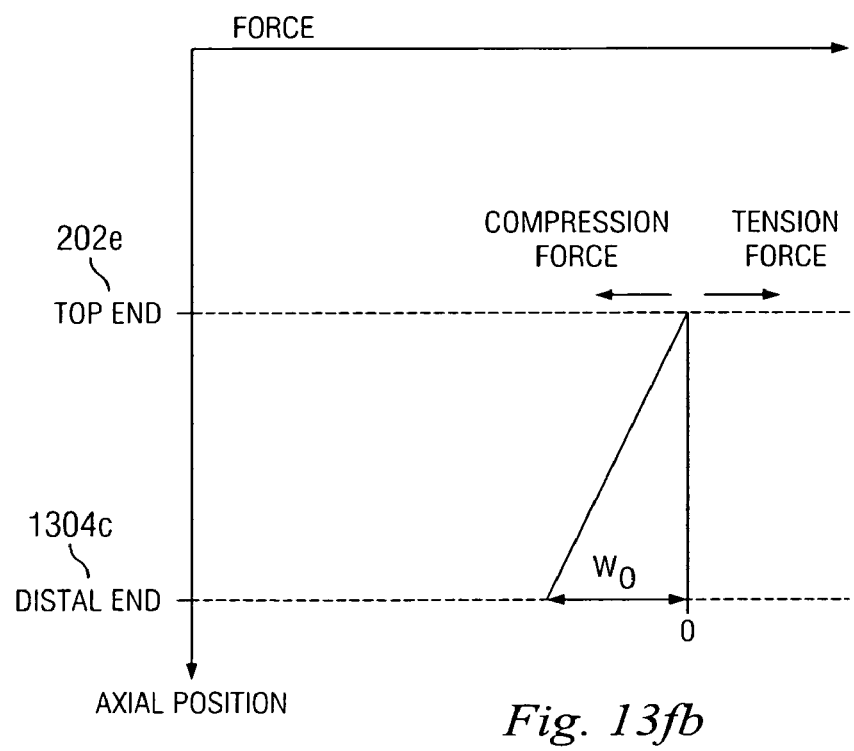
Figure 13I:
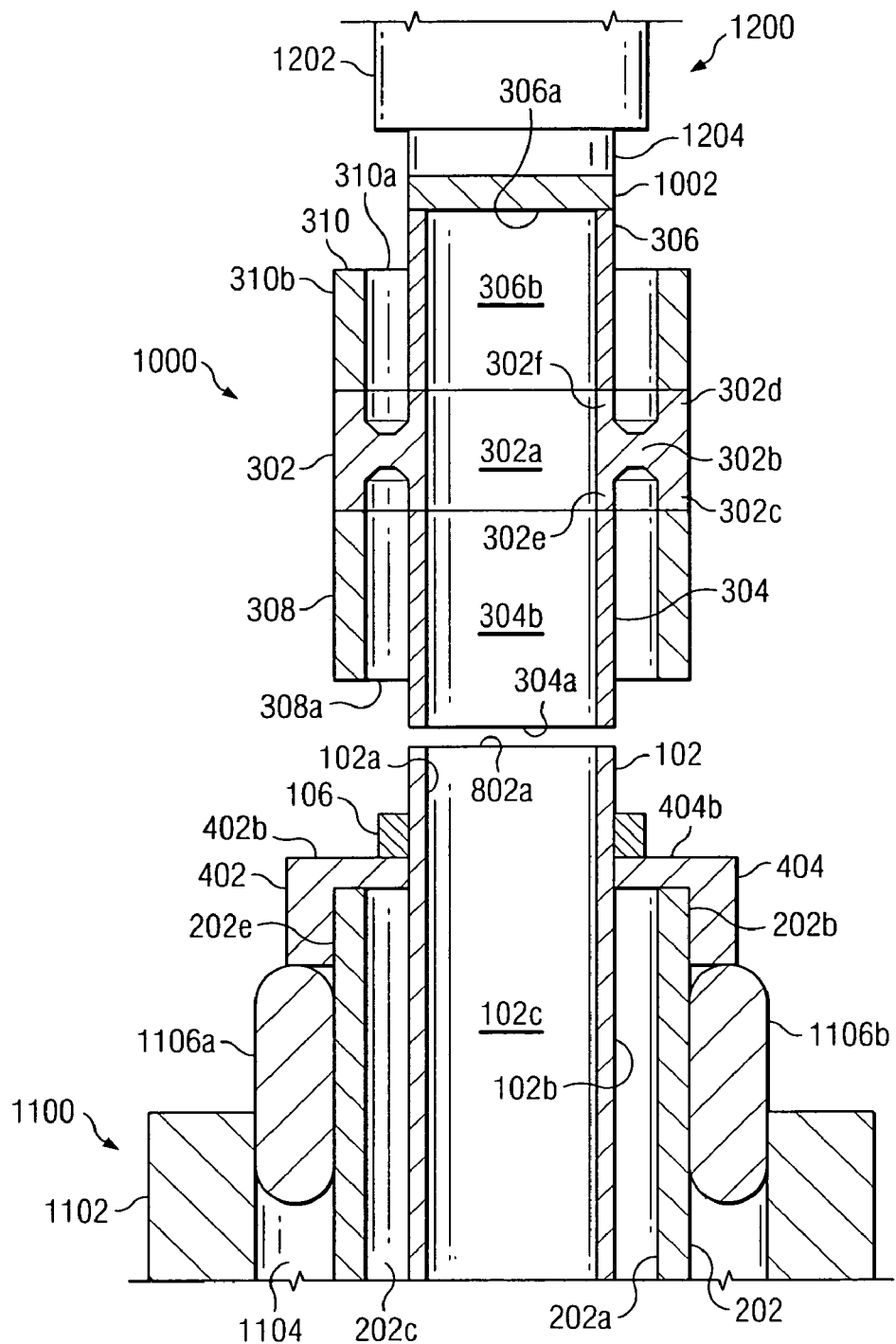
FIG. 13i is a fragmentary cross sectional view illustrating an exemplary embodiment of the coupling member of FIG.
Figure 13J:
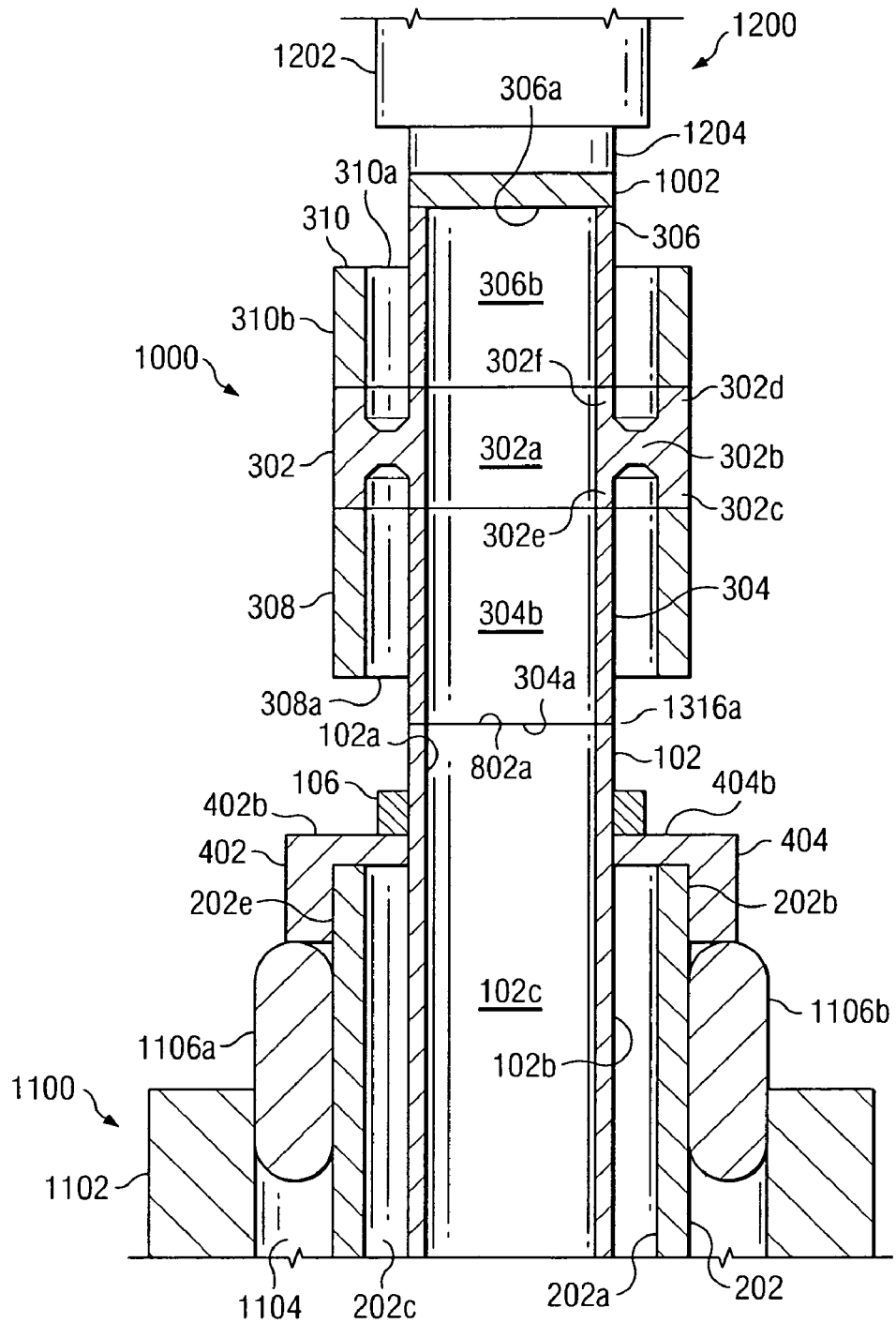

FIG. 13j is a fragmentary cross sectional view illustrating an exemplary embodiment of the coupling member of FIG. 10 being coupled to the inner tubular member of FIG. 13c during the method of FIGS. 13a and 13b.

Figure 13K:
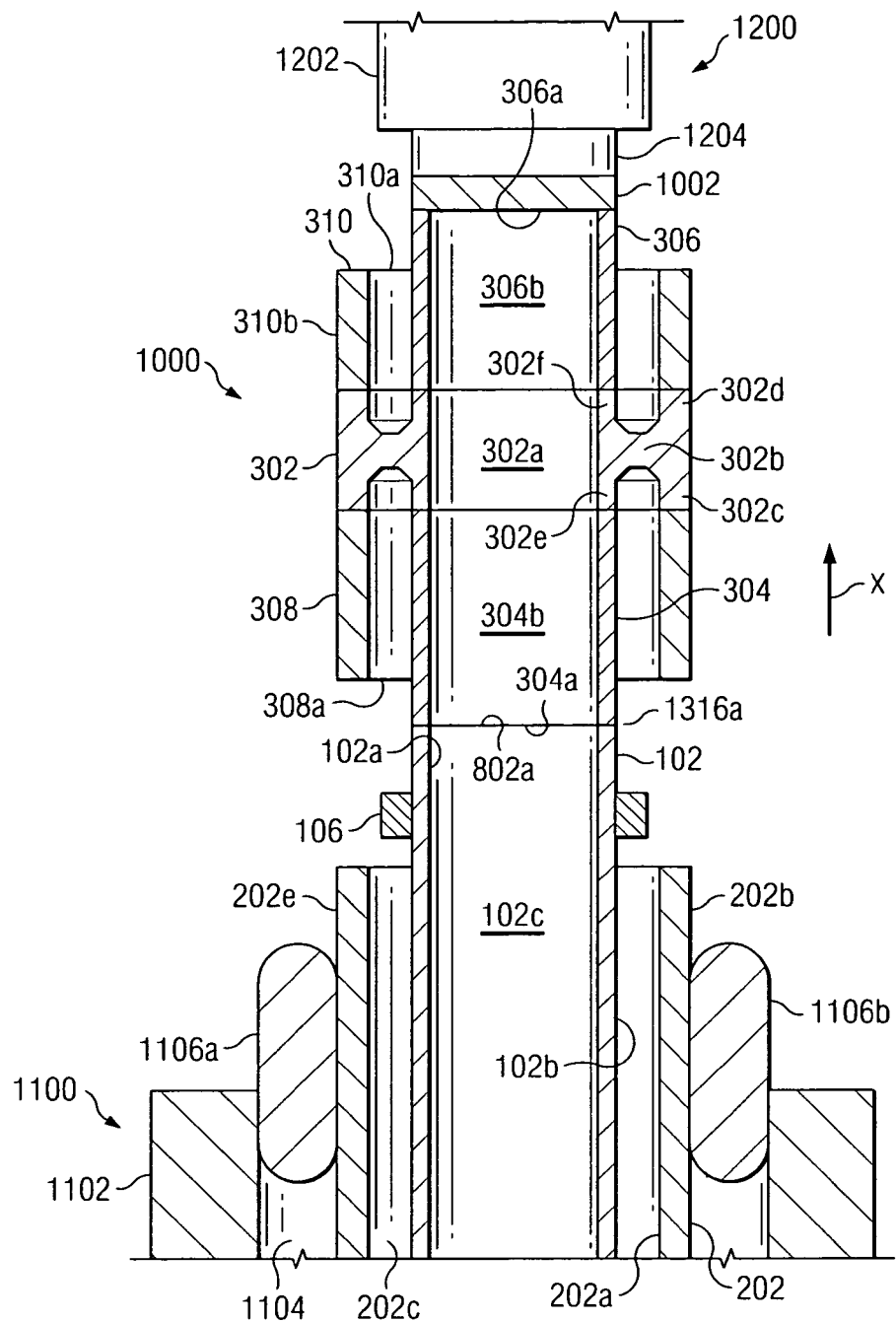

FIG. 13k is a fragmentary cross sectional view illustrating an exemplary embodiment of the plurality of brackets of FIG. 4 removed from between the inner tubular member and outer tubular member of FIG. 13c during the method of FIGS. 13a and 13b.

Figure 13L:
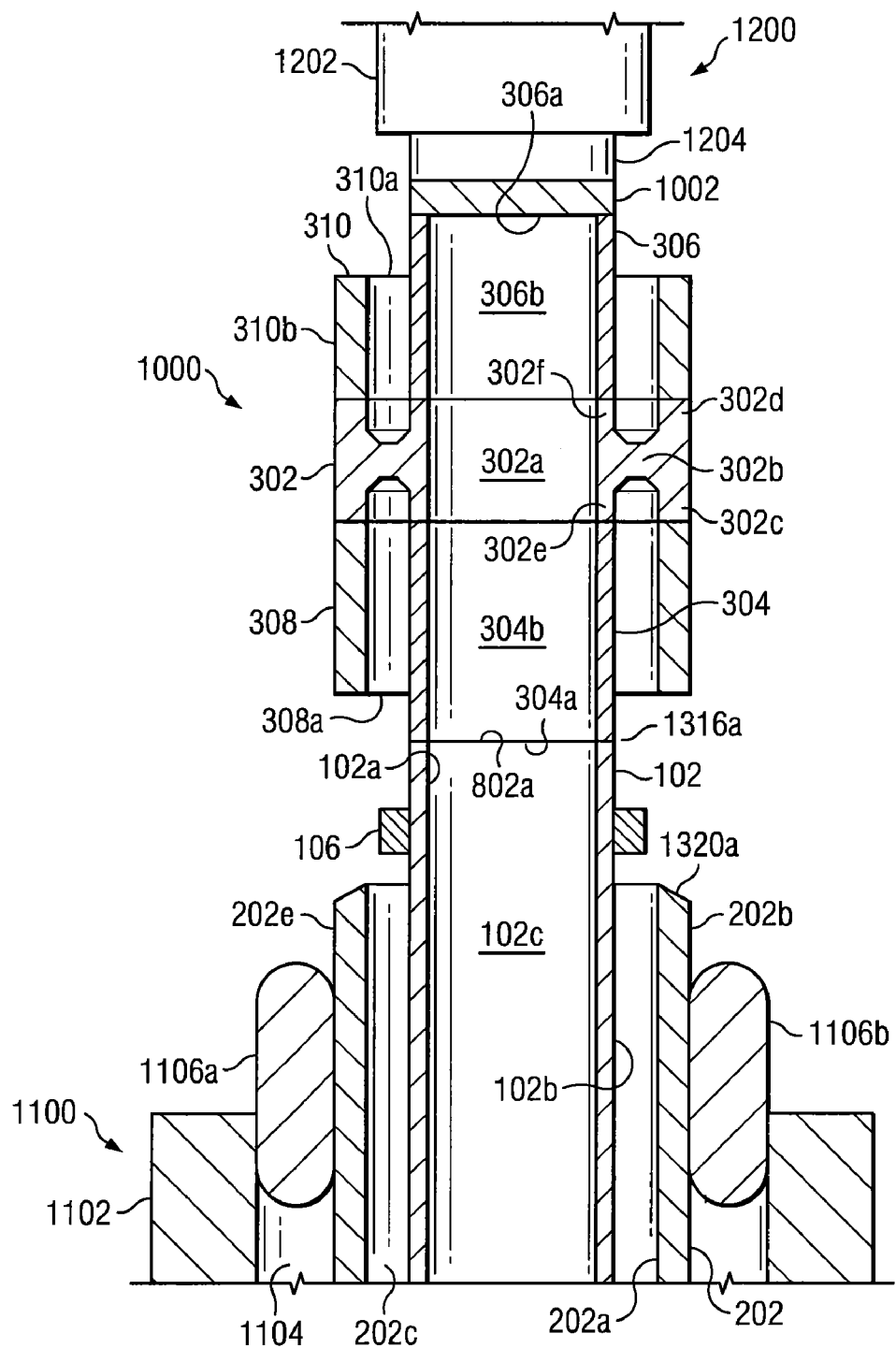

FIG. 13l is a fragmentary cross sectional view illustrating an exemplary embodiment of the beveling of a distal end of the outer tubular member of FIG. 13c during the method of FIGS. 13a and 13b.

Figure 13M:
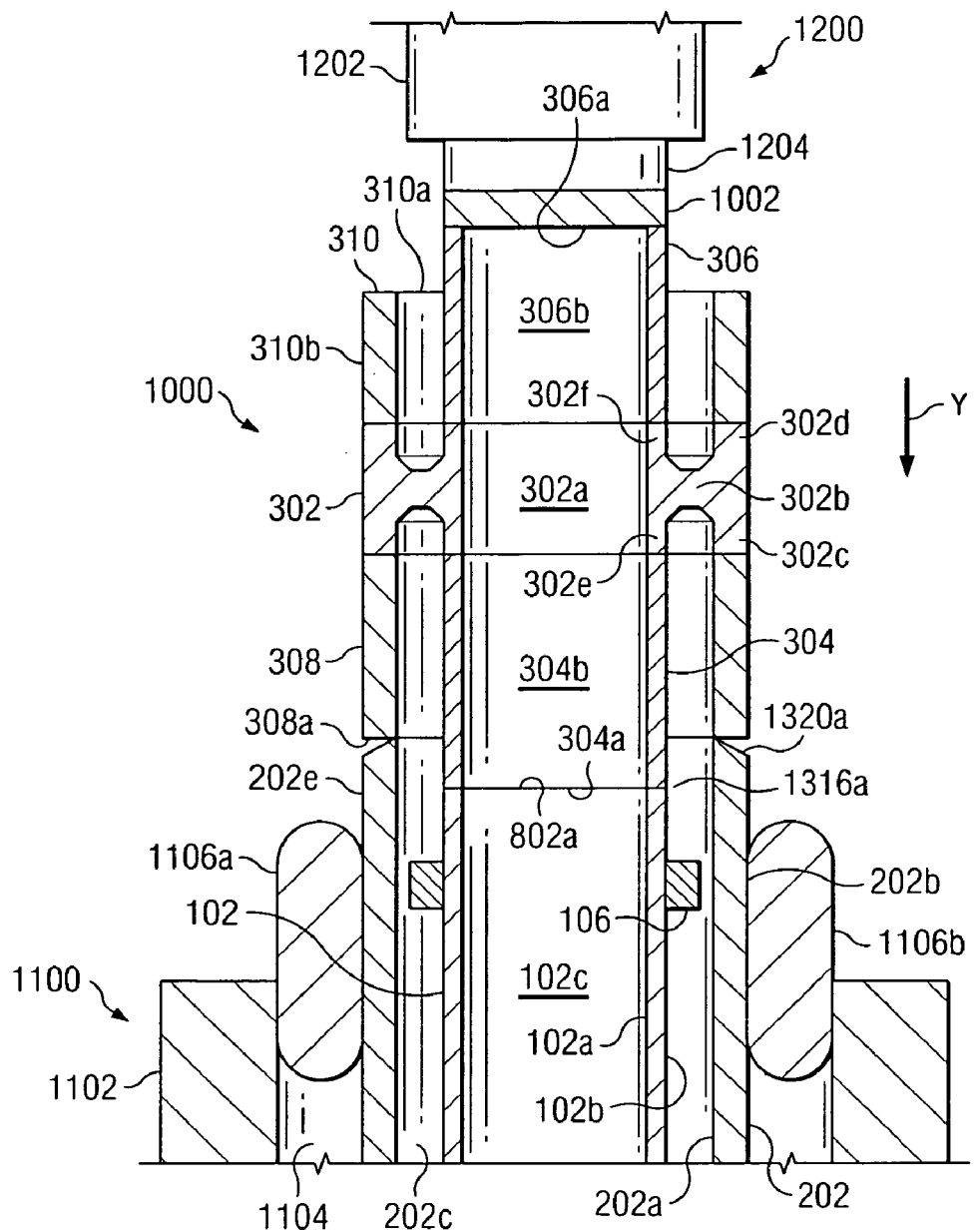
Figure 13M:
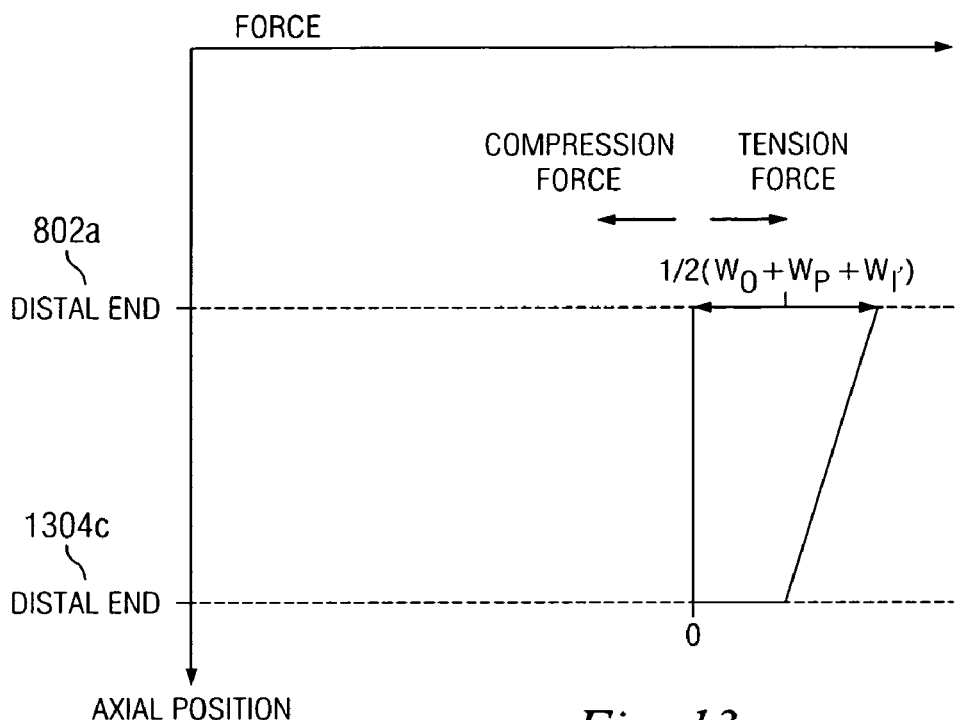
Figure 13M:
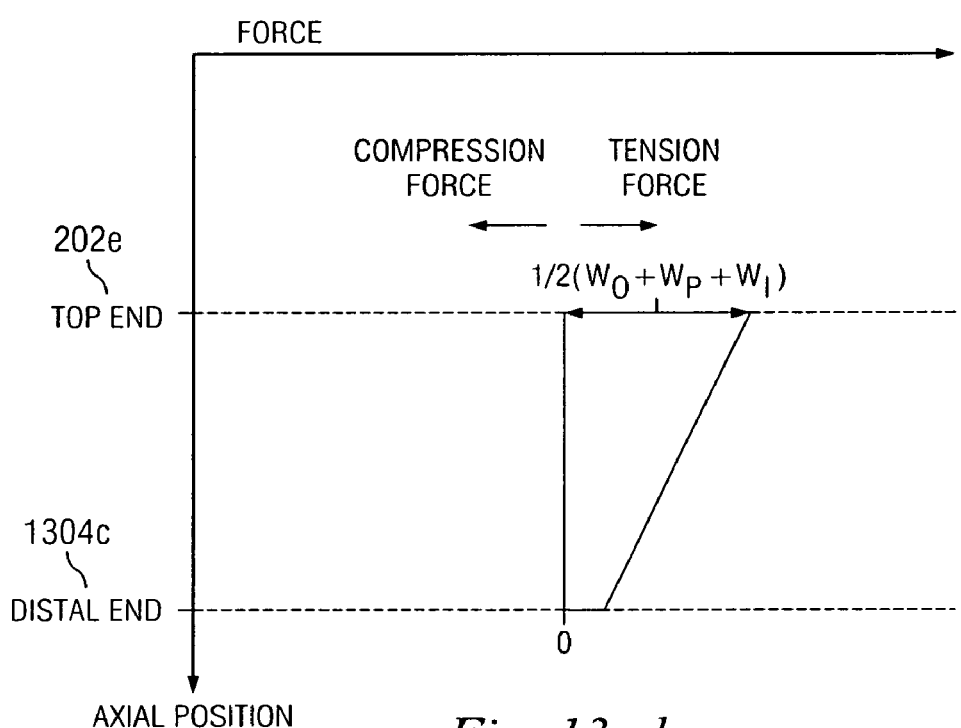

FIG. 13m is a fragmentary cross sectional view illustrating an exemplary embodiment of the coupling member of FIG. 10 being translated towards the inner tubular member and outer tubular member of FIG. 13c during the method of FIGS. 13a and 13b.

Figure 13N:
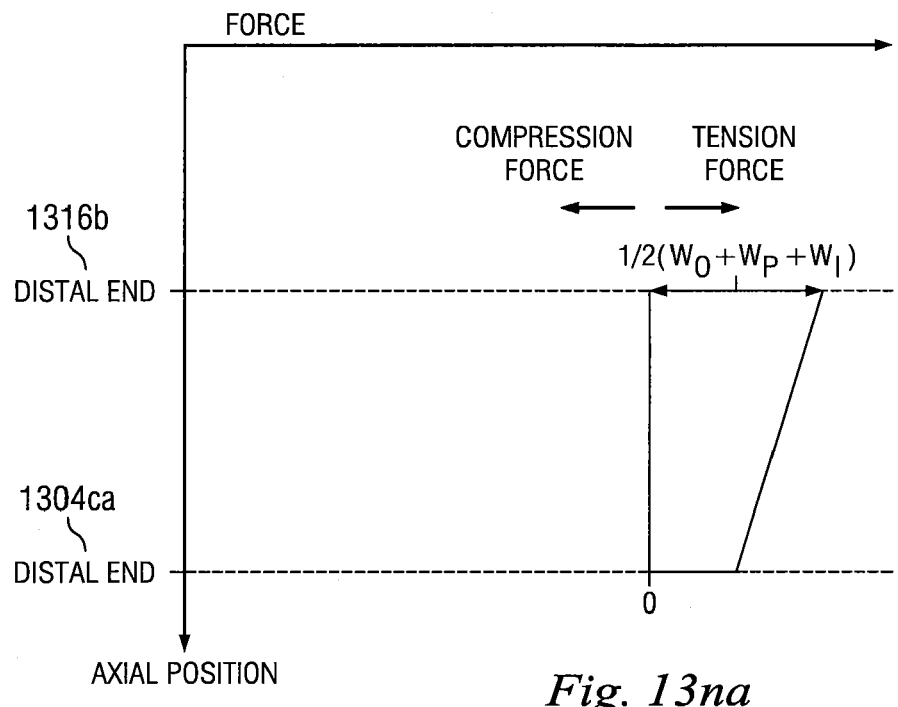
Figure 13N:
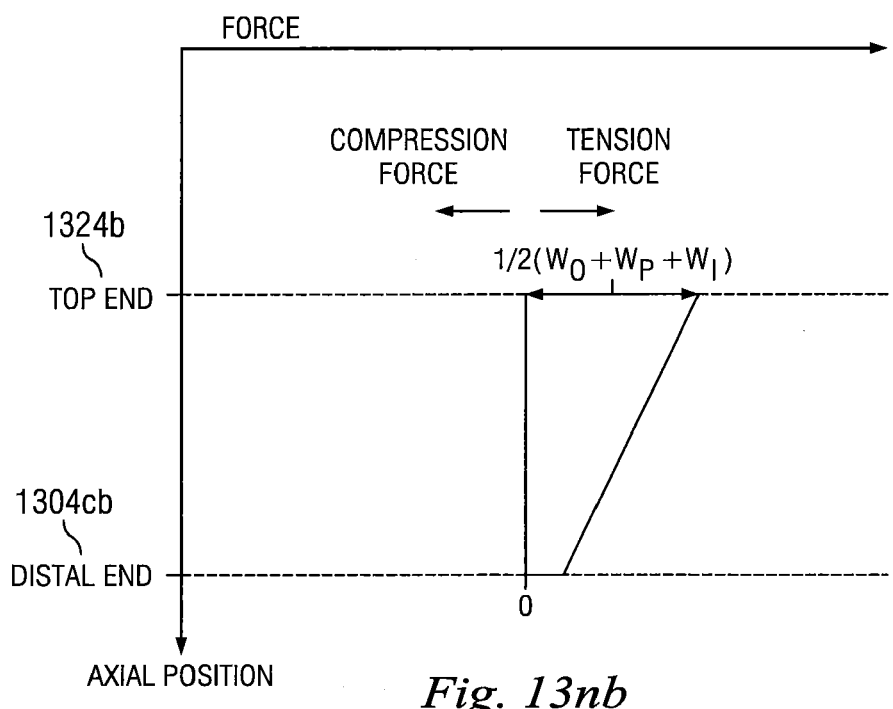

FIG. 13n is a fragmentary cross sectional view illustrating an exemplary embodiment of the coupling member of FIG. 10 being coupled to the outer tubular member of FIG. 13c during the method of FIGS. 13a and 13b.

FIG. 13na is a graph illustrating an exemplary embodiment of the stress distribution in the inner tubular member of FIG. 13n.

FIG. 13nb is a graph illustrating an exemplary embodiment of the stress distribution in the outer tubular member of FIG. 13n.

Figure 12:
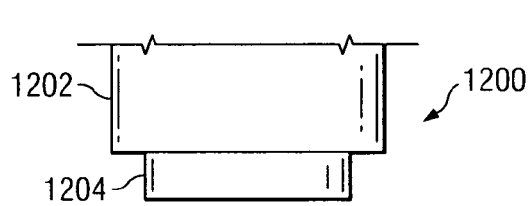
FIG. 12 is an illustration of an exemplary embodiment of a pulling device.

FIG. 13o is a cross sectional view illustrating an exemplary embodiment of the pulling device of FIG. 12 being removed from the coupling member of FIG. 10 during the method of FIGS. 13a and 13b.

FIG. 14 is a cross sectional view illustrating an exemplary embodiment of an outer tubular member.

FIG. 15a is a perspective view illustrating an exemplary embodiment of a plurality of brackets.

FIG. 15b is a cross sectional view illustrating an exemplary embodiment of the plurality of brackets of FIG. 15a.

FIG. 16a is a flow chart illustrating an exemplary embodiment of a portion of a method for coupling tubular members.

FIG. 16b is a flow chart illustrating an exemplary embodiment of another portion of the method for coupling tubular members of FIG. 16a.

Figure 8:
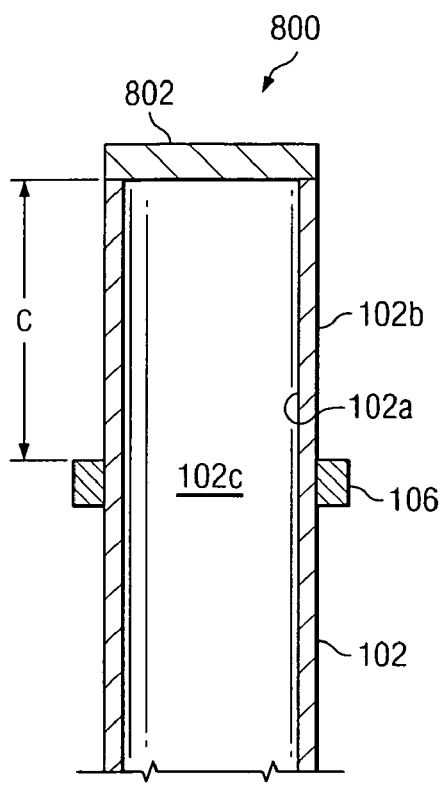
FIG. 8 is a cross sectional view illustrating an exemplary embodiment of an inner tubular member.
Figure 16C:
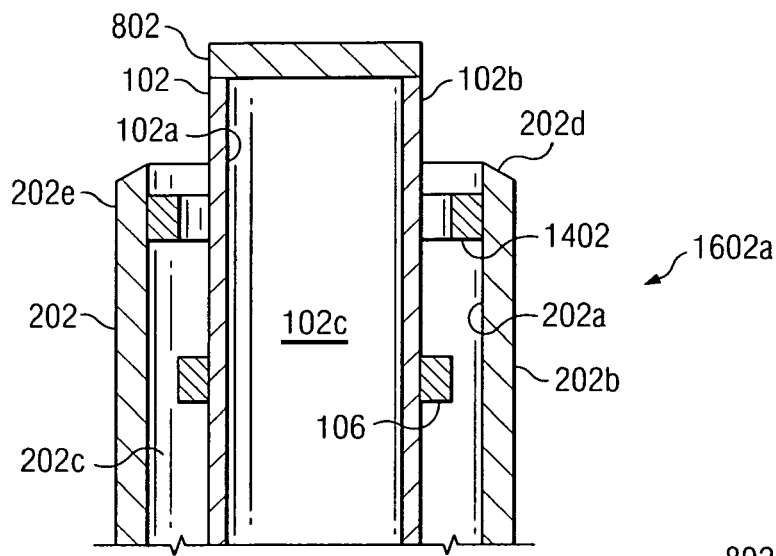
Figure 16C:
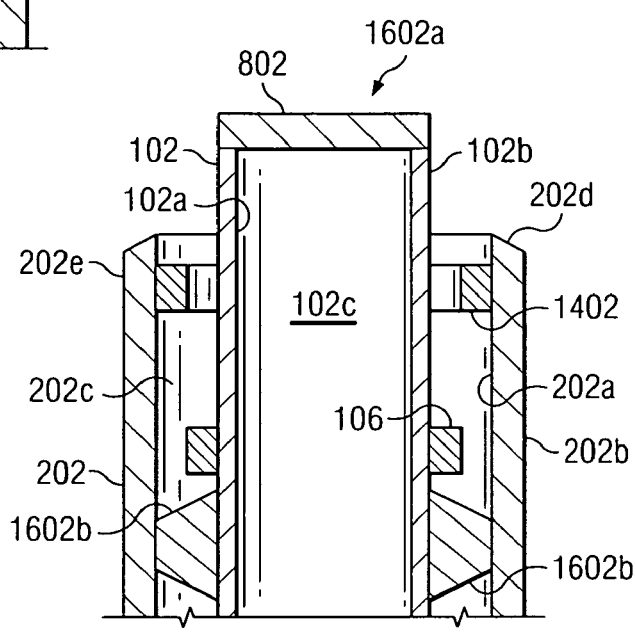
Figure 16C:
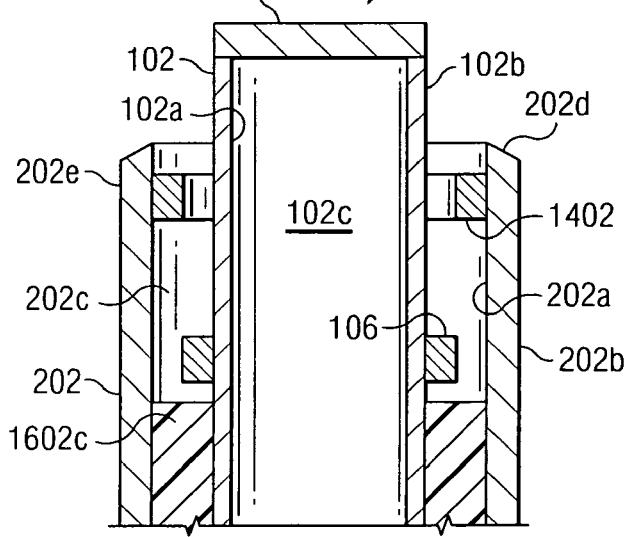

FIG. 16c is a cross sectional view illustrating an exemplary embodiment of the inner tubular member of FIG. 8 and the outer tubular member of FIG. 14 during the method of FIGS. 16a and 16b.

FIG. 16ca is a cross sectional view illustrating an exemplary embodiment of the inner tubular member and the outer tubular member of FIG. 16c including a plurality of annular spacers between them.

FIG. 16cb is a cross sectional view illustrating an exemplary embodiment of the inner tubular member and the outer tubular member of FIG. 16c including an insulating material between them.

Figure 16D:
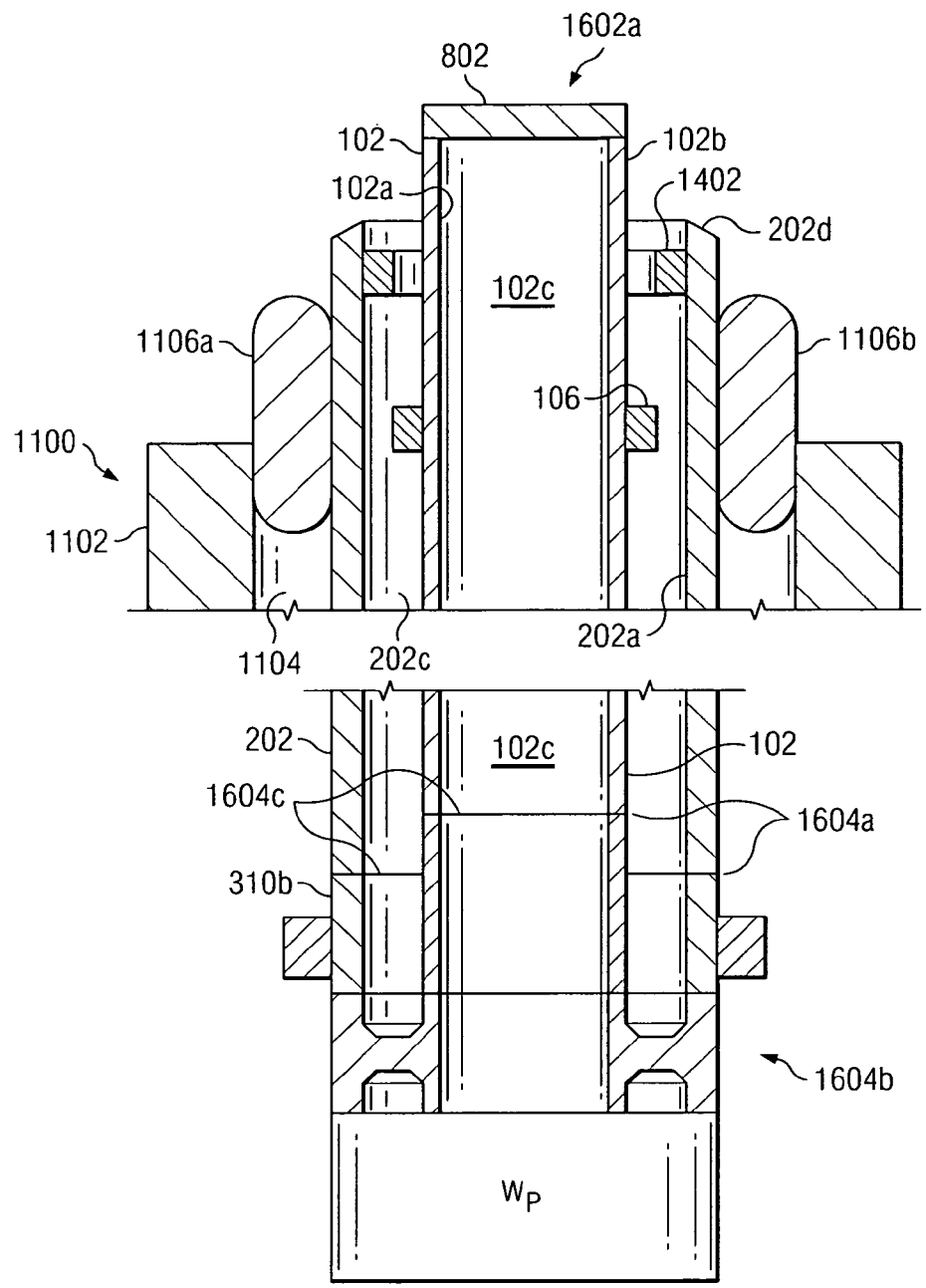
Figure 16D:
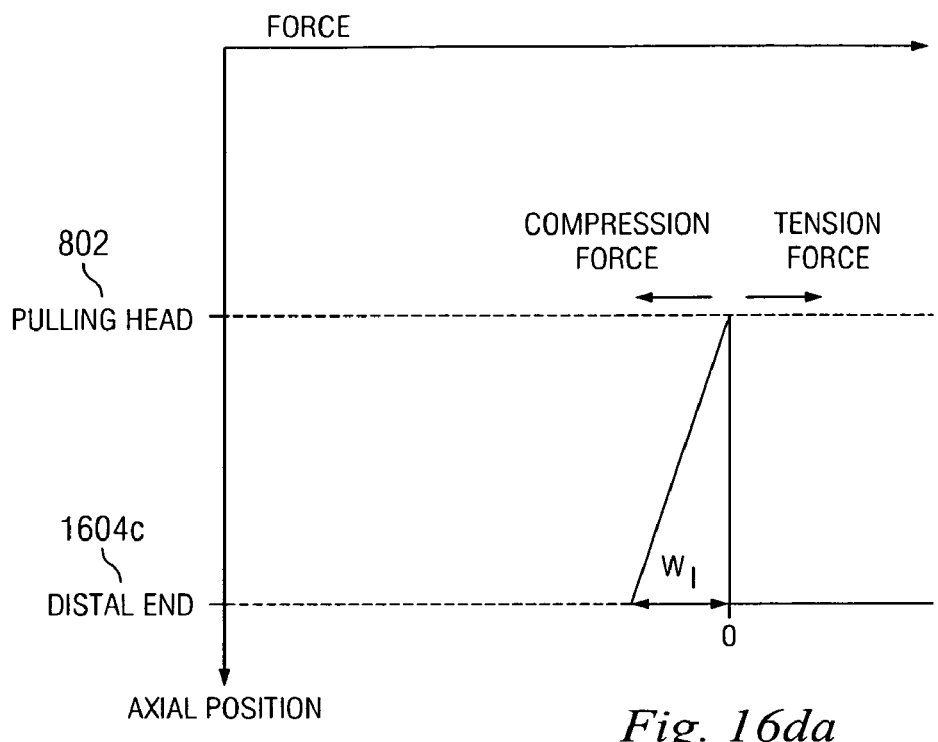
Figure 16D:
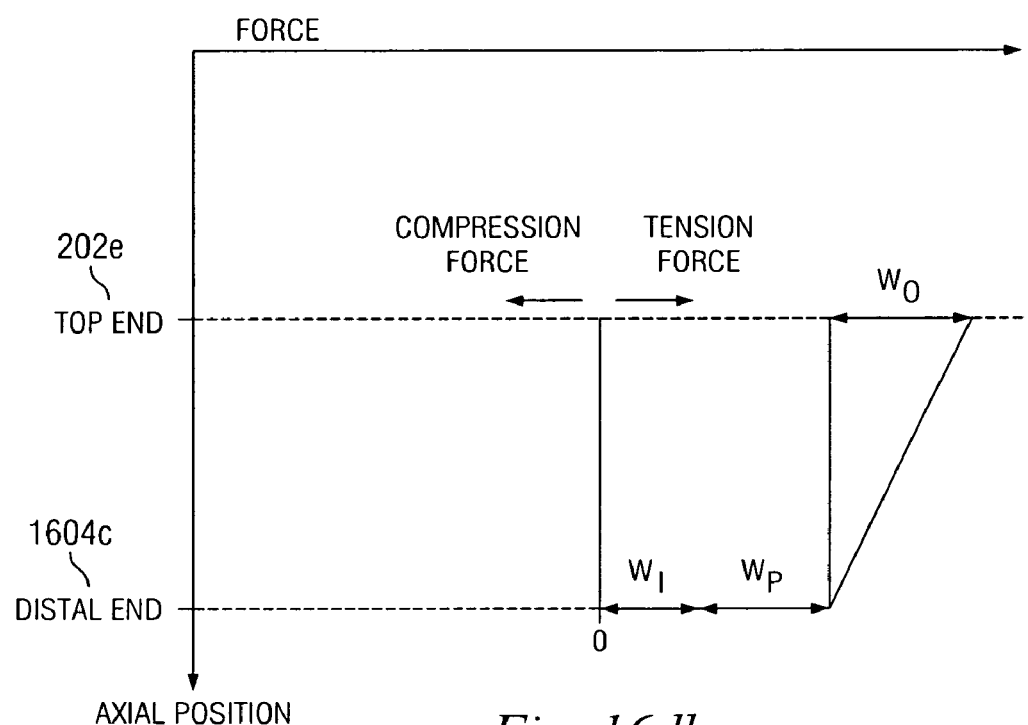

FIG. 16d is a cross sectional view illustrating an exemplary embodiment of the inner tubular member and outer tubular member of FIG. 16c in the friction support tool of FIG. 11 during the method of FIGS. 16a and 16b.

FIG. 16da is a graph illustrating an exemplary embodiment of the stress distribution in the inner tubular member of FIG. 16d.

FIG. 16db is a graph illustrating an exemplary embodiment of the stress distribution in the outer tubular member of FIG. 16d.

Figures 16E, 16F:
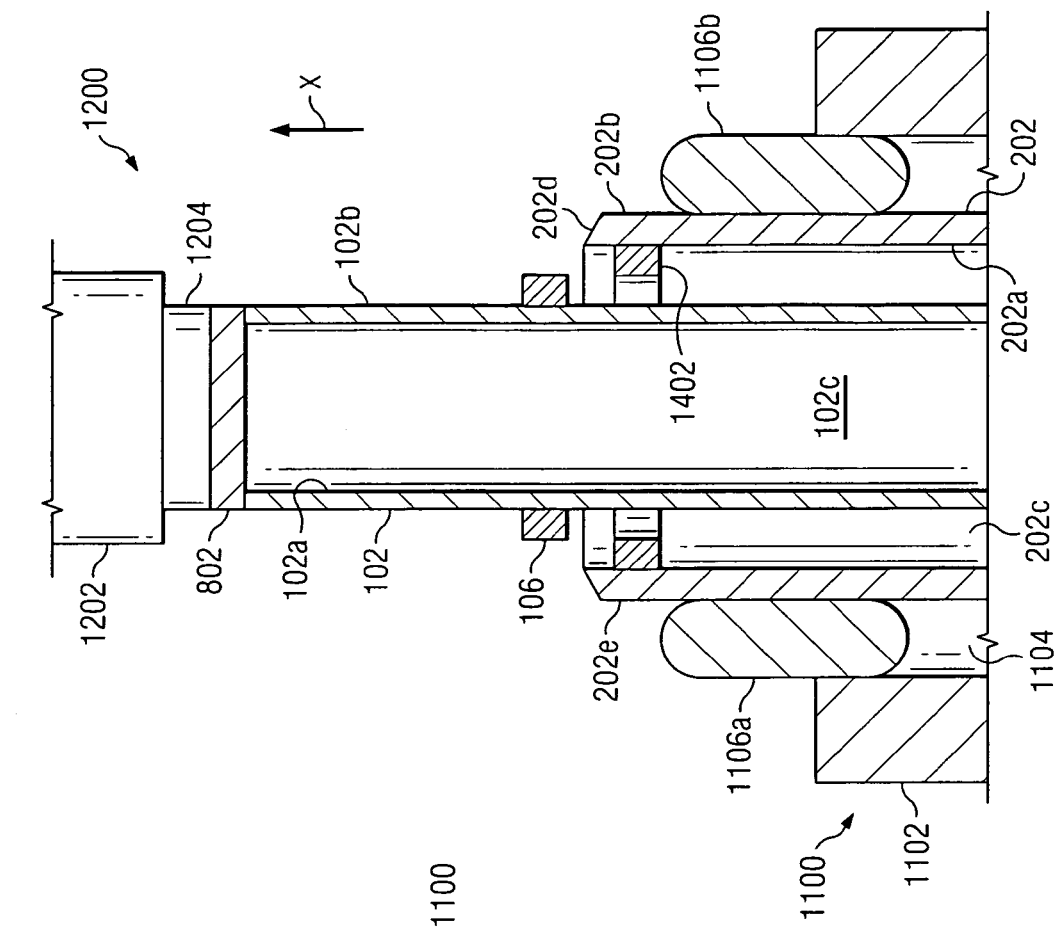
Figure 16F:
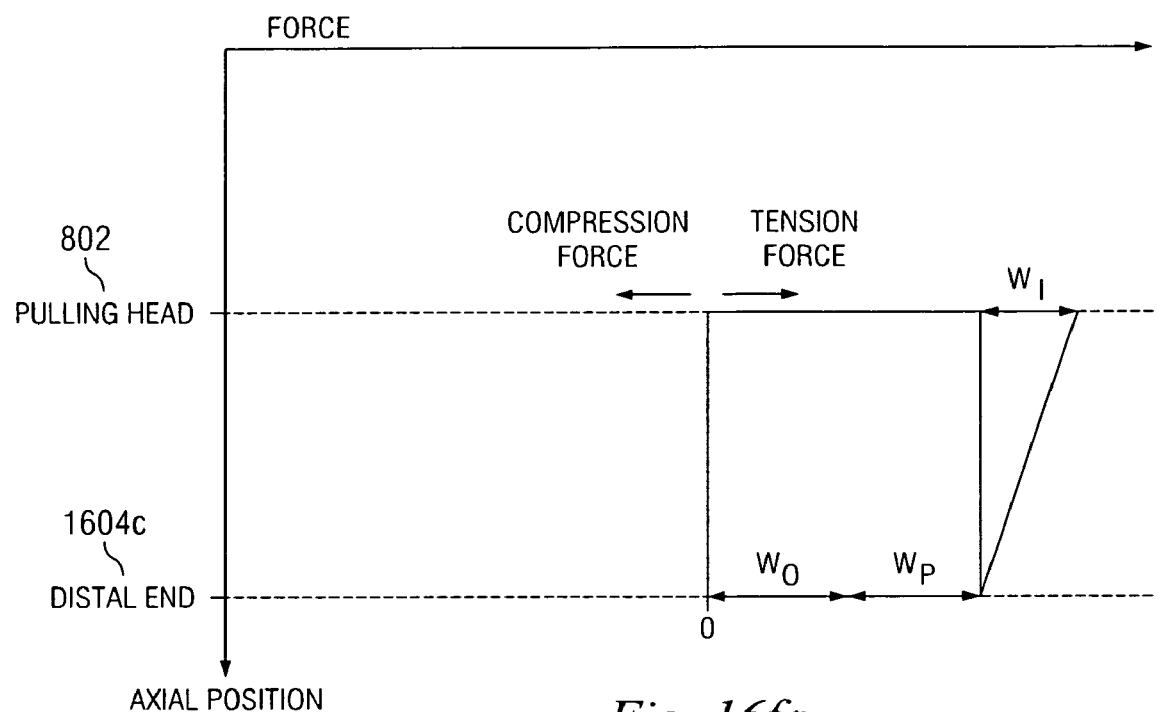
Figure 16F:
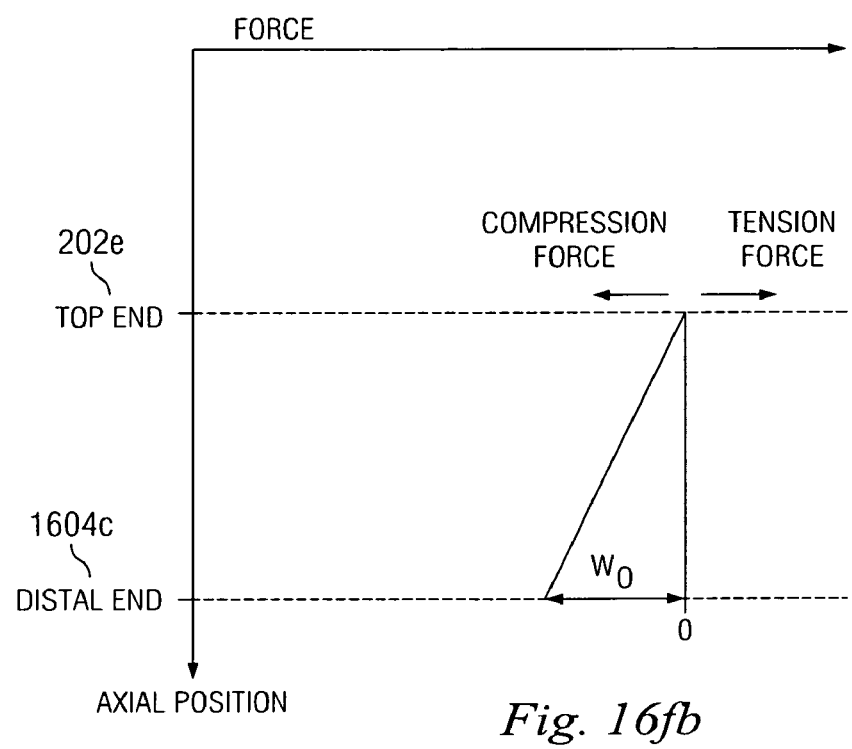

FIG. 16e is a fragmentary cross sectional view illustrating an exemplary embodiment of the pulling device of FIG. 12 engaging the inner tubular member of FIG. 16c during the method of FIGS. 16a and 16b.

FIG. 16f is a fragmentary cross sectional view illustrating an exemplary embodiment of the pulling device of FIG. 12 translating the inner tubular member of FIG. 8 through the outer tubular member of FIG. 14 during the method of FIGS. 16a and 16b.

FIG. 16fa is a graph illustrating an exemplary embodiment of the stress distribution in the inner tubular member of FIG. 16f.

FIG. 16fb is a graph illustrating an exemplary embodiment of the stress distributions in the outer tubular member of FIG. 16f.

FIG. 16g is a fragmentary cross sectional view illustrating an exemplary embodiment of the plurality of brackets of FIG. 15 positioned between the inner tubular member and outer tubular member of FIG. 16c during the method of FIGS. 16a and 16b.

FIG. 16h is a cross sectional view illustrating an exemplary embodiment of the removal of a distal portion of the inner tubular member of FIG. 16c during the method of FIGS. 16a and 16b.

Figure 16I:
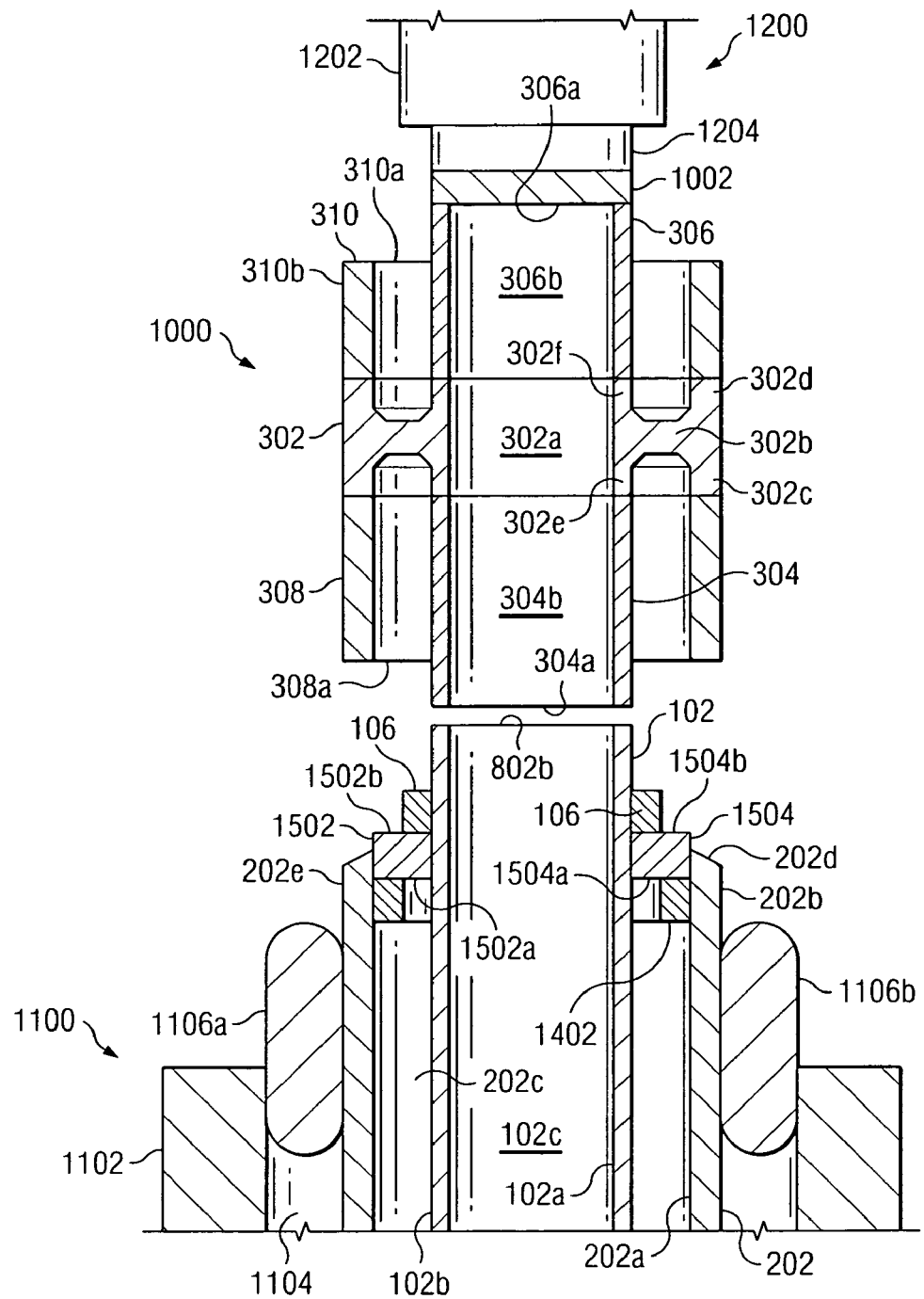

FIG. 16i is a fragmentary cross sectional view illustrating an exemplary embodiment of the coupling member of FIG. 10 being positioned over the inner tubular member and outer tubular member of FIG. 16c during the method of FIGS. 16a and 16b.

Figure 16J:
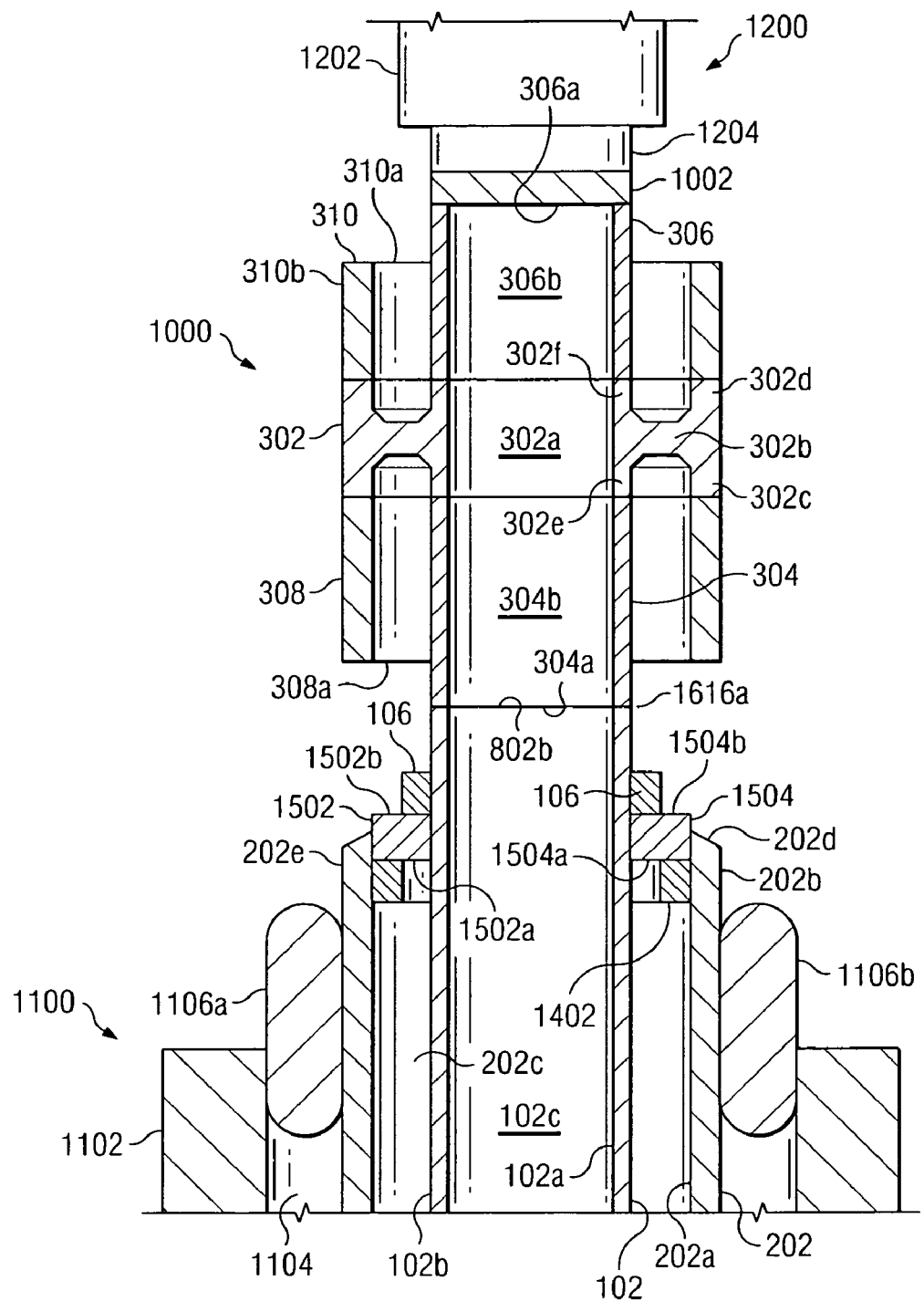

FIG. 16j is a fragmentary cross sectional view illustrating an exemplary embodiment of the coupling member of FIG. 10 being coupled to the inner tubular member of FIG. 16c during the method of FIGS. 16a and 16b.

Figure 16K:
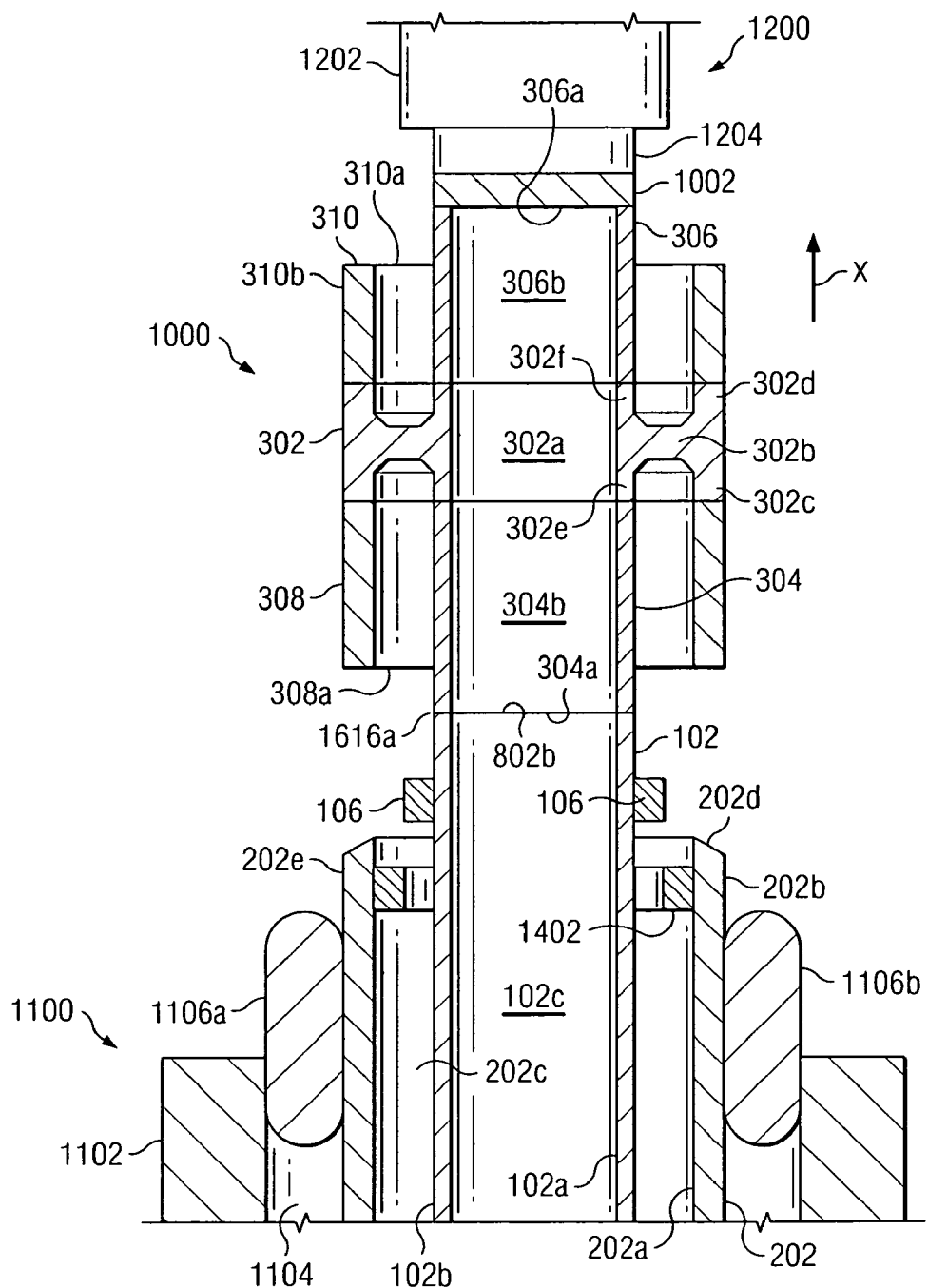

FIG. 16k is a fragmentary cross sectional view illustrating an exemplary embodiment of the plurality of brackets of FIG. 15 removed from between the inner tubular member and outer tubular member of FIG. 16c during the method of FIGS. 16a and 16b.

Figure 16L:
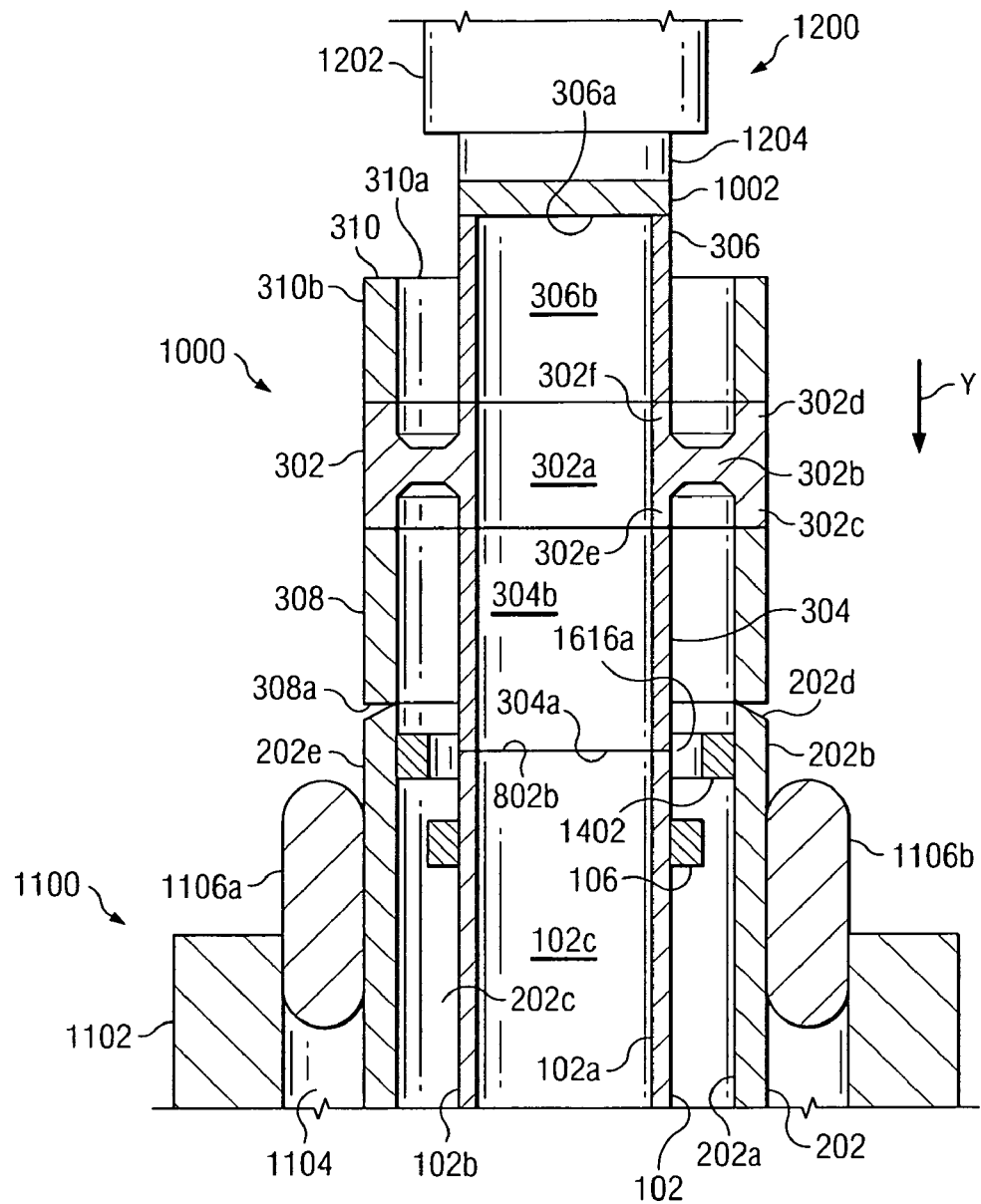
Figure 16L:
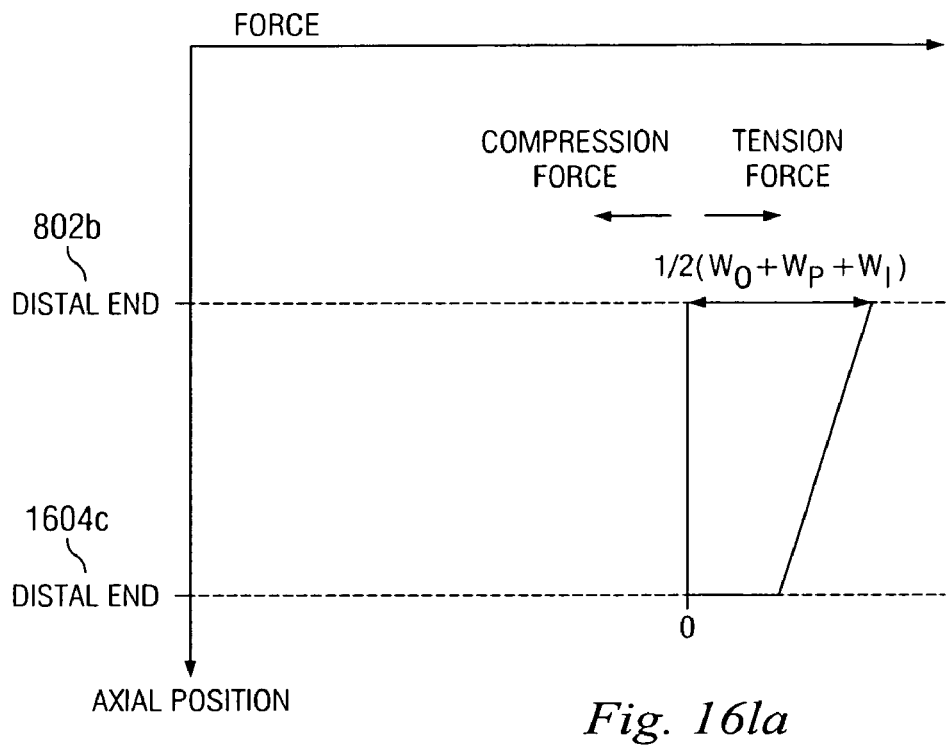
Figure 6L:
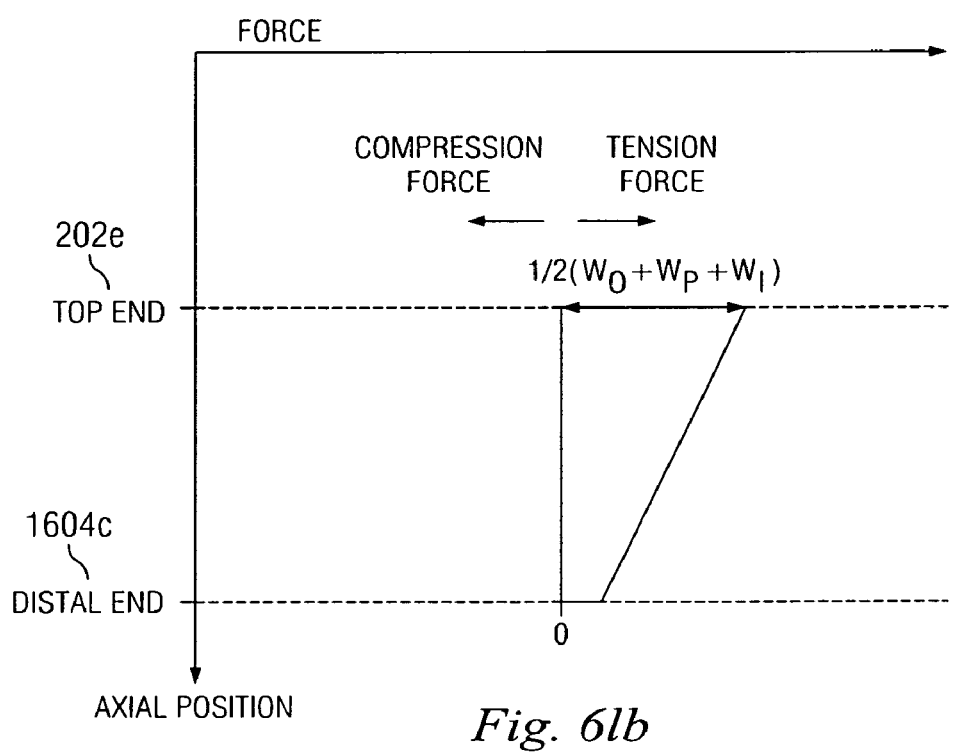

FIG. 16l is a fragmentary cross sectional view illustrating an exemplary embodiment of the coupling member of FIG. 10 being translated towards the inner tubular member and outer tubular member of FIG. 16c during the method of FIGS. 16a and 16b.

Figure 16M:
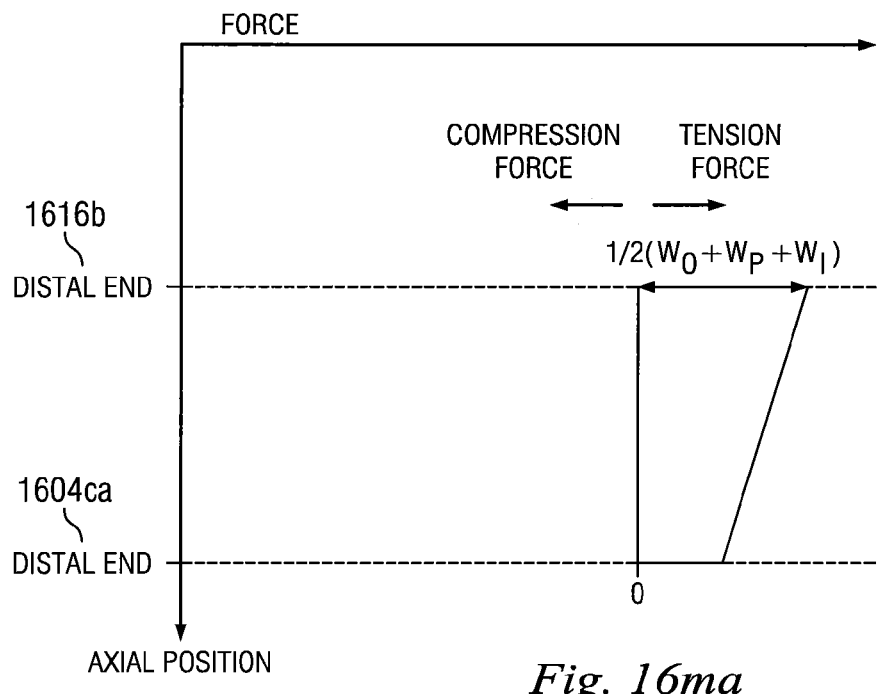
Figure 16M:
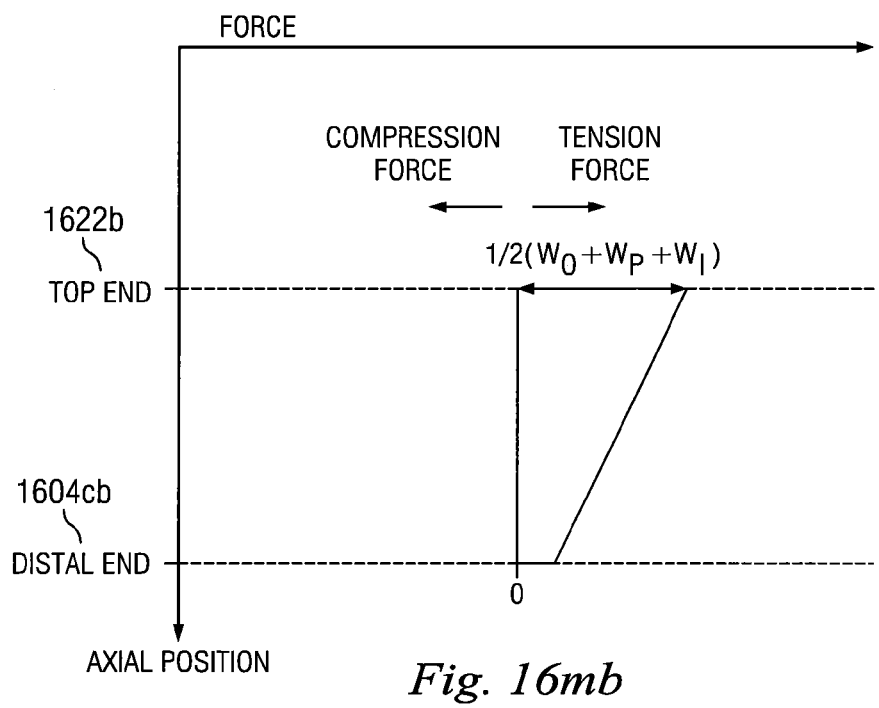

FIG. 16m is a fragmentary cross sectional view illustrating an exemplary embodiment of the coupling member of FIG. 10 being coupled to the outer tubular member of FIG. 16c during the method of FIGS. 16a and 16b.

FIG. 16ma is a graph illustrating an exemplary embodiment of the stress distribution in the inner tubular member of FIG. 16m.

FIG. 16mb is a graph illustrating an exemplary embodiment of the stress distribution in the outer tubular member of FIG. 16m.

FIG. 16n is a fragmentary cross sectional view illustrating an exemplary embodiment of the pulling device of FIG. 12 being removed from the coupling member of FIG. 10 during the method of FIGS. 16a and 16b.

Figure 17:
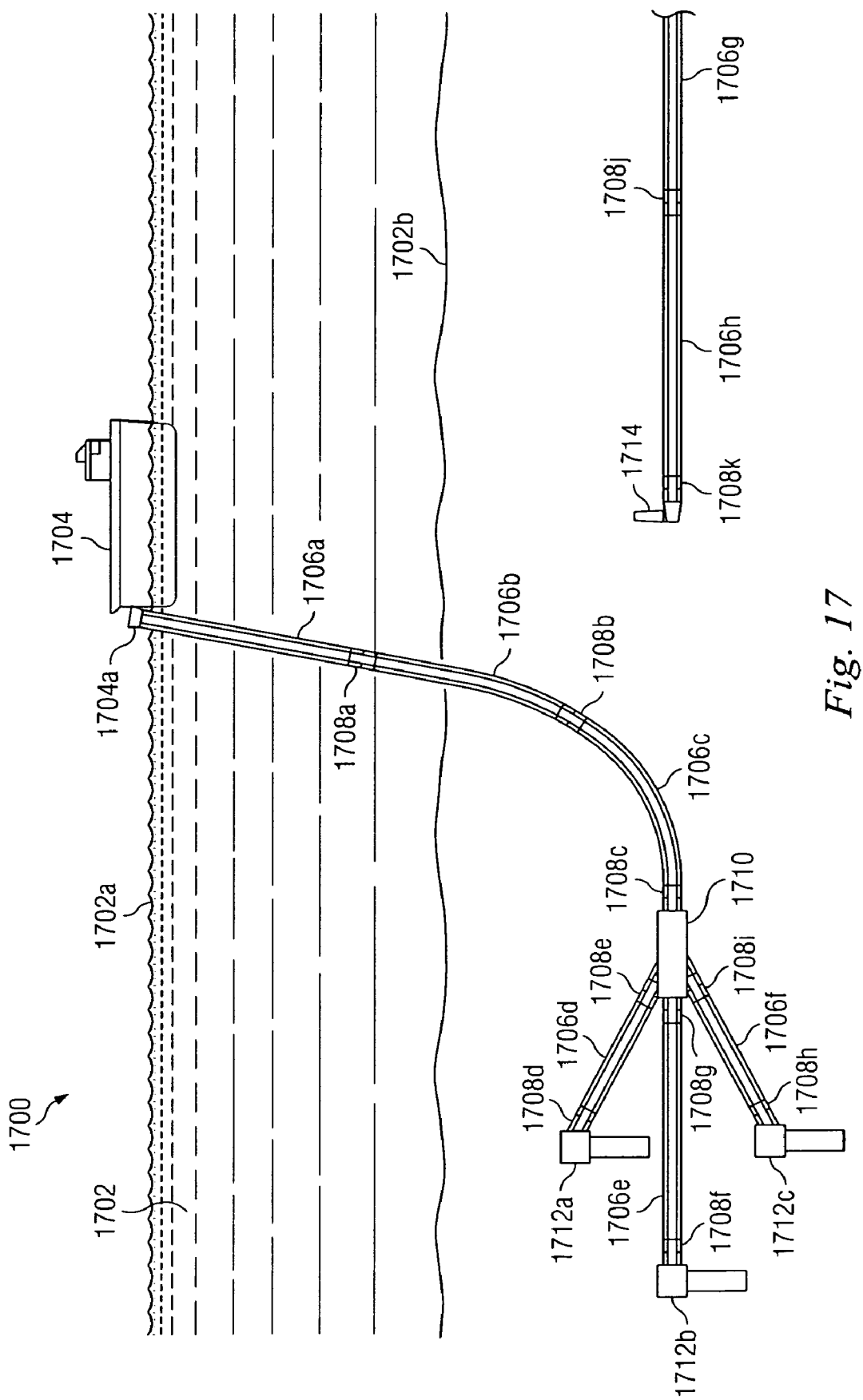

FIG. 17 is an illustration of an exemplary embodiment of a plurality of double walled pipe sections suspended from an offshore vessel and coupled together by a plurality of coupling members.

DETAILED DESCRIPTION

Figure 1:
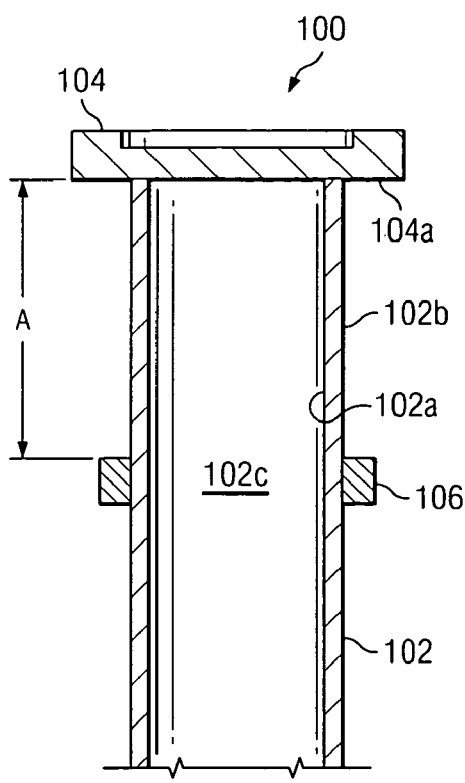
FIG. 1 is a cross sectional view illustrating an exemplary embodiment of an inner tubular member.

Referring now to FIG. 1, an inner tubular member 100 includes an elongated tubular body 102 having an inner surface 102a, and outer surface 102b opposite the inner surface 102a, and defining a passageway 102c along its length. A pulling head 104 is positioned on a distal end of inner tubular member 100 and includes an engagement surface 104a. A collar 106 is positioned on the outer surface 102b in a spaced apart relationship with the pulling head 104, defining a length A of elongated tubular body 102 between the pulling head 104 and an endface of the collar 106. In an exemplary embodiment, the collar 106 is an tubular collar that runs around the circumference of the inner tubular member 100. In an exemplary embodiment, the inner tubular member 100 has a weight $W_I$.

Figure 2:
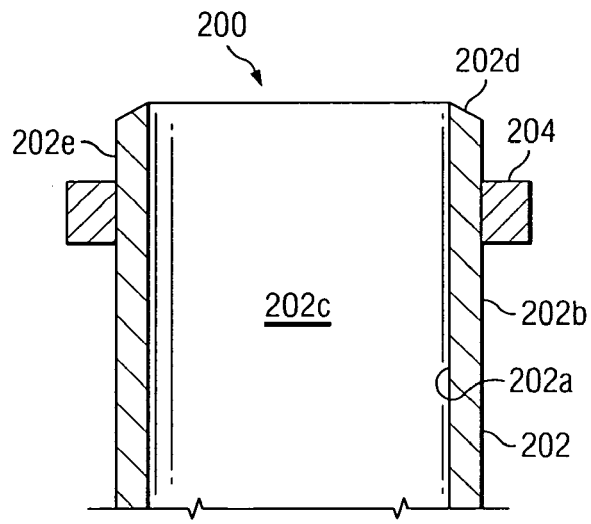
FIG. 2 is a cross sectional view illustrating an exemplary embodiment of an outer tubular member.

Referring now to FIG. 2, an outer tubular member 200 includes an elongated tubular body 202 having an inner surface 202a, an outer surface 202b opposite the inner surface 202a, and defining a passageway 202c along its length. A beveled surface 202d is positioned on a top end 202e of outer tubular member 200. A collar 204 is positioned on the outer surface 202b adjacent the beveled surface 202d. In an exemplary embodiment, the collar 204 is an tubular collar that runs around the circumference of the outer tubular member 200. In an exemplary embodiment, the outer tubular member 200 has a weight $W_O$.

Figure 3:
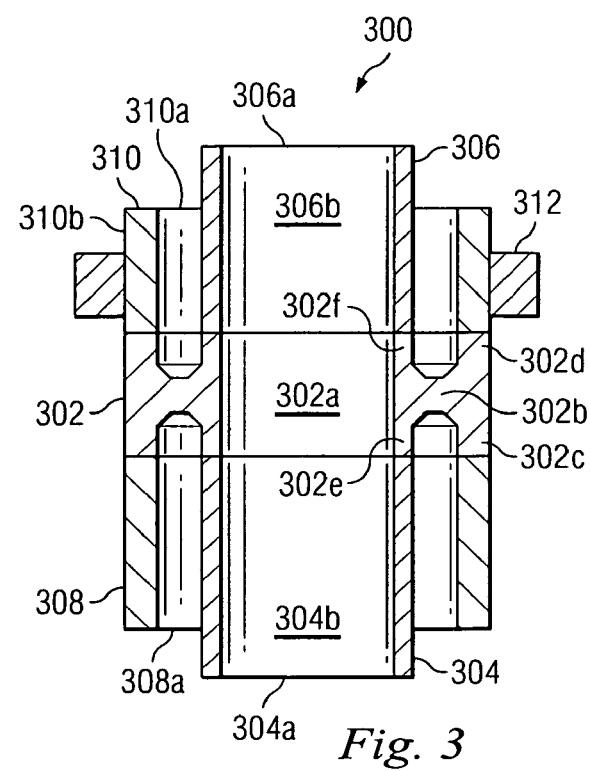
FIG. 3 is a cross sectional view illustrating an exemplary embodiment of a coupling member.

Referring now to FIG. 3, a coupling member 300 includes an tubular support member 302 defining a passageway 302a along its length. Tubular support member 302 includes a tubular base 302b with a plurality of outer lips 302c and 302d extending in opposite directions from an outer edge of the base 302b and a plurality of inner lips 302e and 302f extending in opposite directions from an inner edge of the base 302b. A inner coupling tube 304 extends from the inner lip 302e, includes a distal end 304a, and defines a passageway 304b along its length. A inner coupling tube 306 extends from the inner lip 302f, includes a distal end 306a, and defines a passageway 306b along its length. Passageways 304b, 302a, and 306b provide a passageway throughout the length of coupling member 300. An outer coupling tube 308 extends from the outer lip 302c and includes a distal end 308a. An outer coupling tube 310 extends from the outer lip 302d and includes a distal end 310a and an outer surface 310b. A coupling member collar 312 is positioned on the outer surface 310b of outer coupling tube 310. In an exemplary embodiment, the coupling member collar 312 is an tubular collar that runs around the circumference of coupling member 300. In an exemplary embodiment, the coupling member 300 may be a bulkhead section. In an exemplary embodiment, support member 302 may be a bulkhead.

Figure 4A:
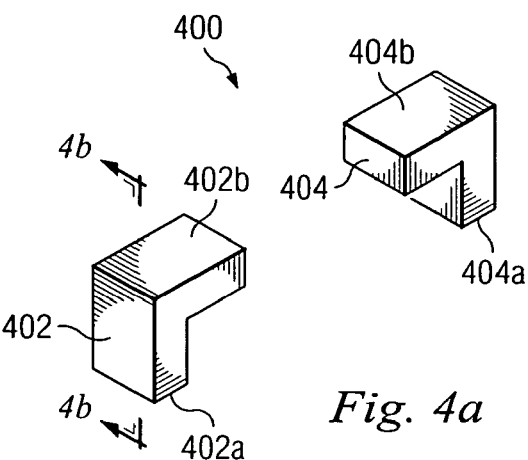
FIG. 4a is a perspective view illustrating an exemplary embodiment of a plurality of brackets.
Figure 4B:
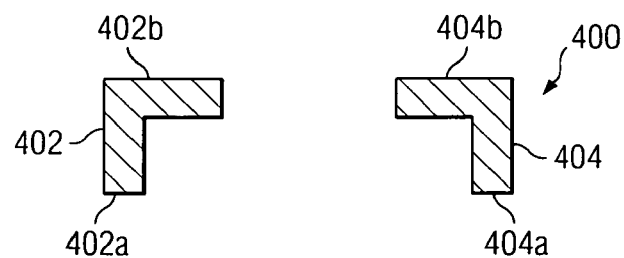

Referring now to FIGS. 4a and 4b, a plurality of brackets 400 include a bracket 402 and a bracket 404. Bracket 402 is substantially L-shaped and includes a collar engaging surface 402a and a collar support surface 402b. Bracket 404 is substantially L-shaped and includes a collar engaging surface 404a and a collar support surface 404b. In an alternative embodiment, the plurality of brackets 400 may be combined to provide an annular bracket with a top surface including collar support surfaces 402b and 404b and a bottom surface including collar engaging surface 402a and 404a.

Figure 5A:
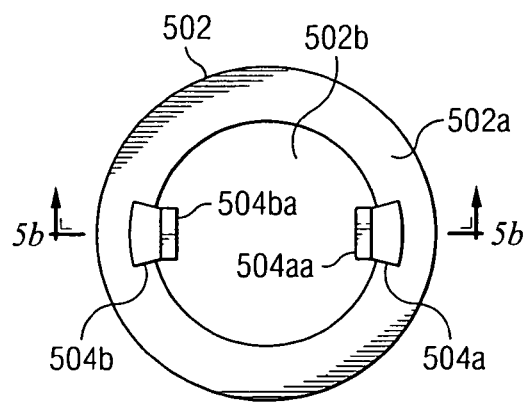
FIG. 5a is a top view illustrating an exemplary embodiment of a hang-off table.
Figure 5B:
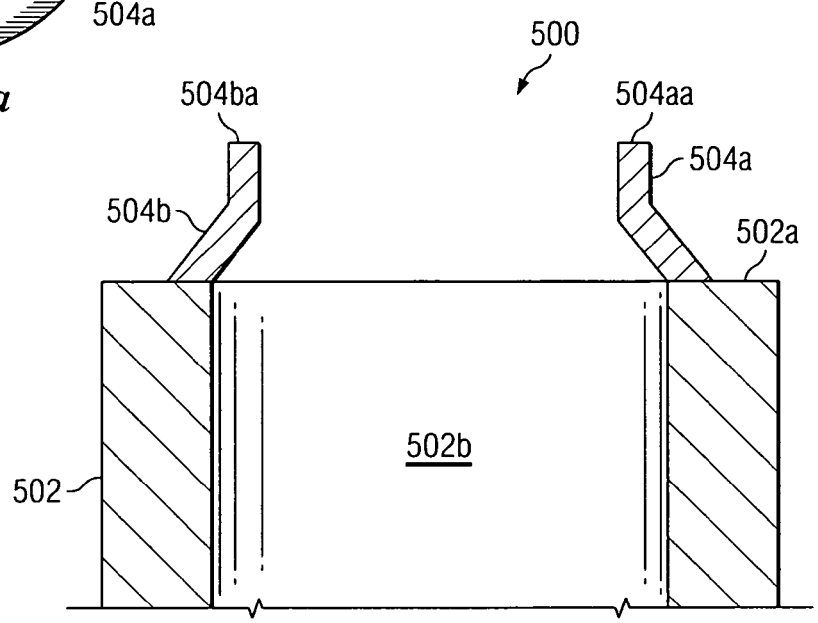

Referring now to FIGS. 5a and 5b, a hang-off table 500 includes a base 502 having a top surface 502a and defining a passageway 502b through the base 502. A plurality of support beams 504a and 504b extend from the top surface 502a of the base 502 and include respective engagement surfaces 504aa and 504ba on their distal ends. In an alternative embodiment, the plurality of support beams 504a and 504b may be combined to provide an annular support surface with a circular engagement surface including engagement surfaces 504aa and 504ba.

Figure 6A:
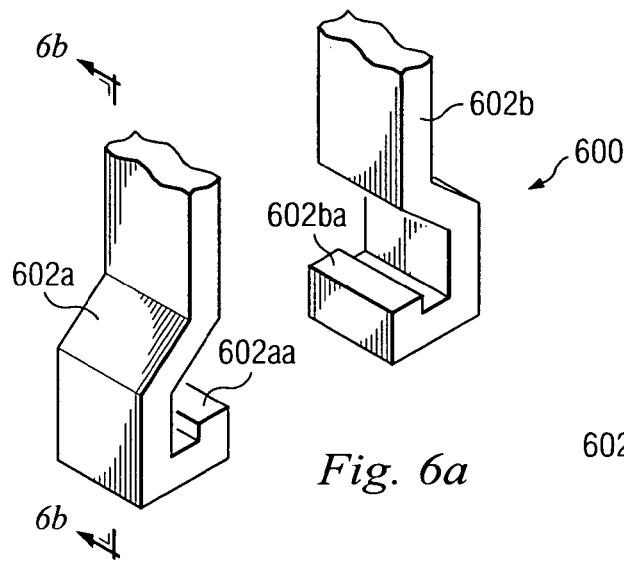
FIG. 6a is a perspective view illustrating an exemplary embodiment of a lowering clamp.
Figure 6B:
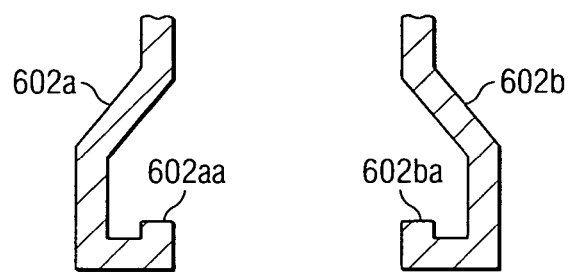

Referring now to FIGS. 6a and 6b, a lowering clamp 600 includes a plurality of support arms 602a and 602b having respective engagement surfaces 602aa and 602ba on their distal ends. In an alternative embodiment, the plurality of support arms 602a and 602b may be combined to provide an annular support member with a circular engagement surface including engagement surfaces 602aa and 602ba.

Figure 7A:
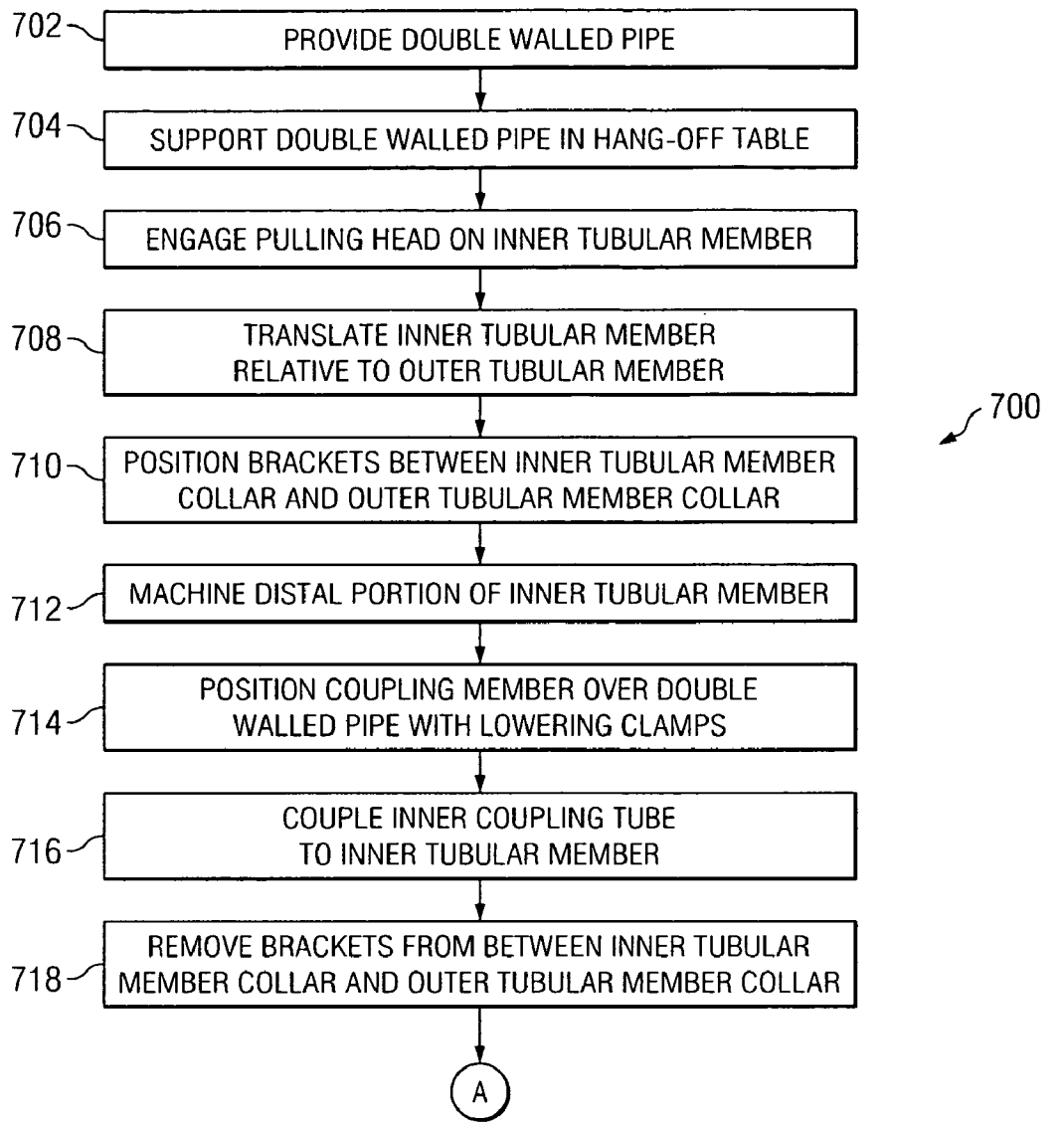
FIG. 7a is a flow chart illustrating an exemplary embodiment of a portion of a method for coupling tubular members.
Figure 7B:
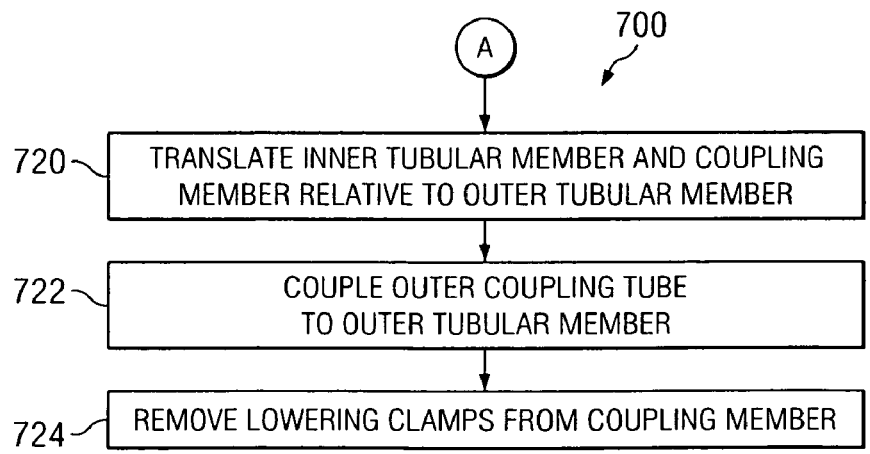
Figure 7D:
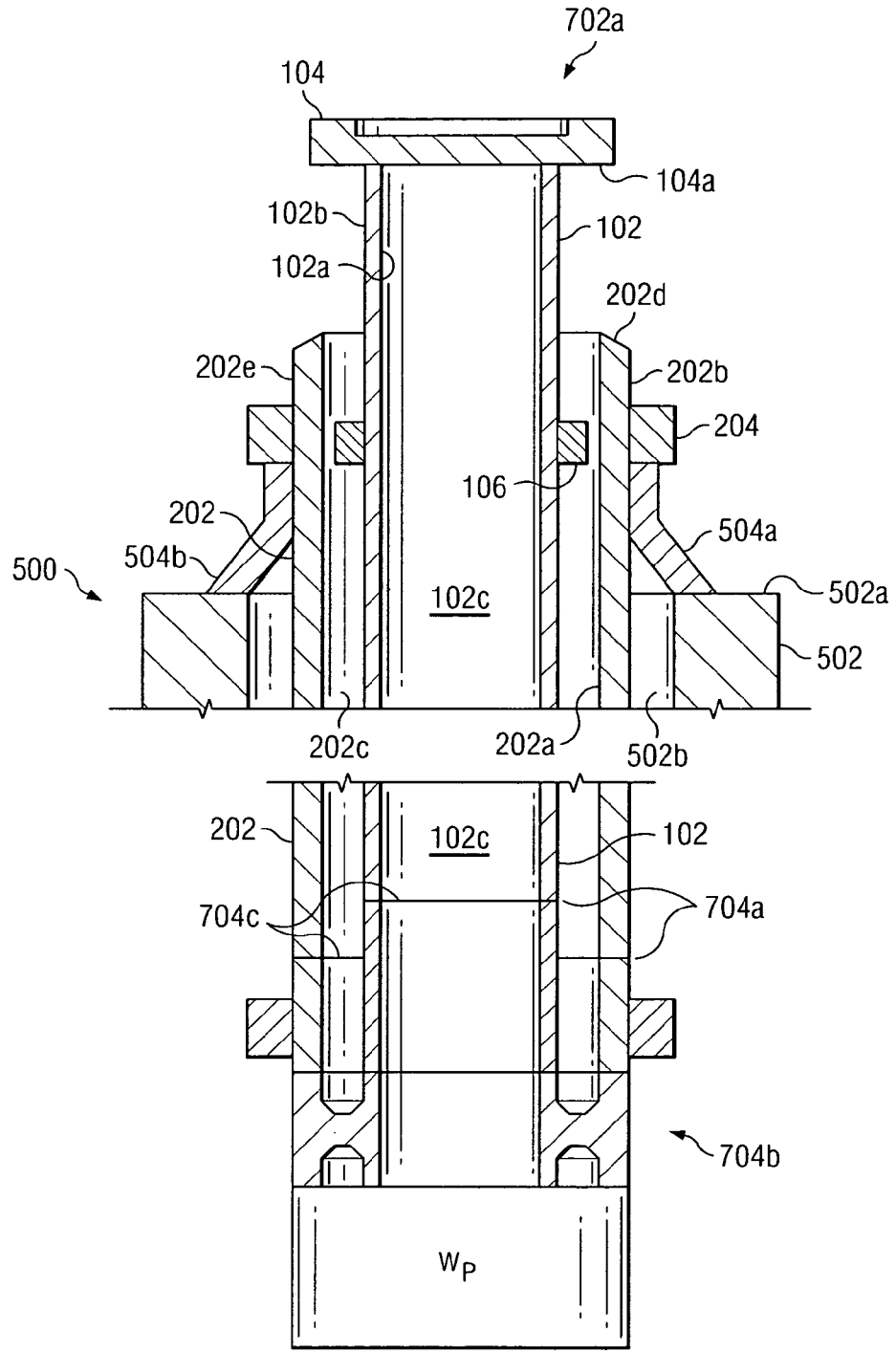
FIG. 7d is a cross sectional view illustrating an exemplary embodiment of the inner tubular member and outer tubular member of FIG. 7c in the hang-off table of FIG. 5 during the method of FIGS. 7a and 7b.
Figure 7D:
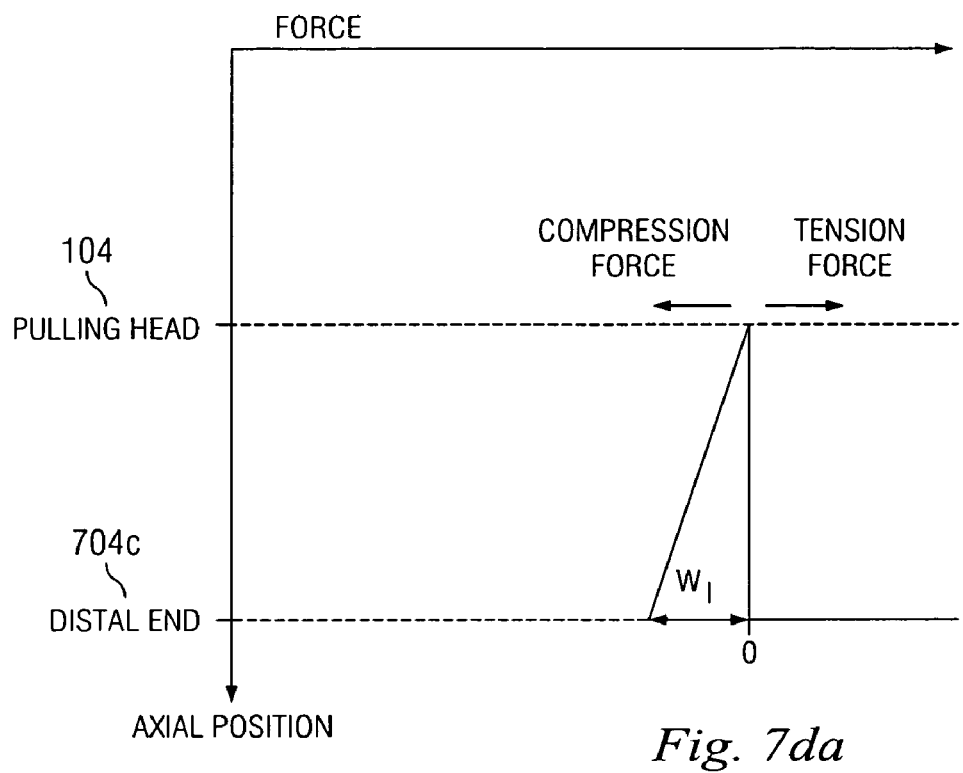
Figure 7D:
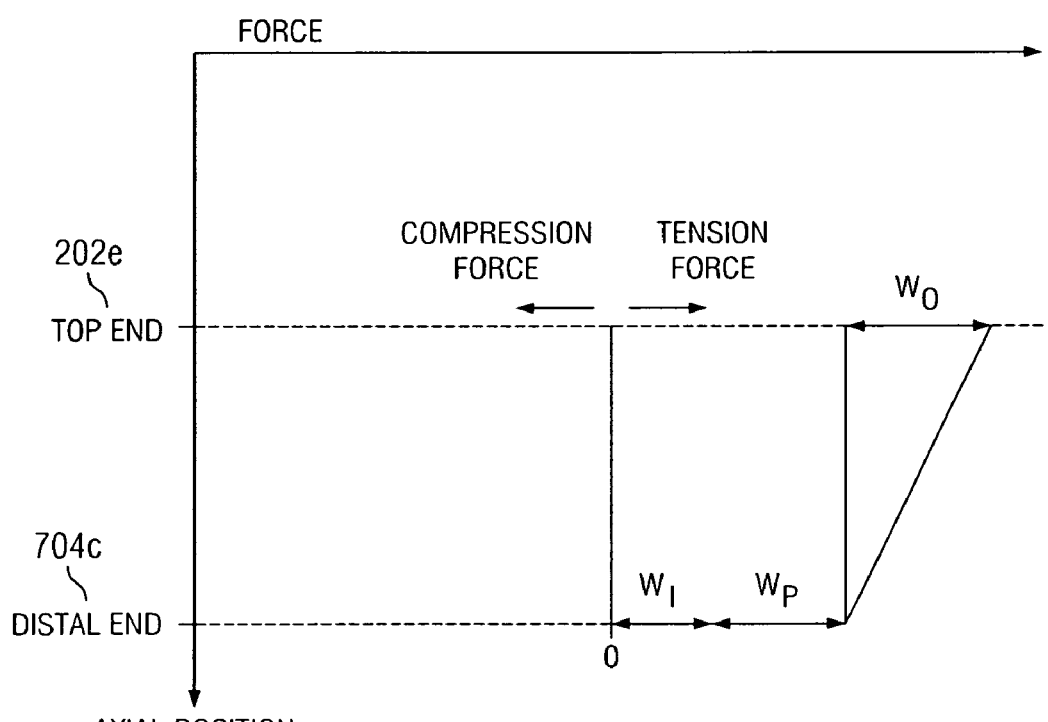

Referring now to FIGS. 7a and 7b, a method 700 for coupling tubular members is illustrated. In an exemplary embodiment, the method 700 is carried out on an off shore vessel.

Referring now to FIGS. 7a, 7c, 7ca, and 7cb, the method 700 begins at step 702 where a double-walled pipe 702a is provided. Double-walled pipe 702a includes the inner tubular member 100 positioned coaxially with the outer tubular member 200 in passageway 202c, with pulling head 104 extending out past the top end 202e of outer tubular member 200 that includes beveled surface 202d. In an exemplary embodiment, inner tubular member 100 is coupled to outer tubular member 200 by a plurality of annular spacers 702b, as illustrated in FIG. 7ca, the spacers 702b positioned in the passageway 202c between inner surface 202a on outer tubular member 200 and outer surface 102b on inner tubular member 100, which allow axial motion of the inner tubular member 100 relative to the outer tubular member 200 but keeps the annular spacing between inner tubular member 100 and outer tubular member 200 in passageway 202c substantially constant. In an exemplary embodiment, inner tubular member 100 is coupled to outer tubular member 200 by a thermally insulating material 702c, as illustrated in FIG. 7cb, the insulating material 702c positioned in the passageway 202c between inner surface 202a on outer tubular member 200 and outer surface 102b on inner tubular member 100, which allows axial motion of the inner tubular member 100 relative to the outer tubular member 200 but keeps the annular spacing between inner tubular member 100 and outer tubular member 200 in passageway 202c substantially constant.

Referring now FIGS. 5a, 5b, 7a, 7d, 7da and 7db, the method 700 proceeds to step 704, where the double-walled pipe 702a is supported in the hang off table 500. Double-walled pipe 702a is positioned in passageway 502b on hang-off table 500 such that outer tubular member collar 204 on outer tubular member 200 engages respective engagement surfaces 504aa and 504ba on support beams 504a and 504b. As a result, double-walled pipe 702a is supported by the hang off table 500. In an exemplary embodiment, the inner tubular member 100 and outer tubular member 200 are coupled by a coupling 704a to a bulkhead 704b, which may be, for example, the coupling member 300 described above with reference to FIG. 3, providing a distal end 704ca on inner tubular member 100 opposite the pulling head 104 and a distal end 704cb on the outer tubular member 200 opposite the top end 202e. The bulkhead 704b may be coupled to a member having a weight $W_P$ which may include, for example, sections of double walled pipe which are substantially similar to double walled pipe 702a. In an exemplary embodiment, with the double walled pipe 702a supported in the hang off table 500, the inner tubular member 100 is supported by the bulkhead 704b and experiences the force distribution illustrated in FIG. 7da, in which a compressive force substantially equal to the weight $W_I$ of the inner tubular member 100 is applied to the distal end 704ca and decreases substantially linearly along inner tubular member 100 to substantially zero force applied to the top of the inner tubular member 100 including pulling head 104. In an exemplary embodiment, with the double walled pipe 702a supported in the hang off table 500, the outer tubular member 200 experiences the force distribution illustrated in FIG. 7db, in which a tensile force substantially equal to the sum of the weight $W_I$ of the inner tubular member 100 and the weight $W_P$ coupled to the bulkhead 704b is applied to the distal end 704cb and increases substantially linearly along the outer tubular member 200 to a tensile force substantially equal to the sum of the weight $W_I$ of the inner tubular member 100, the weight $W_P$ coupled to the bulkhead 704b, and the weight $W_O$ of the outer tubular member 200 which is applied to the top end 202e of the outer tubular member 200.

Referring now to FIGS. 6a, 6b, 7a, and 7e, the method 700 proceeds to step 706 where the pulling head 104 on inner tubular member 100 is engaged. Support arms 602a and 602b on lowering clamp 600 are positioned around pulling head 104 until their respective engagement surfaces 602aa and 602ba engage engagement surface 104a on pulling head 104.

Figure 7F:
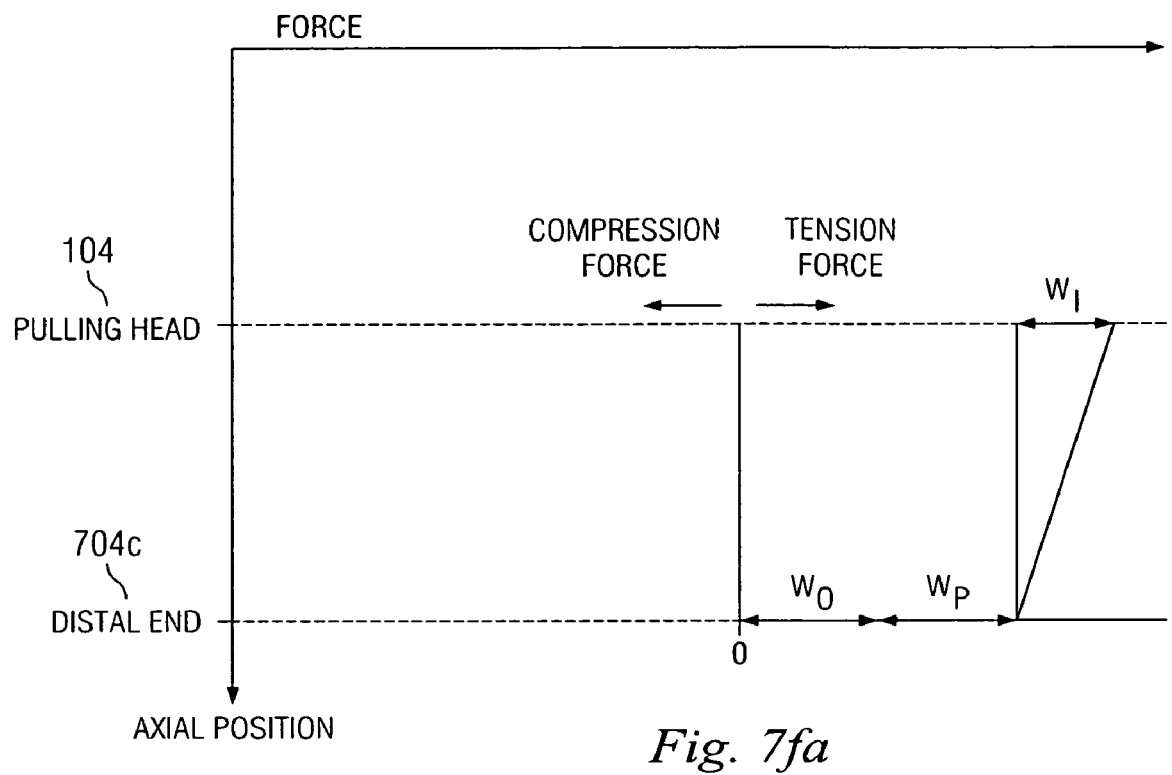
FIG. 7f is a cross sectional view illustrating an exemplary embodiment of the lowering clamp of FIG. 6 translating the inner tubular member of FIG. 1 through the outer tubular member of FIG. 2 during the method of FIGS. 7a and 7b.
Figure 7F:
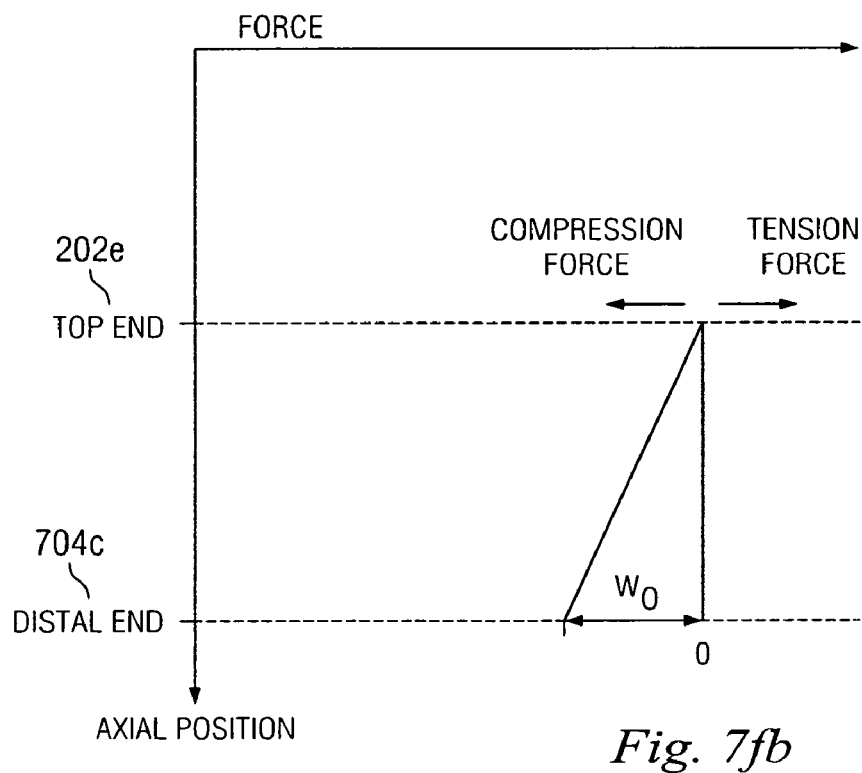

Referring now to FIGS. 7a, 7f, 7fa and 7fb, the method 700 proceeds to step 708 where inner tubular member 100 is translated in a direction X relative to the outer tubular member 200. Lowering clamp 600 is moved in direction X, and due to the engagement of support arms 602a and 602b with pulling head 104, inner tubular member 100 is translated in direction X through the passageway 202c on outer tubular member 200 until inner tubular member collar 106 is positioned outside of passageway 202c and adjacent the top end 202e of the outer tubular member 200 including beveled surface 202d. Translating inner tubular member 100 in direction X and into the position illustrated in FIG. 7f applies a tensile force to inner tubular member 100, thereby creating force distributions in the inner tubular member 100 and the outer tubular member 200 such as, for example, the force distributions illustrated in FIG. 7fa and 7fb, respectively.

In an exemplary embodiment, upon completion of step 708, a tensile force is applied to the inner tubular member 100 and a compressive force is applied to the outer tubular member 200. In an exemplary embodiment, upon completion of step 708, a tensile force is applied to the inner tubular member 100 that is greater than a desired tensile force that will be applied to the inner tubular member 100 at the end of the method 700. In an exemplary embodiment, upon completion of step 708, the inner tubular member 100 experiences the force distribution illustrated in FIG. 7fa, when maximally tensioned, in which a tensile force substantially equal to the sum of the weight $W_P$ coupled to the bulkhead 704b and the weight $W_O$ of the outer tubular member 200 is applied to the distal end 704ca and increases substantially linearly along the inner tubular member 100 to a tensile force substantially equal to the sum of the weight $W_I$ of the inner tubular member 100, the weight $W_P$ coupled to the bulkhead 704b, and the weight $W_O$ of the outer tubular member 200 which is applied to the top of the inner tubular member 100 including pulling head 104. In an exemplary embodiment, upon completion of step 708, the outer tubular member 200 experiences the force distribution illustrated in FIG. 7fb, in which a compressive force substantially equal to the weight $W_O$ of the outer tubular member 200 is applied to the distal end 704cb of the outer tubular member 200 and decreases substantially linearly along the outer tubular member 200 to substantially zero force applied to the top end 202e of the outer tubular member 200. As a result of the increase in the tensile force in the inner tubular member 100 due to step 708, the inner tubular member 100 increases by a length $\Delta L_1$. As a result of the decrease in the tensile force in the outer tubular member 200 due to step 708, the outer tubular member 200 decreases by a length $\Delta L_2$. Due to the coupling of the inner tubular member 100 and the outer tubular member 200 to the bulkhead 704b and the changes in length $\Delta L_1$ and $\Delta L_2$, the top of the inner tubular member 100 including pulling head 104 is displaced over a distance equal to the sum of $\Delta L_1$ and $\Delta L_2$ relative to the top end 202e of outer tubular member 200.

Referring now to FIGS. 4a, 4b, 7a, and 7g, the method 700 proceeds to step 710 where brackets 402 and 404 are positioned between inner tubular member collar 106 and outer tubular member collar 204. Collar engaging surface 402a on bracket 402 engages outer tubular member collar 204 and collar support surface 402b on bracket 402 engages inner tubular member collar 106. Collar engaging surface 404a on bracket 404 engages outer tubular member collar 204 and collar support surface 404b on bracket 404 engages inner tubular member collar 106. By positioning brackets 402 and 404 between inner tubular member collar 106 and outer tubular member collar 204, inner tubular member 100 is held in position with length A of elongated tubular body 102 extending above an endface of the collar 106 and out of passageway 202c.

Referring now to FIGS. 7a, 7g, and 7h, the method 700 proceeds to step 712 where the distal portion of inner tubular member 100 including pulling head 104 is removed using conventional methods known in the art such as, for example, machining and/or cutting. Removal of pulling head 104 leaves a distal end 102d adjacent inner tubular member collar 106. Removal of the portion of inner tubular member 100 reduces length A of elongated tubular body 102 extending above inner tubular member collar 106 to a length B of elongated tubular body 102 between the endface of the collar 106 and distal end 102d. A length $\Delta_{AB}$ of the inner tubular member 100 removed is equal to the difference between lengths A and B and is described below in more detail with respect to FIG. 7a and 7ma. In an exemplary embodiment, length $\Delta_{AB}$ of the inner tubular member 100 removed is such that a predetermined stress distribution in the inner tubular member 100 and a predetermined stress distribution in the outer tubular member 200 are achieved upon completion of the method 700. The predetermined stress distributions in the inner tubular member 100 and the outer tubular member 200 may be influenced by critical points in the double walled pipe 702a and may include, for example, the desired stresses at particular points in the inner tubular member 100 and the outer tubular member 200 when the inner tubular member 100 is heated, the desired stresses at particular points in the inner tubular member 100 and the outer tubular member 200 which will minimize fatigue damage during installation after coupling a bulkhead section to the double walled pipe 702a, the desired stresses at particular points in the inner tubular member 100 and the outer tubular member 200 at a riser section between a seabed and a floating production unit in order to minimize fatigue damage during storm conditions, and a variety of others which are known in the art. In an exemplary embodiment, there may be no critical points in the double walled pipe 702a, and the predetermined stress distribution may include substantially equal stresses in the inner tubular member 100 and the outer tubular member 200, or substantially equal forces at the distal end of the inner tubular member 100 and the top end of the outer tubular member 200 upon the completion of method 700.

Figure 7I:
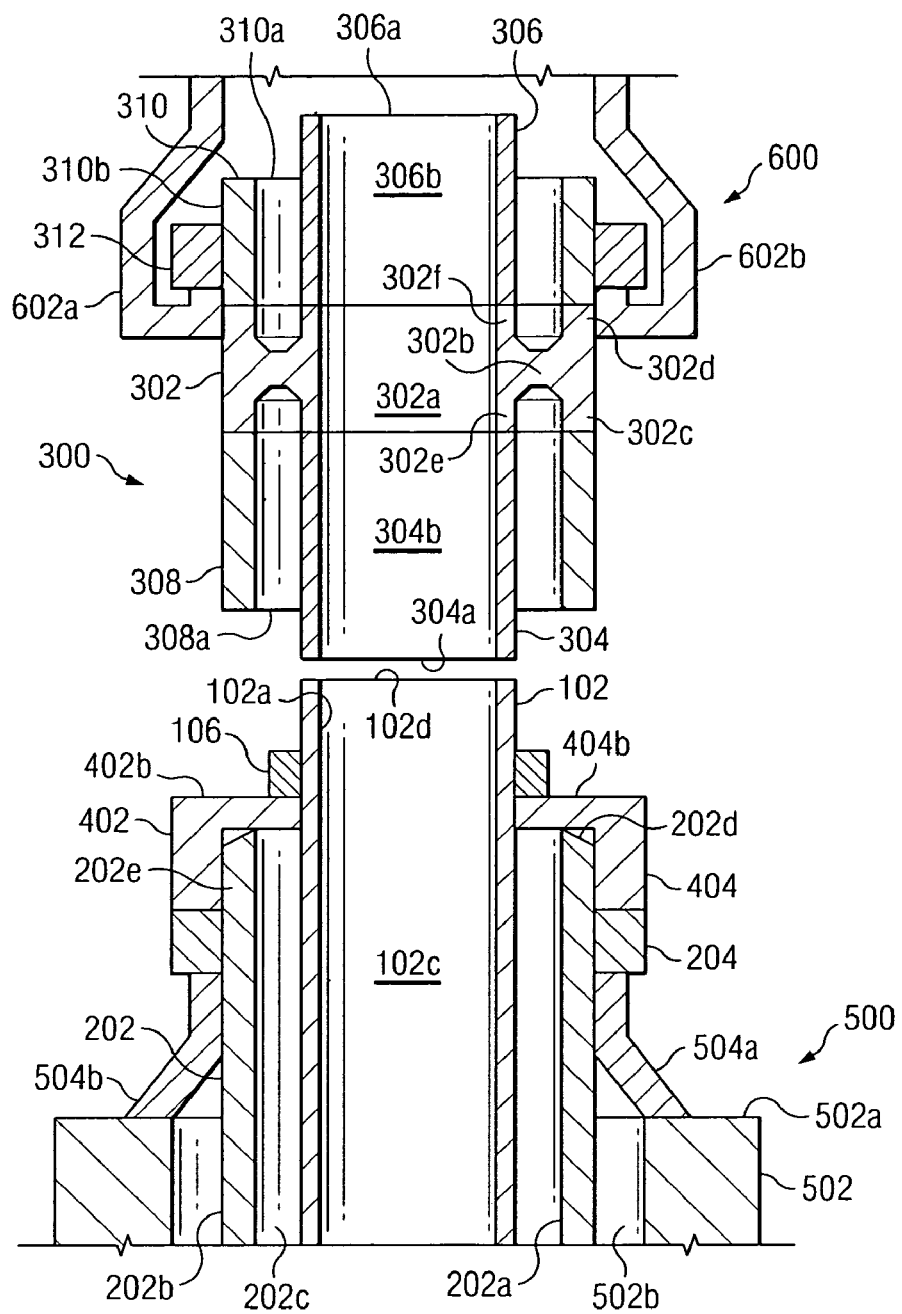
FIG. 7i is a cross sectional view illustrating an exemplary embodiment of the coupling member of FIG. 3 being positioned over the inner tubular member and outer tubular member of FIG. 7c during the method of FIGS. 7a and 7b.

Referring now to FIGS. 7a and 7i, the method 700 proceeds to step 714 where the coupling member 300 is positioned in a coaxial relationship with the double-walled pipe 702a using the lowering clamp 600. Support arms 602a and 602b on lowering clamp 600 are positioned around coupling member 300 until their respective engagement surfaces 602aa and 602ba engage coupling member collar 312. Coupling member 300 is then positioned with lowering clamp 600 such that inner coupling tube 304 is coaxial with inner tubular member 100 and distal end 304a on inner coupling tube 304 is adjacent to distal end 102d on inner tubular member 100.

Figure 7J:
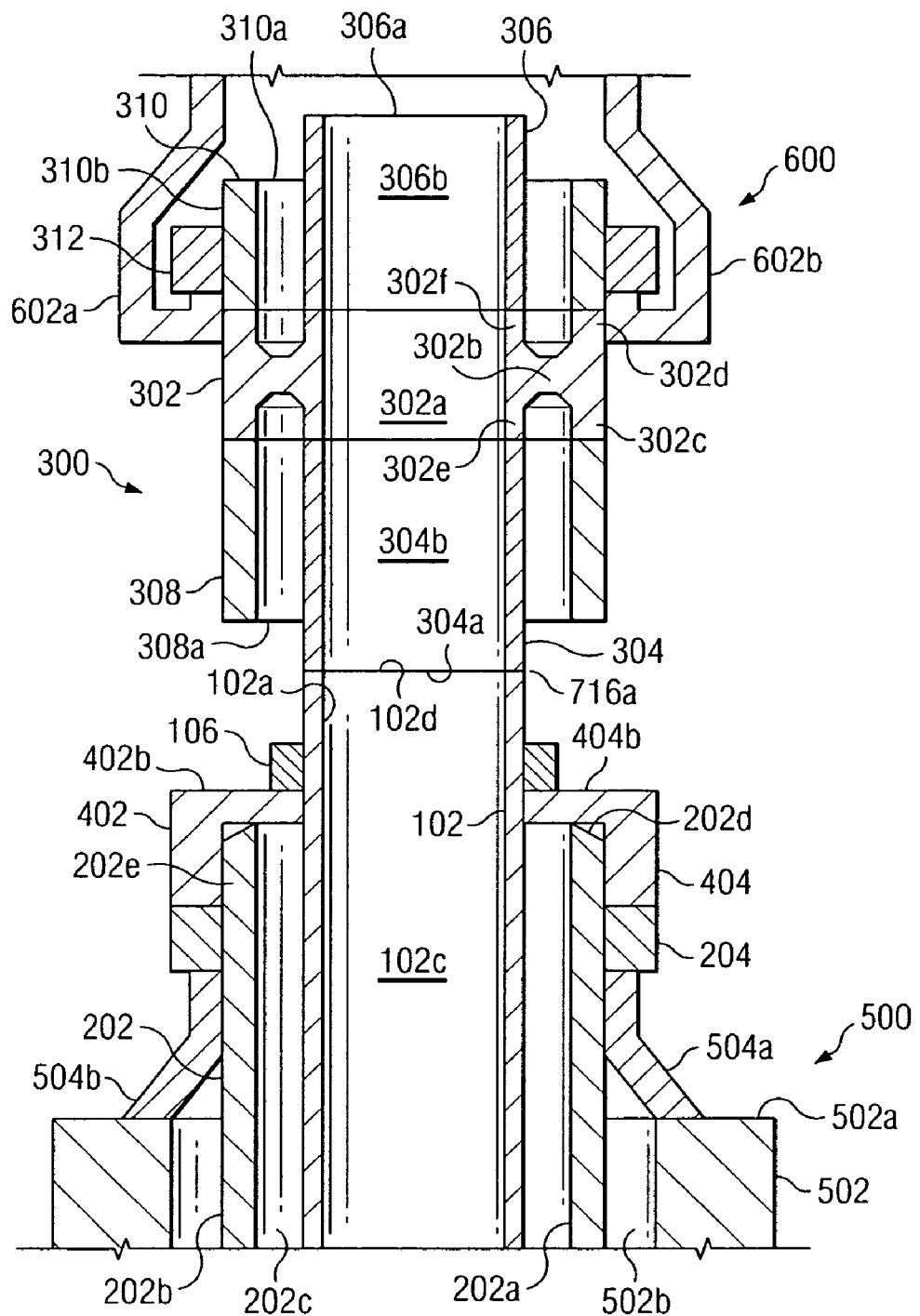
FIG. 7j is a cross sectional view illustrating an exemplary embodiment of the coupling member of FIG. 3 being coupled to the inner tubular member of FIG. 7c during the method of FIGS. 7a and 7b.

Referring now to FIGS. 7a and 7j, the method 700 proceeds to step 716 where an end of the inner coupling tube 304 is coupled to an end of the inner tubular member 100. Lowering clamp 600 is lowered such that distal end 304a of inner coupling tube 304 engages distal end 102d of inner tubular member 100. A coupling 716a is then provided, securing the end of the inner coupling tube 304 to the end of the inner tubular member 100, and providing a distal end 716b on the inner tubular member 100 adjacent the tubular support member 302. In an exemplary embodiment, the coupling 716a is provided about the circumferences of inner coupling tube 304 and inner tubular member 100. In an exemplary embodiment, the coupling 716a is a weld. In an exemplary embodiment, the coupling 716a is a circumferential weld about the circumferences of inner coupling tube 304 and inner tubular member 100.

Figure 7K:
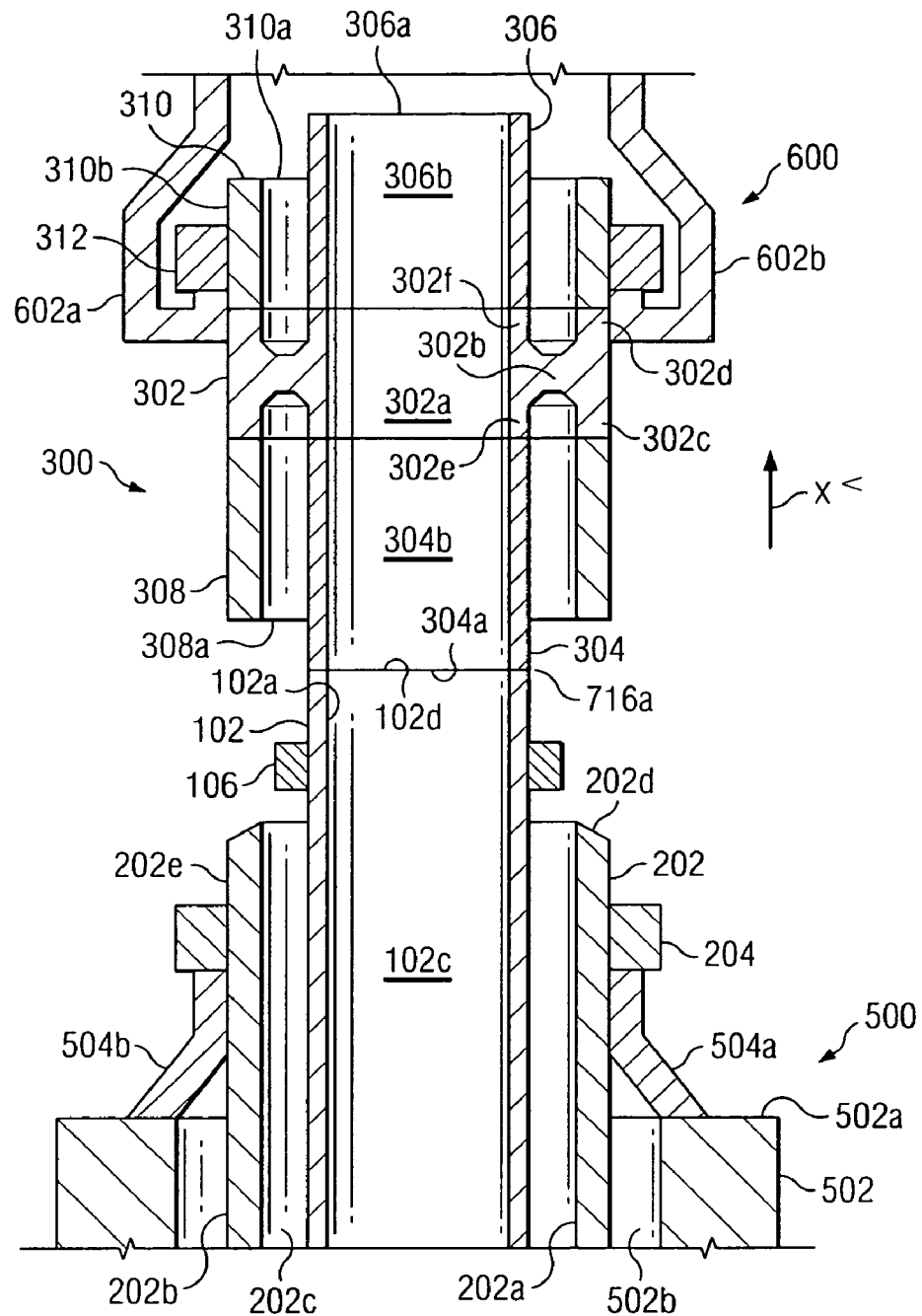
FIG. 7k is a cross sectional view illustrating an exemplary embodiment of the plurality of brackets of FIG. 4 removed from between the inner tubular member and outer tubular member of FIG. 7c during the method of FIGS. 7a and 7b.

Referring now to FIGS. 7a and 7k, the method 700 proceeds to step 718 where the brackets 402 and 404 are removed from between inner tubular member collar 106 and outer tubular member collar 204. Lowering clamp 600 is moved in direction X, allowing the collar engagement surfaces 402a and 404a and the collar support surfaces 402b and 404b on brackets 402 and 404, respectively, to be disengaged from the inner tubular member collar 106 and the outer tubular member collar 204. The brackets 402 and 404 are then removed and the inner tubular member 100 is supported by the lowering clamp 600 through the coupling 716a between the inner tubular member 100 and the coupling member 300.

Figure 7L:
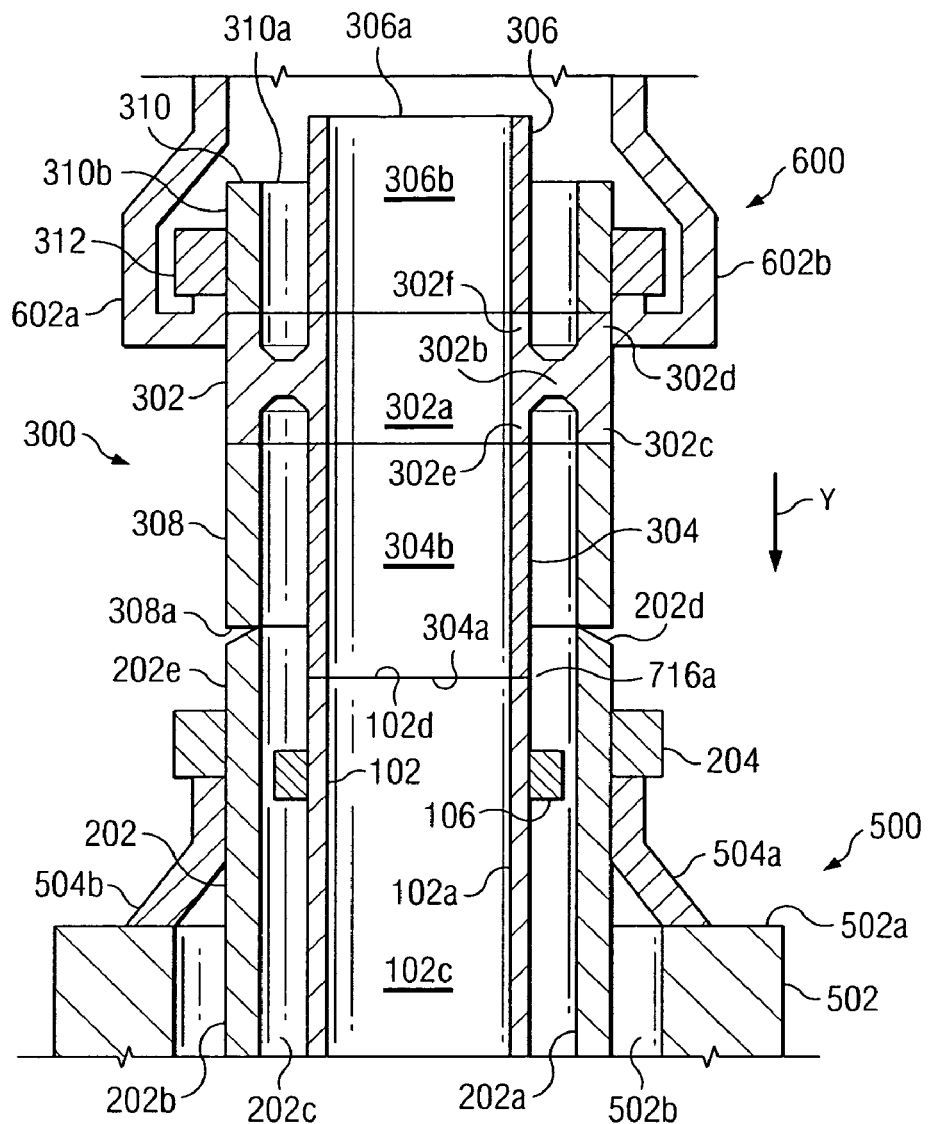
FIG. 7l is a cross sectional view illustrating an exemplary embodiment of the coupling member of FIG. 3 being translated towards the inner tubular member and outer tubular member of FIG. 7c during the method of FIGS. 7a and 7b.

Referring now to FIGS. 7b and 7l, the method 700 proceeds to step 720 where the inner tubular member 100 and coupling member 300 are translated in a direction Y relative to the outer tubular member 200. Lowering clamp 600 is moved in direction Y, and due to the engagement of support arms 602a and 602b with coupling member collar 312 and the coupling 716a between coupling member 300 to inner tubular member 100, inner tubular member 100 is translated in direction Y through the passageway 202c on outer tubular member 200 until distal end 308a on outer coupling tube 308 engages the top end 202e of outer tubular member 200 including beveled surface 202d.

Figure 7M:
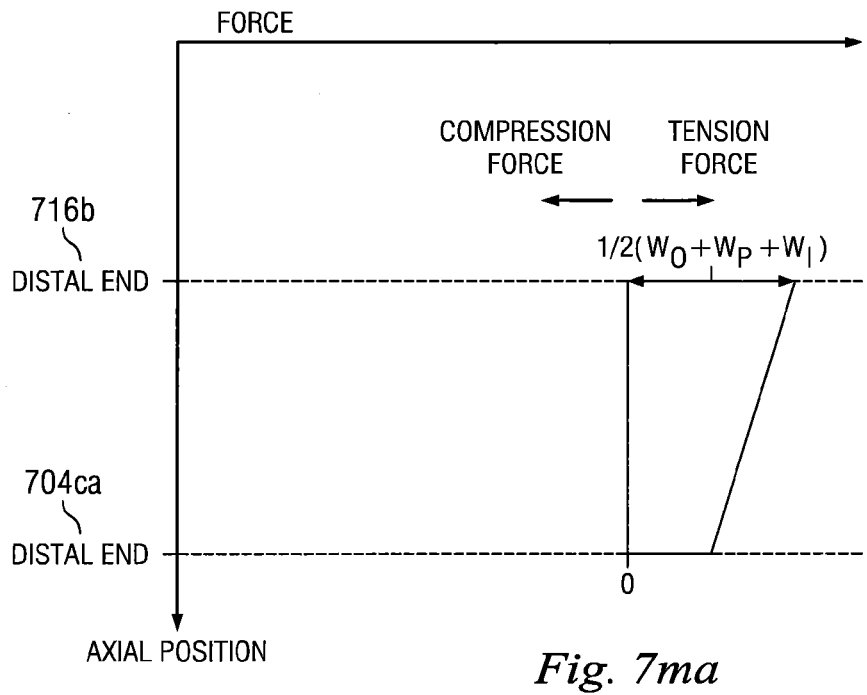
FIG. 7m is a cross sectional view illustrating an exemplary embodiment of the coupling member of FIG. 3 being coupled to the outer tubular member of FIG. 7c during the method of FIGS. 7a and 7b.
Figure 7M:
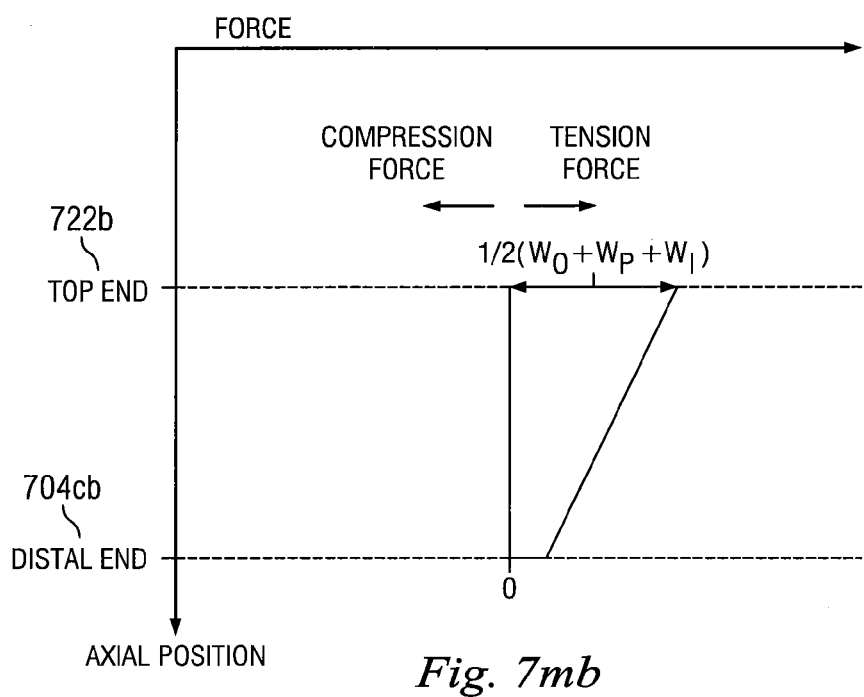

Referring now to FIGS. 7b, 7m, 7ma, and 7mb the method 700 proceeds to step 722 where the outer coupling tube 308 is coupled to the outer tubular member 200. A coupling 722a is provided, securing the outer coupling tube 308 to the outer tubular member 200, and providing a top end 722b on outer tubular member 200 adjacent the tubular support member 302. In an exemplary embodiment, the coupling 722a is provided about the circumferences of outer coupling tube 308 and outer tubular member 200. In an exemplary embodiment, the coupling 722a is a weld. In an exemplary embodiment, the coupling 722a is a circumferential weld about the circumferences of outer coupling tube 308 and outer tubular member 200. In an exemplary embodiment, a tensile force is applied to the distal end 716b of the inner tubular member 100 which is substantially equal to one half the sum of the weight $W_I$ of the inner tubular member 100, the weight $W_P$ coupled to the bulkhead 704b, and the weight $W_O$ of the outer tubular member 200, as illustrated in FIG. 7ma. In an exemplary embodiment, a tensile force is applied to the top end 722b of the outer tubular member 200 which is substantially equal to one half the sum of the weight $W_I$ of the inner tubular member 100, the weight $W_P$ coupled to the bulkhead 704b, and the weight $W_O$ of the outer tubular member 200, as illustrated in FIG. 7mb.

As illustrated in FIGS. 7m, 7ma, and 7mb, the method 700 may provide a double walled pipeline made up of sections of double walled pipe 702a in which the forces applied to the distal end 716b of the inner tubular member 100 and top end 722b of the outer tubular member 200 are substantially equal when the inner tubular member 100 and outer tubular member 200 are coupled to the bulkhead 300. A stress $\sigma_i$ in the inner tubular member 100 and a stress $\sigma_o$ in the outer tubular member 200 depend on a cross sectional area $A_i$ and a cross sectional area $A_o$ of the inner tubular member 100 and the outer tubular member 200, respectively. In an exemplary embodiment, the stresses $\sigma_o$ and $\sigma_i$ after step 722 of method 700 may be determined by the equations:

$$\sigma_o = \frac{\frac{1}{2}(W_o + W_p + W_i)}{A_o} \text{ and } \sigma_i = \frac{\frac{1}{2}(W_o + W_p + W_i)}{A_i}$$

The gradients of the force along the inner tubular member 100 and the outer tubular member 200 are determined by a weight per unit length $w_i$ and a weight per unit length $w_o$ of the inner tubular member 100 and the outer tubular member 200, respectively, which are determined by the product of the cross-sectional areas $A_i$ and $A_o$ and a specific weight $\gamma$ of the material used for the tubular members:

$$w_o = A_o \cdot \gamma$$

$$w_i = A_i \cdot \gamma$$

When the lengths of the inner tubular member 100 and the outer tubular member 200 are L, the weight $W_o$ of the outer tubular member 200 is:

$$W_o = w_o \cdot L$$

and the weight $W_i$ of the inner tubular member 100 is:

$$W_i = w_i \cdot L$$

When the cross sectional areas $A_i$ and $A_o$ of the inner tubular member 100 and the outer tubular member 200 are different, $w_i$ and $w_o$ are different, $W_i$ and $W_o$ are different, and thus the gradient of the force in the outer tubular member 200 is different from the gradient of the force in the inner tubular member 100, as illustrated in FIGS. 7ma and 7mb.

A predetermined stress distribution in the inner tubular member 100 and a predetermined stress distribution in the outer tubular member 200 may be achieved upon completion of the method 700 by manipulating the values of the variables $W_o$, $W_p$, $W_i$, $A_i$, $A_o$, $w_i$, $w_o$ and $\gamma$. The predetermined stress distributions in the inner tubular member 100 and the outer tubular member 200 may be influenced by critical points in the double walled pipe 702a and may include, for example, the desired stresses at particular points in the inner tubular member 100 and the outer tubular member 200 when the inner tubular member 200 is heated, the desired stresses at particular points in the inner tubular member 100 and the outer tubular member 200 which will minimize fatigue damage during installation after coupling a bulkhead section to the double walled pipe 702a, the desired stresses at particular points in the inner tubular member 100 and the outer tubular member 200 at a riser section between a seabed and a floating production unit in order to minimize fatigue damage during storm conditions, and a variety of others which are known in the art. In an exemplary embodiment, there may be no critical points in the double walled pipe 702a, and the predetermined stress distribution may include substantially equal stresses in the inner tubular member 100 and the outer tubular member 200, or substantially equal forces at the distal end 716b of inner tubular member 100 and the top end 722b of the outer tubular member 200. In an exemplary embodiment, a critical point may be anywhere along the double walled pipe 702a.

A predetermined stress at any point along the double walled pipe 702a may be achieved by providing a predetermined stress at the top of the double walled pipe 702a which is coupled to the bulkhead 300. The stresses at the top of the double walled pipe 702a may be chosen by calculating the proper length $\Delta_{AB}$ of the inner tubular member 100 which is removed in step 712.

As a result of the decrease in tension in the inner tubular member 100 due to step 722, the inner tubular member 100 decreases by a length $\Delta L_3$. As a result of the increase in tension in the outer tubular member 200 due to step 722, the outer tubular member 200 increases by a length $\Delta L_4$.

Referring now to FIGS. 7fa, 7g, 7h, 7k, 7m, and 7ma, in an exemplary embodiment, in order to achieve the predetermined stress distribution between the inner tubular member 100 and the outer tubular member 200, the length $\Delta_{AB}$ of the inner tubular member 100 which is removed in step 712 of method 700 is equal to the difference between the sum of the lengths $\Delta L_1$ and $\Delta L_2$ and the sum of the lengths $\Delta L_3$ and $\Delta L_4$. The sum of the lengths $\Delta L_3$ and $\Delta L_4$ defines the opening available between the distal end 308a of coupling member 300 and beveled surface 202d on outer tubular member 200 for providing the coupling 716a. In an exemplary embodiment, this opening available between the distal end 308a of coupling member 300 and beveled surface 202d on outer tubular member 200 is large enough for welding and may be approximately 2 feet. The lengths of the inner tubular member 100 and the outer tubular member 200 should be long enough to generate sufficiently long elastic displacement lengths $\Delta L_3$ and $\Delta L_4$ in order to ensure that the opening available between the distal end 308a of coupling member 300 and beveled surface 202d on outer tubular member 200 is large enough for welding.

Referring now to FIGS. 7b and 7n, the method 700 proceeds to step 724 where the lowering clamp 600 is removed from the coupling member 300. Removal of the lowering clamp 600 exposes inner coupling tube 306 and outer coupling tube 310 on coupling member 300. As a result, distal end 306a on inner coupling tube 306 and distal end 310a on outer coupling tube 310 may now be used to couple the coupling member 300 and double-walled pipe 702a to, for example, another section of pipeline, a well, a sub-sea manifold, or a pipeline termination. Thus, the method 700 provides a double-walled pipeline where the inner tubular member 100 and outer tubular member 200 are directly coupled to the coupling member 300 while providing predetermined stress distributions in the inner tubular member 100 and outer tubular member 200.

Referring now to FIG. 8, an alternative inner tubular member 800 is substantially identical in design to the inner tubular member 100 described above with reference to FIG. 1, with provision of a pulling head 802 on a distal end of the inner tubular member 800 defining a length C between an endface of the collar 106 and the pulling head 802. In an exemplary embodiment, the pulling head 802 includes a conventional coupler for coupling the pulling head 802 to a pulling device such as, for example, a winch or a hydraulic jack.

Figure 9:
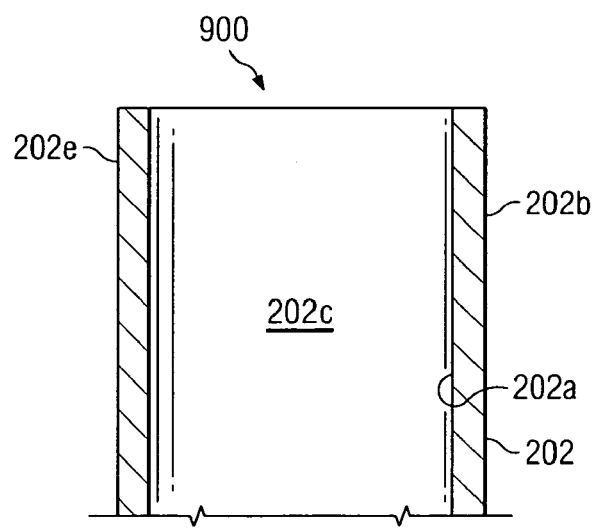
FIG. 9 is a cross sectional view illustrating an exemplary embodiment of an outer tubular member.

Referring now to FIG. 9, an alternative outer tubular member 900 is substantially identical in design to the outer tubular member 200 described above with reference to FIG. 2, with the removal of the outer tubular member collar 204 and the beveled surface 202d.

Referring now to FIG. 10, an alternative coupling member 1000 is substantially identical in design to the coupling member 300 described above with reference to FIG. 3, with provision of a pulling head 1002 on distal end 306a of inner coupling tube 306 and the removal of coupling member collar 312. In an exemplary embodiment, the pulling head 1002 includes a coupler for coupling the pulling head 1002 to a pulling device such as, for example, a winch, a hydraulic jack, or a variety of similar devices known in the art.

Figure 11A:
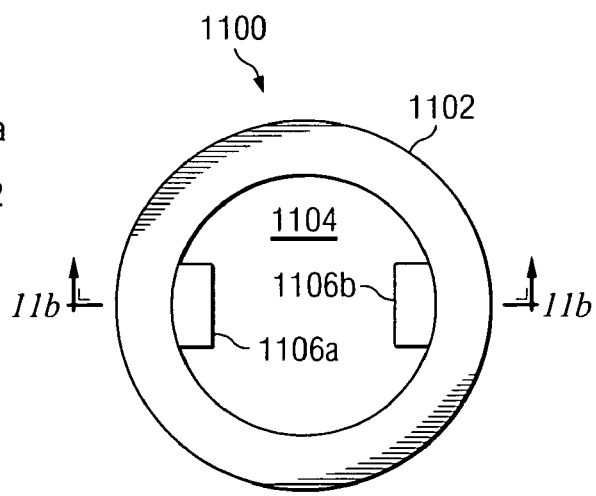
FIG. 11a is a top view illustrating an exemplary embodiment of a friction support tool.
Figure 11B:
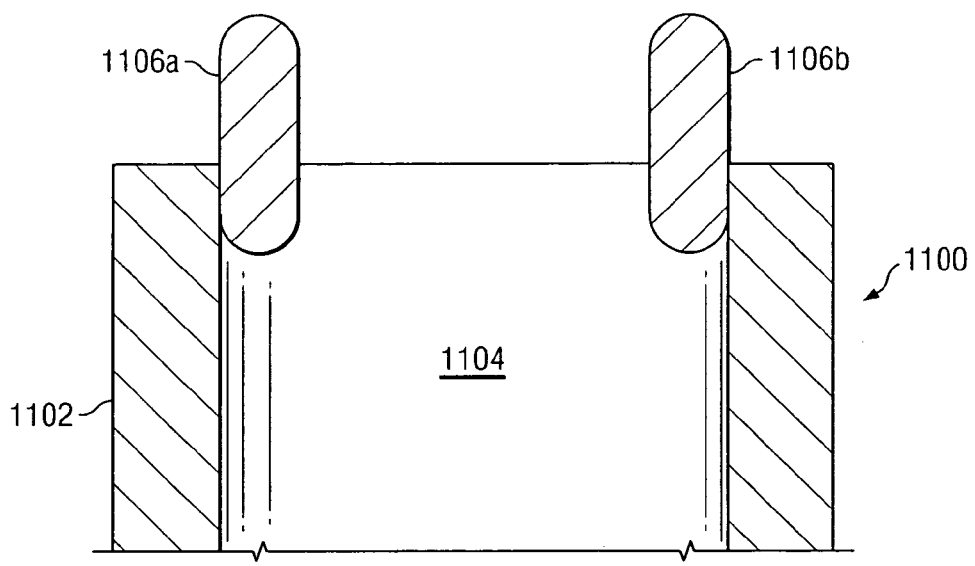

Referring now to FIGS. 11a and 11b, a friction support tool 1100 includes a base 1102 defining a passageway 1104 along its length. A plurality of friction members 1106a and 1106b are coupled to the base 1102 and positioned around the circumference of the base 1102. In an exemplary embodiment, the friction support tool 1100 may include, for example, a tensioner with the friction members 1106a and 1106b including pads on tracks which move in opposite directions to grip a body, a friction clamp with the friction members 1106a and 1106b including friction pads which are clamped together to grip a body, and/or a variety of equivalent friction support tools known in the art.

Referring now to FIG. 12, a pulling device 1200 includes a base 1202 and a coupling device 1204 extending from the base 1202. In an exemplary embodiment, the pulling device 1200 is, for example, a winch, a hydraulic jack, or a variety of similar devices known in the art.

Referring now to FIGS. 13a and 13b, a method 1300 for coupling tubular members is illustrated. In an exemplary embodiment, the method 1300 is carried out on an off shore vessel. In an exemplary embodiment, the method 1300 is carried out in a substantially vertical orientation, as illustrated. In an exemplary embodiment, the method 1300 is carried out in a substantially horizontal orientation.

Referring now to FIGS. 13a, 13c, 13ca, and 13cb, the method 1300 begins at step 1302 where a double-walled pipe 1302a is provided. Double-walled pipe 1302a includes the inner tubular member 800 positioned coaxially with the outer tubular member 900 in passageway 202c, with pulling head 802 extending out past the top end 202e of outer tubular member 900. In an exemplary embodiment, inner tubular member 800 is coupled to outer tubular member 900 by a plurality of annular spacers 1302b, as illustrated in FIG. 13ca, the spacers 1302b positioned in the passageway 202c between inner surface 202a on outer tubular member 900 and outer surface 102b on inner tubular member 800, which allow axial motion of the inner tubular member 800 relative to the outer tubular member 900 but keeps the annular spacing between inner tubular member 800 and outer tubular member 900 in passageway 202c substantially constant. In an exemplary embodiment, inner tubular member 800 is coupled to outer tubular member 900 by a thermally insulating material 1302c, as illustrated in FIG. 13cb, the insulating material 1302c positioned in the passageway 202c between inner surface 202a on outer tubular member 900 and outer surface 102b on inner tubular member 800, which allows axial motion of the inner tubular member 800 relative to the outer tubular member 900 but keeps the annular spacing between inner tubular member 800 and outer tubular member 900 in passageway 202c substantially constant.

Referring now FIGS. 13a, 13d, 13da and 13db, the method 1300 proceeds to step 1304, where the double-walled pipe 1302a is supported in the friction support tool 1100. Double-walled pipe 1302a is positioned in passageway 1104 on friction support tool 1100 such that outer surface 202b on outer tubular member 900 engages respective friction members 1106a and 1106b which grip outer tubular member 900 and hold double-walled pipe 1302a. As a result, double-walled pipe 1302a is supported by friction support tool 1100. In an exemplary embodiment, the inner tubular member 800 and outer tubular member 900 are coupled by a coupling 1304a to a bulkhead 1304*b*, which may be, for example, the coupling member 1000 described above with reference to FIG. 10, providing a distal end 1304*ca* on inner tubular member 800 opposite the pulling head 802, and a distal end 1304*cb* on the outer tubular member 900 opposite the top end 202*e*. The bulkhead 1304*b* may be coupled to a member having a weight $W_P$ which may include, for example, sections of double walled pipe which are substantially similar to double walled pipe 1302*a*. In an exemplary embodiment, with the double walled pipe 1302*a* supported in the friction support tool 1100, the inner tubular member 800 is supported by the bulkhead 1304*b* and experiences the force distribution illustrated in FIG. 13*da*, in which a compressive force substantially equal to the weight $W_I$ of the inner tubular member 800 is applied to the distal end 1304*ca* and decreases substantially linearly along the inner tubular member 800 to substantially zero force applied to the top of the inner tubular member 800 including pulling head 802. In an exemplary embodiment, with the double walled pipe 1302*a* supported in the friction support tool 1100, the outer tubular member 900 experiences the force distribution illustrated in FIG. 13*db*, in which a tensile force substantially equal to the sum of the weight $W_I$ of the inner tubular member 800 and the weight $W_P$ coupled to the bulkhead 1304*b* is applied to the distal end 1304*cb* and increases substantially linearly along the outer tubular member 900 to a tensile force substantially equal to the sum of the weight $W_I$ of the inner tubular member 800, the weight $W_P$ coupled to the bulkhead 1304*b*, and the weight $W_O$ of the outer tubular member 900 applied to the top end 202*e* of the outer tubular member 900.

Referring now to FIGS. 13*a* and 13*e*, the method 1300 proceeds to step 1306 where the pulling head 802 on inner tubular member 800 is engaged. Pulling device 1200 is engaged with and coupled to pulling head 802 on inner tubular member 800.

Referring now to FIGS. 13*a*, 13*f*, 13*fa* and 13*fb*, the method 1300 proceeds to step 1308 where inner tubular member 800 is translated in direction X relative to the outer tubular member 900. Pulling device 1200 is moved in direction X, and due to the engagement of coupling device 1204 and pulling head 802, inner tubular member 800 is translated axially through the passageway 202*c* on outer tubular member 900 until inner tubular member collar 106 is positioned outside of passageway 202*c* and adjacent the top end 202*e* of the outer tubular member 900. Translating inner tubular member 800 in direction X and into the position illustrated in FIG. 13*f* applies a tensile force to inner tubular member 800, thereby creating force distributions in the inner tubular member 800 and the outer tubular member 900 such as, for example, the force distributions illustrated in FIGS. 13*fa* and 13*fb*, respectively.

In an exemplary embodiment, upon completion of step 1308, a tensile force is applied to the inner tubular member 800 and a compressive force is applied to the outer tubular member 900. In an exemplary embodiment, upon completion of step 1308, a tensile force is applied to the inner tubular member 800 that is greater than a desired tensile force that will be applied to the inner tubular member 800 at the end of the method 1300. In an exemplary embodiment, upon completion of step 1308, the inner tubular member 800 experiences the force distribution illustrated in FIG. 13*fa*, when maximally tensioned, in which a tensile force substantially equal to the sum of the weight $W_P$ coupled to the bulkhead 1304*b* and the weight $W_O$ of the outer tubular member 900 is applied to the distal end 1304*ca* and increases substantially linearly along the inner tubular member 800 to a tensile force substantially equal to the sum of the weight $W_I$ of the inner tubular member 800, the weight $W_P$ coupled to the bulkhead 1304*b*, and the weight $W_O$ of the outer tubular member 900 which is applied to the top of the inner tubular member 800 including pulling head 802. In an exemplary embodiment, upon completion of step 1308, the outer tubular member 900 experiences the force distribution illustrated in FIG. 13*fb*, in which a compressive force substantially equal to the weight $W_O$ of the outer tubular member 900 is applied to the distal end 1304*cb* of the outer tubular member 900 and decreases substantially linearly along the outer tubular member 900 to substantially zero force applied to the top end 202*e* of the outer tubular member 900. As a result of the increase in tensile force in the inner tubular member 800 due to step 1308, the inner tubular member 800 increases by a length $\Delta L_5$. As a result of the decrease in the tensile force in the outer tubular member 900 due to step 1308, the outer tubular member 900 decreases by a length $\Delta L_6$. Due to the coupling of the inner tubular member 800 and the outer tubular member 900 to the bulkhead 1304*b* and the changes in length $\Delta L_5$ and $\Delta L_6$, the top of the inner tubular member 800 including pulling head 802 is displaced over a distance equal to the sum of $\Delta L_5$ and $\Delta L_6$ relative to the top end 202*e* of outer tubular member 900.

Referring now to FIGS. 13*a* and 13*g*, the method 1300 proceeds to step 1310 where brackets 402 and 404 are positioned between inner tubular member collar 106 and the distal end of outer tubular member 900. Collar support surface 402*b* on bracket 402 engages inner tubular member collar 106 with the remainder of the bracket 402 engaging outer tubular member 900. Collar support surface 404*b* on bracket 404 engages inner tubular member collar 106 with the remainder of the bracket 404 engaging outer tubular member 900. By positioning brackets 402 and 404 between inner tubular member collar 106 and outer tubular member 900, inner tubular member 800 is held in position with length C of elongated tubular body 102 extending above an endface of the collar 106 and out of passageway 202*c*.

Referring now to FIGS. 13*a* and 13*h*, the method 1300 proceeds to step 1312 where the distal portion of inner tubular member 800 including pulling head 802 is removed using conventional methods known in the art such as, for example, machining and/or cutting. Removal of pulling head 802 leaves a distal end 802*a* adjacent inner tubular member collar 106. Removal of the portion of inner tubular member 800 reduces length C of elongated tubular body 102 extending above inner tubular member collar 106 to a length D of elongated tubular body 102 between the endface of the collar 106 and distal end 802*a*. A length $\Delta_{CD}$ of the inner tubular member 800 removed is equal to the difference between lengths C and D and is described below in more detail with respect to FIGS. 13*a* and 13*na*. In an exemplary embodiment, the length $\Delta_{CD}$ of the inner tubular member 800 removed is such that a predetermined stress distribution in the inner tubular member 800 and a predetermined stress distribution in the outer tubular member 900 are achieved upon completion of the method 1300. The predetermined stress distributions in the inner tubular member 800 and the outer tubular member 900 may be influenced by critical points in the double walled pipe 1302*a* and may include, for example, the desired stresses at particular points in the inner tubular member 800 and the outer tubular member 900 when the inner tubular member 800 is heated, the desired stresses at particular points in the inner tubular member 800 and the outer tubular member 900 which will minimize fatigue damage during installation after coupling a bulkhead section to the double walled pipe 1302*a*, the desired stresses at particular points in the inner tubular member 800 and the outer tubular member 900 at a riser section between a seabed and a floating production unit in order to minimize fatigue damage during storm conditions, and a variety of others which are known in the art. In an exemplary embodiment, there may be no critical points in the double walled pipe 1302a, and the predetermined stress distribution may include substantially equal stresses in the inner tubular member 800 and the outer tubular member 900, or substantially equal forces at the distal end of the inner tubular member 800 and the top end of the outer tubular member 900 upon the completion of method 1300.

Referring now to FIGS. 13a and 13i, the method 1300 proceeds to step 1314 where the coupling member 1000 is positioned in a coaxial relationship with the double-walled pipe 1302a using the pulling device 1200. Coupling device 1204 on pulling device 1200 engages pulling head 1002 on coupling member 1000 and couples the pulling device 1200 to the coupling member 1000. Coupling member 1000 is then positioned with pulling device 1200 such that inner coupling tube 304 is coaxial with inner tubular member 800 and distal end 304a on inner coupling tube 304 is adjacent to distal end 802a on inner tubular member 800.

Referring now to FIGS. 13a and 13j, the method 1300 proceeds to step 1316 where an end of the inner coupling tube 304 is coupled to an end of the inner tubular member 800. Pulling device 1200 is lowered such that distal end 304a of inner coupling tube 304 engages distal end 802a of inner tubular member 800. A coupling 1316a is then provided, securing the end of the inner coupling tube 304 to the end of the inner tubular member 800, and providing a distal end 1316b on inner tubular member 800 adjacent tubular support member 302. In an exemplary embodiment, the coupling 1316a is provided about the circumferences of inner coupling tube 304 and inner tubular member 800. In an exemplary embodiment, the coupling 1316a is a weld. In an exemplary embodiment, the coupling 1316a is a circumferential weld about the circumferences of inner coupling tube 304 and inner tubular member 800.

Referring now to FIGS. 13a and 13k, the method 1300 proceeds to step 1318 where the brackets 402 and 404 are removed from between inner tubular member collar 106 and outer tubular member 900. Pulling device 1200 is moved in direction X, allowing the collar support surfaces 402b and 404b on brackets 402 and 404, respectively, to be disengaged from the inner tubular member collar 106 and the outer tubular member 900. The brackets 402 and 404 are then removed and the inner tubular member 800 is supported by the pulling device 1200 through the coupling 1316a between the inner tubular member 800 and the coupling member 1000.

Referring now to FIGS. 13b and 13l, the method 1300 proceeds to step 1320 where the distal end of outer tubular member 900 is beveled. Beveling distal end of outer tubular member 900 provides a beveled surface 1320a about the circumference of outer tubular member 900.

Referring now to FIGS. 13b and 13m, the method 1300 proceeds to step 1322 where the inner tubular member 800 and coupling member 1000 are translated in direction Y relative to the outer tubular member 900. Pulling device 1200 is moved in direction Y, and due to the engagement of coupling device 1204 on pulling device 1200 with pulling head 1002 on coupling member 1000, inner tubular member 800 is translated axially through the passageway 202c on outer tubular member 900 until distal end 308a on outer coupling tube 308 engages the top end 202e of outer tubular member 900 including beveled surface 1320a.

Referring now to FIGS. 13b, 13n, 13na and 13nb, the method 1300 proceeds to step 1324 where the outer coupling tube 308 is coupled to the outer tubular member 900. A coupling 1324a is provided, securing the outer coupling tube 308 to the outer tubular member 900, and providing a top end 1324b on outer tubular member 900 adjacent the tubular support member 302. In an exemplary embodiment, the coupling 1324a is provided about the circumferences of outer coupling tube 308 and outer tubular member 900. In an exemplary embodiment, the coupling 1324a is a weld. In an exemplary embodiment, the coupling 1324a is a circumferential weld about the circumferences of outer coupling tube 308 and outer tubular member 900. In an exemplary embodiment, a tensile force is applied to the distal end 1316b of the inner tubular member 800 which is substantially equal to one half the sum of the weight $W_I$ of the inner tubular member 800, the weight $W_P$ coupled to the bulkhead 1304b, and the weight $W_O$ of the outer tubular member 900, as illustrated in FIG. 13na. In an exemplary embodiment, a tensile force is applied to the top end 1324b of the outer tubular member 900 which is substantially equal to one half the sum of the weight $W_I$ of the inner tubular member 800, the weight $W_P$ coupled to the bulkhead 1304b, and the weight $W_O$ of the outer tubular member 900, as illustrated in FIG. 13nb.

As illustrated in FIGS. 13n, 13na, and 13nb, the method 1300 may provide a double walled pipeline made up of sections of double walled pipe 1302a in which the forces applied to the distal end 1316b of the inner tubular member 800 and top end 1324b of the outer tubular member 900 are substantially equal when the inner tubular member 800 and outer tubular member 900 are coupled to the bulkhead 1000. A stress $\sigma_i$ in the inner tubular member 800 and a stress $\sigma_o$ in the outer tubular member 900 depend on a cross sectional area $A_i$ and a cross sectional area $A_o$ of the inner tubular member 800 and the outer tubular member 900, respectively. In an exemplary embodiment, the stresses $\sigma_o$ and $\sigma_i$ after step 1324 of method 1300 may be determined by the equations:

$$\sigma_o = \frac{\frac{1}{2}(W_o + W_p + W_i)}{A_o} \text{ and } \sigma_i = \frac{\frac{1}{2}(W_o + W_p + W_i)}{A_i}$$

The gradients of the force along the inner tubular member 800 and the outer tubular member 900 are determined by a weight per unit length $w_i$ and a weight per unit length $w_o$ of the inner tubular member 800 and the outer tubular member 900, respectively, which are determined by the product of the cross-sectional areas $A_i$ and $A_o$ and a specific weight $\gamma$ of the material used for the tubular members:

$$w_o = A_o \cdot \gamma$$

$$w_i = A_i \cdot \gamma$$

When the lengths of the inner tubular member 800 and the outer tubular member 900 are L, the weight $W_o$ of the outer tubular member 900 is:

$$W_o = w_o \cdot L$$

and the weight $W_i$ of the inner tubular member 800 is:

$$W_i = w_i \cdot L$$

When the cross sectional areas $A_i$ and $A_o$ of the inner tubular member 800 and the outer tubular member 900 are different, $w_i$ and $w_o$ are different, $W_i$ and $W_o$ are different, and thus the gradient of the force in the outer tubular member 900 is different from the gradient of the force in the inner tubular member 800, as illustrated in FIGS. 13na and 13nb.

A predetermined stress distribution in the inner tubular member 800 and a predetermined stress distribution in the outer tubular member 900 may be achieved upon completion of the method 1300 by manipulating the values of the variables $W_o$, $W_p$, $W_i$, $A_i$, $A_o$, $w_i$, $w_o$ and $\gamma$. The predetermined stress distributions in the inner tubular member 800 and the outer tubular member 900 may be influenced by critical points in the double walled pipe 1302a and may include, for example, the desired stresses at particular points in the inner tubular member 800 and the outer tubular member 900 when the inner tubular member 800 is heated, the desired stresses at particular points in the inner tubular member 800 and the outer tubular member 900 which will minimize fatigue damage during installation after coupling a bulkhead section to the double walled pipe 1302a, the desired stresses at particular points in the inner tubular member 800 and the outer tubular member 900 at a riser section between a seabed and a floating production unit in order to minimize fatigue damage during storm conditions, and a variety of others which are known in the art. In an exemplary embodiment, there may be no critical points in the double walled pipe 1302a, and the predetermined stress distribution may include substantially equal stresses in the inner tubular member 800 and the outer tubular member 900, or substantially equal forces at the distal end 1316b of inner tubular member 800 and the top end 1324b of the outer tubular member 900. In an exemplary embodiment, a critical point may be anywhere along the double walled pipe 1302a.

A predetermined stress at any point along the double walled pipe 1302a may be achieved by providing a predetermined stress at the top of the double walled pipe 1302a which is coupled to the bulkhead 1000. The stresses at the top of the double walled pipe 1302a may be chosen by calculating the proper length $\Delta_{CD}$ of the inner tubular member 800 which is removed in step 1312.

As a result of the decrease in tension in the inner tubular member 800 due to step 1324, the inner tubular member 800 decreases by a length $\Delta L_7$. As a result of the increase in tension in the outer tubular member 900 due to step 1324, the outer tubular member 900 increases by a length $\Delta L_8$.

Referring now to FIGS. 13fa, 13g, 13h, 13l, 13n, and 13na, in an exemplary embodiment, in order to achieve the predetermined stress distribution between the inner tubular member 800 and the outer tubular member 900, the length $\Delta_{CD}$ of the inner tubular member 800 which is removed in step 1312 of method 1300 is equal to the difference between the sum of the lengths $\Delta L_5$ and $\Delta L_6$ and the sum of the lengths $\Delta L_7$ and $\Delta L_8$. The sum of the lengths $\Delta L_7$ and $\Delta L_8$ defines the opening available between the distal end 308a of coupling member 1000 and beveled surface 1320a on outer tubular member 900 for providing the coupling 1316a. In an exemplary embodiment, this opening available between the distal end 308a of coupling member 1000 and beveled surface 1320a on outer tubular member 900 is large enough for welding and may be approximately 2 feet. The lengths of the inner tubular member 800 and the outer tubular member 900 should be long enough to generate sufficiently long elastic displacement lengths $\Delta L_7$ and $\Delta L_8$ in order to ensure the opening available between the distal end 308a of coupling member 1000 and beveled surface 1320a on outer tubular member 900 is large enough for welding.

Referring now to FIGS. 13b and 13o, the method 1300 proceeds to step 1326 where the pulling device 1200 is removed from the coupling member 1000. Removal of the pulling device 1200 exposes inner coupling tube 306 and outer coupling tube 310 on coupling member 300. As a result, distal end 306a on inner coupling tube 306 and distal end 310a on outer coupling tube 310 may now be used to couple the coupling member 1000 and double-walled pipe 1302a to, for example, another section of pipeline, a well, a sub-sea manifold, or a pipeline termination. Thus, the method 1300 provides a double-walled pipeline where the inner tubular member 800 and outer tubular member 900 are directly coupled to the coupling member 1000 while providing predetermined stress distributions in the inner tubular member 800 and outer tubular member 900. In an exemplary embodiment, the pulling head 1002 may remain on the coupling member 1000 such as when, for example, the coupling member 1000 is the last section of the pipeline. In an exemplary embodiment, the pulling head 1002 may be removed from the coupling member 1000 such as when, for example, another section of double walled pipe is to be added to the coupling member 1000.

Referring now to FIG. 14, an alternative outer tubular member 1400 is substantially identical in design to the outer tubular member 200 described above with reference to FIG. 2, with provision of an outer tubular member collar 1402 positioned on the inner surface 202a adjacent the top end 202e of outer tubular member 1400 including beveled surface 202d, and the removal of the outer tubular member collar 204.

Referring now to FIGS. 15a and 15b, a plurality of brackets 1500 include a bracket 1502 and a bracket 1504. Bracket 1502 includes a collar engagement surface 1502a and a collar support surface 1502b. Bracket 1504 includes a collar engagement surface 1504a and a collar support surface 1504b. In an alternative embodiment, the plurality of brackets 1502 and 1504 may be combined to provide an annular bracket with a top surface including collar support surfaces 1502b and 1504b and a bottom surface including collar engaging surface 1502a and 1504a.

Referring now to FIGS. 16a and 16b, a method 1600 for coupling tubular members is illustrated. In an exemplary embodiment, the method 1600 is carried out on an off shore vessel. In an exemplary embodiment, the method 1600 is carried out in a substantially vertical orientation, as illustrated. In an exemplary embodiment, the method 1600 is carried out in a substantially horizontal orientation.

Referring now to FIGS. 16a, 16c, 16ca, and 16cb, the method 1600 begins at step 1602 where a double-walled pipe 1602a is provided. Double-walled pipe 1602a includes the inner tubular member 800 positioned coaxially with the outer tubular member 1400 in passageway 202c, with pulling head 802 extending out past the top end 202e of outer tubular member 1400 that includes beveled surface 202d. In an exemplary embodiment, inner tubular member 800 is coupled to outer tubular member 1400 by a plurality of annular spacers 1602b, as illustrated in FIG. 16ca, the spacers 1602b positioned in the passageway 202c between inner surface 202a on outer tubular member 1400 and outer surface 102b on inner tubular member 800, which allow axial motion of the inner tubular member 800 relative to the outer tubular member 1400 but keeps the annular spacing between inner tubular member 800 and outer tubular member 1400 in passageway 202c substantially constant. In an exemplary embodiment, inner tubular member 800 is coupled to outer tubular member 1400 by a thermally insulating material 1602c, as illustrated in FIG. 16cb, the insulating material 1602c positioned in the passageway 202c between inner surface 202a on outer tubular member 1400 and outer surface 102b on inner tubular member 800, which allows axial motion of the inner tubular member 800 relative to the outer tubular member 1400 but keeps the annular spacing between inner tubular member 800 and outer tubular member 1400 in passageway 202c substantially constant.

Referring now FIGS. 16a, 16d, 16da and 16db, the method 1600 proceeds to step 1604, where the double-walled pipe 1602a is supported in the friction support tool 1100. Double-walled pipe 1602a is positioned in passageway 1104 on friction support tool 1100 such that outer surface 202b on outer tubular member 1400 engages respective friction members 1106a and 1106b which grip outer tubular member 1400 and hold double-walled pipe 1602a. As a result, double-walled pipe 1602a is supported by friction support tool 1100. In an exemplary embodiment, with the double walled pipe 1602a supported in the friction support tool 1100, the inner tubular member 800 and outer tubular member 1400 are coupled by a coupling 1604a to a bulkhead 1604b, which may be, for example, the coupling member 1000 described above with reference to FIG. 10, providing a distal end 1604ca on the inner tubular member 800 opposite the pulling head 802, and a distal end 1604cb on the outer tubular member 1400 opposite the top end 202e. The bulkhead 1604b may be coupled to a member having a weight $W_P$ which may include, for example, sections of double walled pipe which are substantially similar to double walled pipe 1602a. With the double walled pipe 1602a supported in the friction support tool 1100, the inner tubular member 800 is supported by the bulkhead 1604b and experiences the force distribution illustrated in FIG. 16da, in which a compressive force substantially equal to the weight $W_I$ of the inner tubular member 800 is applied to the distal end 1604ca and decreases substantially linearly along the inner tubular member 800 to substantially zero force applied to the top of the inner tubular member 800 including pulling head 802. In an exemplary embodiment, with the double walled pipe 1602a supported in the friction support tool 1100, the outer tubular member 1400 experiences the force distribution illustrated in FIG. 16db, in which a tensile force substantially equal to the sum of the weight $W_I$ of the inner tubular member 800 and the weight $W_P$ coupled to the bulkhead 1604b is applied to the distal end 1604cb and increases substantially linearly along the outer tubular member 1400 to a tensile force substantially equal to the sum of the weight $W_I$ of the inner tubular member 800, the weight $W_P$ coupled to the bulkhead 1604b, and the weight $W_O$ of the outer tubular member 1400 applied to the top end 202e of the outer tubular member 1400.

Referring now to FIGS. 16a and 16e, the method 1600 proceeds to step 1606 where the pulling head 802 on inner tubular member 800 is engaged. Pulling device 1200 is engaged with and coupled to pulling head 802 on inner tubular member 800.

Referring now to FIGS. 16a, 16f, 16fa and 16fb, the method 1600 proceeds to step 1608 where inner tubular member 800 is translated in direction X relative to the outer tubular member 1400. Pulling device 1200 is moved in a direction X, and due to the engagement of coupling device 1204 and pulling head 802, inner tubular member 800 is translated axially through the passageway 202c on outer tubular member 1400 until inner tubular member collar 106 is positioned outside of passageway 202c and adjacent the top end 202e of the outer tubular member 1400 including beveled surface 202d. Translating inner tubular member 800 in direction X and into the position illustrated in FIG. 16f applies a tensile force to inner tubular member 800, thereby creating force distributions in the inner tubular member 800 and the outer tubular member such as, for example, the force distributions illustrated in FIGS. 16fa and 16fb, respectively.

In an exemplary embodiment, upon completion of step 1608, a tensile force is applied to the inner tubular member 800 and a compressive force is applied to the outer tubular member 1400. In an exemplary embodiment, upon completion of step 1608, a tensile force is applied to the inner tubular member 800 that is greater than a desired tensile force that will be applied to the inner tubular member 800 at the end of the method 1600. In an exemplary embodiment, upon completion of step 1608, the inner tubular member 800 experiences the force distribution illustrated in FIG. 16fa, when maximally tensioned, in which a tensile force substantially equal to the sum of the weight $W_P$ coupled to the bulkhead 1604b and the weight $W_O$ of the outer tubular member 1400 is applied to the distal end 1604ca and increases substantially linearly along the inner tubular member 800 to a tensile force substantially equal to the sum of the weight $W_I$ of the inner tubular member 800, the weight $W_P$ coupled to the bulkhead 1604b, and the weight $W_O$ of the outer tubular member 1400 which is applied to the top of the inner tubular member 800 including pulling head 802. In an exemplary embodiment, upon completion of step 1608, the outer tubular member 1400 experiences the force distribution illustrated in FIG. 16fb, in which a compressive force substantially equal to the weight $W_O$ of the outer tubular member 1400 is applied to the distal end 1604cb of the outer tubular member 1400 and decreases substantially linearly along the outer tubular member 1400 to substantially zero force applied at the top end 202e of the outer tubular member 1400. As a result of the increase in the tensile force in the inner tubular member 800 due to step 1608, the inner tubular member 800 increases by a length $\Delta L_9$. As a result of the decrease in the tensile force in the outer tubular member 1400 due to step 1608, the outer tubular member 1400 decreases by a length $\Delta L_{10}$. Due to the coupling of the inner tubular member 800 and the outer tubular member 1400 to the bulkhead 1604b and the changes in length $\Delta L_9$ and $\Delta L_{10}$, the top of the inner tubular member 800 including pulling head 802 is displaced over a distance equal to the sum of $\Delta L_9$ and $\Delta L_{10}$ relative to the top end 202e of outer tubular member 1400.

Referring now to FIGS. 16a and 16g, the method 1600 proceeds to step 1610 where brackets 1502 and 1504 are positioned between inner tubular member collar 106 and outer tubular member collar 1402. Collar engaging surface 1502a on bracket 1502 engages outer tubular member collar 1402 and collar support surface 1502b on bracket 1502 engages inner tubular member collar 106. Collar engaging surface 1504a on bracket 1504 engages outer tubular member collar 1402 and collar support surface 1504b on bracket 1504 engages inner tubular member collar 106. By positioning brackets 1502 and 1504 between inner tubular member collar 106 and outer tubular member collar 1402, inner tubular member 800 is held in position with length E of elongated tubular body 102 extending above collar 106 and out of passageway 202c.

Referring now to FIGS. 16a and 16h, the method 1600 proceeds to step 1612 where the distal portion of inner tubular member 800 including pulling head 802 is removed using conventional methods known in the art such as, for example, machining and/or cutting. Removal of pulling head 802 leaves a distal end 802b adjacent inner tubular member collar 106. Removal of the portion of inner tubular member 800 reduces length E of elongated tubular body 102 extending above inner tubular member collar 106 to a length F of elongated tubular body 102 between the endface of the collar 106 and distal end 802b. A length $\Delta_{EF}$ of the inner tubular member 800 removed is equal to the difference between lengths E and F and is described below in more detail with respect to FIG. 16a and 16ma. In an exemplary embodiment, the length $\Delta_{EF}$ of the inner tubular member 800 removed is such that a predetermined stress distribution in the inner tubular member 800 and a predetermined stress distribution in the outer tubular member 1400 are achieved upon completion of the method 1600. The predetermined stress distributions in the inner tubular member 800 and the outer tubular member 1400 may be influenced by critical points in the double walled pipe 1602a and may include, for example, the desired stresses at particular points in the inner tubular member 800 and the outer tubular member 1400 when the inner tubular member 800 is heated, the desired stresses at particular points in the inner tubular member 800 and the outer tubular member 1400 which will minimize fatigue damage during installation after coupling a bulkhead section to the double walled pipe 1602a, the desired stresses at particular points in the inner tubular member 800 and the outer tubular member 1400 at a riser section between a seabed and a floating production unit in order to minimize fatigue damage during storm conditions, and a variety of others which are known in the art. In an exemplary embodiment, there may be no critical points in the double walled pipe 1602a, and the predetermined stress distribution may include substantially equal stresses in the inner tubular member 800 and the outer tubular member 1400, or substantially equal forces at the distal end of the inner tubular member 800 and the top end of the outer tubular member 1400 upon completion of the method 1600.

Referring now to FIGS. 16a and 16i, the method 1600 proceeds to step 1614 where the coupling member 1000 is positioned in a coaxial relationship with the double-walled pipe 1602a using the pulling device 1200. Coupling device 1204 on pulling device 1200 engages pulling head 1002 on coupling member 1000 and couples the pulling device 1200 to the coupling member 1000. Coupling member 1000 is then positioned with pulling device 1200 such that inner coupling tube 304 is coaxial with inner tubular member 800 and distal end 304a on inner coupling tube 304 is adjacent to distal end 802b on inner tubular member 800.

Referring now to FIGS. 16a and 16j, the method 1600 proceeds to step 1616 where an end of the inner coupling tube 304 is coupled to an end of the inner tubular member 800. Pulling device 1200 is lowered such that distal end 304a of inner coupling tube 304 engages distal end 802b of inner tubular member 800. A coupling 1616a is then provided, securing the end of the inner coupling tube 304 to the end of the inner tubular member 800, and providing a distal end 1616b on inner tubular member 800 adjacent tubular support member 302. In an exemplary embodiment, the coupling 1616a is provided about the circumferences of inner coupling tube 304 and inner tubular member 800. In an exemplary embodiment, the coupling 1616a is a weld. In an exemplary embodiment, the coupling 1616a is a circumferential weld about the circumferences of inner coupling tube 304 and inner tubular member 800.

Referring now to FIGS. 16a and 16k, the method 1600 proceeds to step 1618 where the brackets 1502 and 1504 are removed from between inner tubular member collar 106 and outer tubular member collar 1402. Pulling device 1200 is moved in direction X, allowing the collar engagement surfaces 1502a and 1504a and the collar support surfaces 1502b and 1504b on brackets 1502 and 1504, respectively, to be disengaged from the inner tubular member collar 106 and the outer tubular member collar 1402. The brackets 1502 and 1504 are then removed and the inner tubular member 800 is supported by the pulling device 1200 through the coupling 1616a between the inner tubular member 800 and the coupling member 1000.

Referring now to FIGS. 16b and 16l, the method 1600 proceeds to step 1620 where the inner tubular member 800 and coupling member 1000 are translated in a direction Y relative to the outer tubular member 1400. Pulling device 1200 is moved in direction Y, and due to the engagement of coupling device 1204 and pulling head 1002 and the coupling of coupling member 1000 to inner tubular member 800, inner tubular member 800 is translated in direction Y axially through the passageway 202c on outer tubular member 1400 until distal end 308a on outer coupling tube 308 engages the top end 202e of outer tubular member 1400 including beveled surface 202d.

Referring now to FIGS. 16b, 16m, 16ma, and 16mb, the method 1600 proceeds to step 1622 where the outer coupling tube 308 is coupled to the outer tubular member 1400. A coupling 1622a is provided, securing the outer coupling tube 308 to the outer tubular member 1400, and providing a top end 1622b on the outer tubular member 1400 adjacent the tubular support member 302. In an exemplary embodiment, the coupling 1622a is provided about the circumferences of outer coupling tube 308 and outer tubular member 1400. In an exemplary embodiment, the coupling 1622a is a weld. In an exemplary embodiment, the coupling 1622a is a circumferential weld about the circumferences of outer coupling tube 308 and outer tubular member 1400. In an exemplary embodiment, a tensile force is applied to the distal end 1616b of the inner tubular member 800 which is substantially equal to one half the sum of the weight $W_I$ of the inner tubular member 800, the weight $W_P$ coupled to the bulkhead 1604b, and the weight $W_O$ of the outer tubular member 1400, as illustrated in FIG. 16ma. In an exemplary embodiment, with coupling member 1000 fully engaging outer tubular member 1400, a tensile force is applied to the top end 1622b of the outer tubular member 1400 which is substantially equal to one half the sum of the weight $W_I$ of the inner tubular member 800, the weight $W_P$ coupled to the bulkhead 1604b, and the weight $W_O$ of the outer tubular member 1400, as illustrated in FIG. 16mb.

As illustrated in FIGS. 16m, 16ma, and 16mb, the method 1600 may provide a double walled pipeline made up of sections of double walled pipe 1602a in which the forces applied to the distal end 1616b of the inner tubular member 800 and top end 1622b of the outer tubular member 1400 are substantially equal when the inner tubular member 800 and outer tubular member 1400 are coupled to the bulkhead 1000. A stress $\sigma_i$ in the inner tubular member 800 and a stress $\sigma_o$ in the outer tubular member 1400 depend on a cross sectional area $A_i$ and a cross sectional area $A_o$ of the inner tubular member 800 and the outer tubular member 1400, respectively. In an exemplary embodiment, the stresses $\sigma_o$ and $\sigma_i$ after step 1622 of method 1600 may be determined by the equations:

$$\sigma_o = \frac{\frac{1}{2}(W_o + W_p + W_i)}{A_o} \text{ and } \sigma_i = \frac{\frac{1}{2}(W_o + W_p + W_i)}{A_i}$$

The gradients of the force along the inner tubular member 800 and the outer tubular member 1400 are determined by a weight per unit length $w_i$ and a weight per unit length $w_o$ of the inner tubular member 800 and the outer tubular member 1400, respectively, which are determined by the product of the cross-sectional areas $A_i$ and $A_o$ and a specific weight γ of the material used for the tubular members:

$$w_o = A_o \cdot \gamma$$

$$w_i = A_i \cdot \gamma$$

When the lengths of the inner tubular member 800 and the outer tubular member 1400 are L, the weight $W_o$ of the outer tubular member 1400 is:

$$W_o = w_o \cdot L$$

and the weight $W_i$ of the inner tubular member 800 is:

$$W_i = w_i \cdot L$$

When the cross sectional areas $A_i$ and $A_o$ of the inner tubular member 800 and the outer tubular member 1400 are different, $w_i$ and $w_o$ are different, $W_i$ and $W_o$ are different, and thus the gradient of the force in the outer tubular member 1400 is different from the gradient of the force in the inner tubular member 1400, as illustrated in FIGS. 16*ma* and 16*mb*.

A predetermined stress distribution in the inner tubular member 800 and a predetermined stress distribution in the outer tubular member 1400 may be achieved upon completion of the method 1600 by manipulating the values of the variables $W_o$, $W_p$, $W_i$, $A_i$, $A_o$, $w_i$, $w_o$ and $\gamma$. The predetermined stress distributions in the inner tubular member 800 and the outer tubular member 1400 may be influenced by critical points in the double walled pipe 1602*a* and may include, for example, the desired stresses at particular points in the inner tubular member 800 and the outer tubular member 1400 when the inner tubular member 800 is heated, the desired stresses at particular points in the inner tubular member 800 and the outer tubular member 1400 which will minimize fatigue damage during installation after coupling a bulkhead section to the double walled pipe 1602*a*, the desired stresses at particular points in the inner tubular member 800 and the outer tubular member 1400 at a riser section between a seabed and a floating production unit in order to minimize fatigue damage during storm conditions, and a variety of others which are known in the art. In an exemplary embodiment, there may be no critical points in the double walled pipe 1602*a*, and the predetermined stress distribution may include substantially equal stresses in the inner tubular member 800 and the outer tubular member 1400, or substantially equal forces at the distal end 1616*b* of inner tubular member 800 and the top end 1622*b* of the outer tubular member 1400. In an exemplary embodiment, a critical point may be anywhere along the double walled pipe 1602*a*.

A predetermined stress at any point along the double walled pipe 1602*a* may be achieved by providing a predetermined stress at the top of the double walled pipe 1602*a* which is coupled to the bulkhead 1000. The stresses at the top of the double walled pipe 1602*a* may be chosen by calculating the proper length $\Delta_{EF}$ of the inner tubular member 800 which is removed in step 1612.

As a result of the decrease in tension in the inner tubular member 800 due to step 1622, the inner tubular member 800 decreases by a length $\Delta L_{11}$. As a result of the increase in tension in the outer tubular member 200 due to step 1622, the outer tubular member 200 increases by a length $\Delta L_{12}$.

Referring now to FIGS. 16*fa*, 16*g*, 16*h*, 16*k*, 16*m*, and 16*ma*, in an exemplary embodiment, in order to achieve the predetermined stress distribution between the inner tubular member 800 and the outer tubular member 1400, the length $\Delta_{EF}$ of the inner tubular member 800 which is removed in step 1612 of method 1600 is equal to the difference between the sum of the lengths $\Delta L_9$ and $\Delta L_{10}$ and the sum of the lengths $\Delta L_{11}$ and $\Delta L_{12}$. The sum of the lengths $\Delta L_{11}$ and $\Delta L_{12}$ defines the opening available between the distal end 308*a* of coupling member 1000 and beveled surface 202*d* on outer tubular member 1400 for providing the coupling 1616*a*. In an exemplary embodiment, this opening available between the distal end 308*a* of coupling member 1000 and beveled surface 202*d* on outer tubular member 1400 is large enough for welding and may be approximately 2 feet. The lengths of the inner tubular member 800 and the outer tubular member 1400 should be long enough to generate sufficiently long elastic displacement lengths $\Delta L_{11}$ and $\Delta L_{12}$ in order to ensure the opening available between the distal end 308*a* of coupling member 1000 and beveled surface 202*d* on outer tubular member 1400 is large enough for welding.

Referring now to FIGS. 16*b* and 16*n*, the method 1600 proceeds to step 1624 where the pulling device 1200 is removed from the coupling member 1000. Removal of the pulling device 1200 exposes inner coupling tube 306 and outer coupling tube 310 on coupling member 1000. As a result, distal end 306*a* on inner coupling tube 306 and distal end 310*a* on outer coupling tube 310 may now be used to couple coupling member 1000 and double-walled pipe 1602*a* to, for example, another section of pipeline, a well, a sub-sea manifold, or a pipeline termination. Thus, the method 1600 provides a double-walled pipeline where the inner tubular member 800 and outer tubular member 1400 are directly coupled to the coupling member 1000 while providing predetermined stress distributions in the inner tubular member 800 and outer tubular member 1400. In an exemplary embodiment, the pulling head 1002 may remain on the coupling member 1000 such as when, for example, the coupling member 1000 is the last section of the pipeline. In an exemplary embodiment, the pulling head 1002 may be removed from the coupling member 1000 such as when, for example, another section of double walled pipe is to be added to the coupling member 1000.

Referring now to FIG. 17, a coupled tubular member apparatus 1700 includes a body of water 1702 having a surface 1702*a* and a floor 1702*b*. An offshore vessel 1704 sits on the surface 1702*a* of the body of water 1702 and includes a support device 1704*a* which may be, for example, the hang-off table 500 described above with reference to FIG. 5, or the friction support tool 1100 described above with reference to FIG. 11. A plurality of sections of double-walled pipe 1706*a*, 1706*b*, and 1706*c* extend from support device 1704*a* and are coupled together by a plurality of coupling members 1708*a* and 1708*b*. Double-walled pipe section 1706*c* is coupled to a sub-sea manifold 1710 by a coupling member 1708*c*. A plurality of wells 1712*a*, 1712*b*, and 1712*c* are positioned on the floor 1702*b*. Well 1712*a* is coupled to sub-sea manifold 1710 by a section of double walled pipe 1706*d* by a plurality of coupling members 1708*d* and 1708*e*. Well 1712*b* is coupled to sub-sea manifold 1710 by a section of double walled pipe 1706*e* by a plurality of coupling members 1708*f* and 1708*g*. Well 1712*c* is coupled to sub-sea manifold 1710 by a section of double walled pipe 1706*f* by a plurality of coupling members 1708*h* and 1708*i*. A plurality of double-walled pipe sections 1706*g* and 1706*h* are coupled together by a coupling member 1708*j* and abandoned on the floor 1702*b*. Double walled pipe section 1706*h* is coupled to a pipe termination 1714 by a coupling member 1708*k*. In an exemplary embodiment, the double-walled pipe sections 1706*a*, 1706*b*, 1706*c*, 1706*d*, 1706*e*, 1706*f*, 1706*g*, and 1706*h* may be, for example, the double walled pipes 702*a*, 1302*a*, and 1602*a*. In an exemplary embodiment, the coupling members 1708*a*, 1708*b*, 1708*c*, 1708*d*, 1708*e*, 1708*f*, 1708*g*, 1708*h*, 1708*i*, 1708*j*, and 1708*k* may be, for example, the coupling members 300 and 1000.

A method for manufacturing a double walled pipeline has been described that includes providing a pipeline section including an inner tubular member and an outer tubular member, providing a coupling member, and controlling the stress distribution in the inner tubular member and the outer tubular member by coupling the inner tubular member and the outer tubular member directly to the coupling member. In an exemplary embodiment, the inner tubular member is positioned within and coupled to the outer tubular member. In an exemplary embodiment, the coupling member comprises a support member, an outer coupling tube extending from the support member, and an inner coupling tube extending from the support member and positioned within the outer coupling tube. In an exemplary embodiment, the controlling comprises translating the inner tubular member a predetermined distance relative to the outer tubular member and axially through the outer tubular member in a first direction, removing a predetermined portion of the inner tubular member on a distal end of the inner tubular member, coupling the inner coupling tube directly to the inner tubular member, translating the inner tubular member relative to the outer tubular member and axially through the outer tubular member in a second direction, the second direction opposite the first direction, and coupling the outer coupling tube directly to the outer tubular member. In an exemplary embodiment, the outer tubular member comprises a outer tubular member collar positioned on its outer surface, whereby translation of the inner tubular member relative to the outer tubular member in the first or second direction comprises engaging the outer tubular member collar to hold the outer tubular member stationary. In an exemplary embodiment, the engaging the outer tubular member collar comprises positioning the outer tubular member collar on a hang-off table. In an exemplary embodiment, the inner tubular member comprises a inner tubular member collar positioned on its outer surface, whereby translation of the inner tubular member a predetermined distance comprises holding the inner tubular member stationary at the predetermined distance by engaging the inner tubular member collar and the outer tubular member collar. In an exemplary embodiment, engaging the inner tubular member collar and the outer tubular member collar comprises positioning a bracket between the inner tubular member collar and the outer tubular member collar. In an exemplary embodiment, the inner tubular member comprises a pulling head on the distal end, whereby translation of the inner tubular member relative to the outer tubular member in the first direction comprises engaging the pulling head. In an exemplary embodiment, the removing a predetermined portion of the inner tubular member on a distal end of the inner tubular member comprises removing the pulling head. In an exemplary embodiment, the coupling member comprises a coupling member collar, whereby translation of the inner tubular member relative to the outer tubular member in the second direction comprises engaging the coupling member collar. In an exemplary embodiment, the coupling the inner coupling tube directly to the inner tubular member comprises welding the inner coupling tube directly to the inner tubular member. In an exemplary embodiment, the coupling the inner coupling tube directly to the inner tubular member comprises coupling the circumference of the inner coupling tube directly to the circumference of the inner tubular member. In an exemplary embodiment, the coupling the circumference of the inner coupling tube directly to the circumference of the inner tubular member comprises welding the circumference of the inner coupling tube directly to the circumference of the inner tubular member. In an exemplary embodiment, the coupling the outer coupling tube directly to the outer tubular member comprises welding the outer coupling tube directly to the outer tubular member. In an exemplary embodiment, the coupling the outer coupling tube directly to the outer tubular member comprises coupling the circumference of the outer coupling tube directly to the circumference of the outer tubular member. In an exemplary embodiment, the coupling the circumference of the outer coupling tube directly to the circumference of the outer tubular member comprises welding the circumference of the outer coupling tube directly to the circumference of the outer tubular member. In an exemplary embodiment, translation of the inner tubular member relative to the outer tubular member in the first or second direction comprises engaging the outer tubular member with a friction support tool to hold the outer tubular member stationary. In an exemplary embodiment, the inner tubular member comprises a inner tubular member collar positioned on its outer surface, whereby translation of the inner tubular member a predetermined distance comprises holding the inner tubular member stationary at the predetermined distance by engaging the inner tubular member collar and a distal end of the outer tubular member. In an exemplary embodiment, engaging the inner tubular member collar and a distal end of the outer tubular member comprises positioning a bracket between the inner tubular member collar and the distal end of the outer tubular member. In an exemplary embodiment, the inner tubular member comprises a inner tubular member collar positioned on its outer surface and the outer tubular member comprises an outer tubular member collar positioned on its inner surface, whereby translation of the inner tubular member a predetermined distance comprises holding the inner tubular member stationary at the predetermined distance by engaging the inner tubular member collar and the outer tubular member collar. In an exemplary embodiment, the engaging the inner tubular member collar and the outer tubular member collar comprises positioning a bracket between the inner tubular member collar and the outer tubular member collar. In an exemplary embodiment, the method further comprises beveling a distal end of the outer tubular member. In an exemplary embodiment, removing a predetermined portion of the inner tubular member on a distal end of the inner tubular member comprises removing a length of the inner tubular member such that, upon coupling the inner tubular member to the inner coupling tube and coupling the outer tubular member to the outer coupling tube, a predetermined stress distribution in the inner tubular member and a predetermined stress distribution in the outer tubular member is achieved. In an exemplary embodiment, controlling the stress distribution comprises providing substantially equal forces at the tops of the inner tubular member and the outer tubular member. In an exemplary embodiment, the method further comprises coupling the coupling member to a pipeline. In an exemplary embodiment, the method further comprises coupling the coupling member to a well. In an exemplary embodiment, the method further comprises coupling the coupling member to a sub-sea manifold. In an exemplary embodiment, the method further comprises coupling the coupling member to a pipeline termination.

A double walled pipeline has been described that includes an outer tubular member, an inner tubular member coupled to the outer tubular member and positioned within the outer tubular member, and a coupling member comprising a support member, an outer coupling tube extending from the support member and coupled directly to the outer tubular member, and an inner coupling tube extending from the support member and coupled directly to the inner tubular member, whereby the direct coupling of the outer coupling tube with the outer tubular member and the direct coupling of the inner coupling tube with the inner tubular member provides a predetermined stress distribution in the inner tubular member and a predetermined stress distribution in the outer tubular member. In an exemplary embodiment, the inner tubular member is coupled to the outer tubular member by a plurality of annular spacers positioned between the inner tubular member and the outer tubular member. In an exemplary embodiment, the inner tubular member is coupled to the outer tubular member by an insulating material positioned between the inner tubular member and the outer tubular member. In an exemplary embodiment, the coupling of the inner tubular member to the outer tubular member ensures a predetermined spacing between the inner tubular member and the outer tubular member. In an exemplary embodiment, the coupling member comprises a bulkhead section. In an exemplary embodiment, the support member comprises a bulkhead. In an exemplary embodiment, the outer coupling tube is directly coupled to the outer tubular member about their circumferences. In an exemplary embodiment, the outer coupling tube is directly coupled to the outer tubular member by a weld. In an exemplary embodiment, the inner coupling tube is directly coupled to the inner tubular member about their circumferences. In an exemplary embodiment, the inner coupling tube is directly coupled to the inner tubular member by a weld. In an exemplary embodiment, the outer tubular member comprises a collar positioned on its outer surface. In an exemplary embodiment, the inner tubular member comprises a collar positioned on its outer surface. In an exemplary embodiment, the coupling member comprises a collar positioned on its outer surface. In an exemplary embodiment, the coupling member comprises a pulling head. In an exemplary embodiment, the outer tubular member comprises a collar positioned on its inner surface. In an exemplary embodiment, the coupling member is coupled to a pipeline. In an exemplary embodiment, the coupling member is coupled to a well. In an exemplary embodiment, the coupling member is coupled to a sub-sea manifold. In an exemplary embodiment, the coupling member is coupled to a pipeline termination. In an exemplary embodiment, the predetermined stress distribution in the inner tubular member and the predetermined stress distribution in the outer tubular member include substantially equal forces at the tops of the inner tubular member and the outer tubular member. In an exemplary embodiment, the coupling member comprises means for controlling the stress distributions in the inner tubular member and the outer tubular member.

A pipeline has been described that includes an outer tubular member comprising a collar positioned on its outer surface, an inner tubular member coupled to the outer tubular member and positioned within the outer tubular member, the inner tubular member comprising a collar positioned on its outer surface, and a bulkhead section comprising a bulkhead, a collar positioned on its outer surface, an outer coupling tube extending from the bulkhead and coupled directly to the outer tubular member about their circumferences, and an inner coupling tube extending from the bulkhead and coupled directly to the inner tubular member about their circumferences, whereby the direct coupling of the outer coupling tube with the outer tubular member and the direct coupling of the inner coupling tube with the inner tubular member provides a predetermined stress distribution in the inner tubular member and the outer tubular member.

A pipeline has been described that includes an outer tubular member, an inner tubular member coupled to the outer tubular member and positioned within the outer tubular member, the inner tubular member comprising a collar positioned on its outer surface, and a bulkhead section comprising a bulkhead, a pulling head positioned on a distal end of the bulkhead section, an outer coupling tube extending from the bulkhead and coupled directly to the outer tubular member about their circumferences, and an inner coupling tube extending from the bulkhead and coupled directly to the inner tubular member about their circumferences, whereby the direct coupling of the outer coupling tube with the outer tubular member and the direct coupling of the inner coupling tube with the inner tubular member provides a predetermined stress distribution in the inner tubular member and the outer tubular member.

A pipeline has been described that includes an outer tubular member comprising a collar positioned on its inner surface, an inner tubular member coupled to the outer tubular member and positioned within the outer tubular member, the inner tubular member comprising a collar positioned on its outer surface, and a bulkhead section comprising a bulkhead, a pulling head positioned on a distal end of the bulkhead section, an outer coupling tube extending from the bulkhead and coupled directly to the outer tubular member about their circumferences, and an inner coupling tube extending from the bulkhead and coupled directly to the inner tubular member about their circumferences, whereby the direct coupling of the outer coupling tube with the outer tubular member and the direct coupling of the inner coupling tube with the inner tubular member provides a predetermined stress distribution in the inner tubular member and the outer tubular member.

A double-walled pipe has been described that includes an outer tubular member, and an inner tubular member coupled to the outer tubular member and positioned within the outer tubular member, the inner tubular member comprising a collar positioned on its outer surface and a pulling head coupled to its terminating end. In an exemplary embodiment, the inner tubular member is coupled to the outer tubular member by a plurality of annular spacers positioned between the inner tubular member and the outer tubular member. In an exemplary embodiment, the inner tubular member is coupled to the outer tubular member by an insulating material positioned between the inner tubular member and the outer tubular member. In an exemplary embodiment, the coupling of the inner tubular member to the outer tubular member ensures a predetermined spacing between the inner tubular member and the outer tubular member. In an exemplary embodiment, the outer tubular member comprises a collar positioned on its outer surface. In an exemplary embodiment, the outer tubular member comprising a collar positioned on its inner surface.

A method for manufacturing a double walled pipeline has been described that includes providing a pipeline comprising an outer tubular member and an inner tubular member coupled to the outer tubular member and positioned within the outer tubular member, the outer tubular member comprising a outer tubular member collar positioned on its outer surface, and the inner tubular member comprising a pulling head positioned on its distal end and an inner tubular member collar positioned on its outer surface, providing a bulkhead section comprising a bulkhead, a bulkhead collar positioned on the outer surface of the bulkhead section, an outer coupling tube extending from the bulkhead, and an inner coupling tube extending from the bulkhead and positioned within the outer coupling tube, holding the outer tubular member stationary by engaging the outer tubular member collar, translating the inner tubular member a predetermined distance relative to the outer tubular member and axially through the outer tubular member in a first direction by engaging the pulling head, positioning a bracket between the outer tubular member collar and the inner tubular member collar, removing a predetermined portion of the inner tubular member on the distal end of the inner tubular member, whereby removal of the predetermined portion removes the pulling head from the inner tubular member, welding the inner coupling tube directly to the inner tubular member, removing the bracket from between the outer tubular member collar and the inner tubular member collar, translating the inner tubular member relative to the outer tubular member and axially through the outer tubular member in a second direction by engaging the bulkhead collar, the second direction opposite the first direction, and welding the outer coupling tube directly to the outer tubular member.

A method for manufacturing a double walled pipeline has been described that includes providing a pipeline comprising an outer tubular member and an inner tubular member coupled to the outer tubular member and positioned within the outer tubular member, the inner tubular member comprising an inner tubular member pulling head positioned on its distal end and an inner tubular member collar positioned on its outer surface, providing a bulkhead section comprising a bulkhead, a bulkhead pulling head positioned on its distal end, an outer coupling tube extending from the bulkhead, and an inner coupling tube extending from the bulkhead and positioned within the outer coupling tube, holding the outer tubular member stationary by engaging the outer tubular member with a friction support tool, translating the inner tubular member a predetermined distance relative to the outer tubular member and axially through the outer tubular member in a first direction by engaging the inner tubular member pulling head, positioning a bracket between the inner tubular member collar and a distal end of the outer tubular member, removing a predetermined portion of the inner tubular member on the distal end of the inner tubular member, whereby removal of the predetermined portion removes the inner tubular member pulling head from the inner tubular member, welding the inner coupling tube directly to the inner tubular member, removing the bracket from between the inner tubular member collar and the distal end of the outer tubular member, beveling the distal end of the outer tubular member, translating the inner tubular member relative to the outer tubular member and axially through the outer tubular member in a second direction by engaging the bulkhead pulling head, the second direction opposite the first direction, and welding the outer coupling tube directly to the outer tubular member.

A method for manufacturing a double walled pipeline has been described that includes providing a pipeline comprising an outer tubular member and an inner tubular member coupled to the outer tubular member and positioned within the outer tubular member, the outer tubular member comprising an outer tubular member collar on its inner surface, and the inner tubular member comprising a inner tubular member pulling head positioned on its distal end and an inner tubular member collar positioned on its outer surface, providing a bulkhead section comprising a bulkhead, a bulkhead pulling head positioned on its distal end, an outer coupling tube extending from the bulkhead, and an inner coupling tube extending from the bulkhead and positioned within the outer coupling tube, holding the outer tubular member stationary by engaging the outer tubular member with a friction support tool, translating the inner tubular member a predetermined distance relative to the outer tubular member and axially through the outer tubular member in a first direction by engaging the inner tubular member pulling head, positioning a bracket between the inner tubular member collar and the outer tubular member collar, removing a predetermined portion of the inner tubular member on the distal end of the inner tubular member, whereby removal of the predetermined portion removes the pulling head from the inner tubular member, welding the inner coupling tube directly to the inner tubular member, removing the bracket from between the inner tubular member collar and the outer tubular member collar, translating the inner tubular member relative to the outer tubular member and axially through the outer tubular member in a second direction by engaging the bulkhead pulling head, the second direction opposite the first direction, and welding the outer coupling tube directly to the outer tubular member.

A double walled pipeline has been described that includes a pipeline section comprising an outer tubular member and an inner tubular member, the inner tubular member positioned within and coupled to the outer tubular member, and means coupled to the pipeline section for controlling the stress distribution in the inner tubular member and the outer tubular member. In an exemplary embodiment, the means coupled to the pipeline section for controlling the stress distribution in the inner tubular member and the outer tubular member comprises a means for coupling directly to the inner tubular member and a means for coupling directly to the outer tubular member. In an exemplary embodiment, the means coupled to the pipeline section for controlling the stress distribution in the inner tubular member and the outer tubular member comprises a means for coupling the pipeline section to a second pipeline section. In an exemplary embodiment, the means coupled to the pipeline section for controlling the stress distribution in the inner tubular member and the outer tubular member comprises a means for coupling the pipeline section to a well. In an exemplary embodiment, the means coupled to the pipeline section for controlling the stress distribution in the inner tubular member and the outer tubular member comprises a means for coupling the pipeline section to a sub-sea manifold. In an exemplary embodiment, the means coupled to the pipeline section for controlling the stress distribution in the inner tubular member and the outer tubular member comprises a means for coupling the pipeline section to a pipeline termination.

It is understood that variations may be made in the foregoing without departing from the scope of the invention. Furthermore, the elements and teachings of the various illustrative embodiments may be combined in whole or in part some or all of the illustrative embodiments.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method for manufacturing a double walled pipeline comprising:
    providing a pipeline section including an inner tubular member and an outer tubular member;
    providing a coupling member, wherein the coupling member comprises:
        a support member;
        an outer coupling tube extending from the support member; and
        an inner coupling tube extending from the support member and positioned within the outer coupling tube; and
    controlling stress distribution in the inner tubular member and the outer tubular member, wherein the controlling comprises:
        axially translating a distal end of the inner tubular member a predetermined distance along a first direction relative to the outer tubular member;
        removing a predetermined portion of the inner tubular member;
        coupling the inner coupling tube directly to the inner tubular member;
        axially translating the distal end of the inner tubular member along a second direction relative to the outer tubular member, the second direction opposite the first direction; and
        coupling the outer coupling tube directly to the outer tubular member.

2. The method of claim 1 wherein the outer tubular member comprises an outer tubular member collar positioned on an outer surface of the outer tubular member, whereby translation of the inner tubular member relative to the outer tubular member in the first or second direction comprises engaging the outer tubular member collar to hold the outer tubular member stationary.

3. The method of claim 2 wherein the engaging the outer tubular member collar comprises positioning the outer tubular member collar on a hang-off table.

4. The method of claim 1 wherein the inner tubular member comprises an inner tubular member collar positioned on an outer surface of the inner tubular member, whereby translation of the inner tubular member a predetermined distance comprises holding the inner tubular member stationary at the predetermined distance by engaging the inner tubular member collar and the outer tubular member collar.

5. The method of claim 4 wherein engaging the inner tubular member collar and the outer tubular member collar comprises positioning a bracket between the inner tubular member collar and the outer tubular member collar.

6. The method of claim 1 wherein the inner tubular member comprises a pulling head on the distal end, whereby translation of the inner tubular member relative to the outer tubular member in the first direction comprises engaging the pulling head.

7. The method of claim 1 wherein the removing a predetermined portion of the inner tubular member on a distal end of the inner tubular member comprises removing the pulling head.

8. The method of claim 1 wherein the coupling member comprises a coupling member collar, whereby translation of the inner tubular member relative to the outer tubular member in the second direction comprises engaging the coupling member collar.

9. The method of claim 1 wherein the coupling the inner coupling tube directly to the inner tubular member comprises welding the inner coupling tube directly to the inner tubular member.

10. The method of claim 1 wherein the coupling the inner coupling tube directly to the inner tubular member comprises coupling the circumference of the inner coupling tube directly to the circumference of the inner tubular member.

11. The method of claim 10 wherein the coupling the circumference of the inner coupling tube directly to the circumference of the inner tubular member comprises welding the circumference of the inner coupling tube directly to the circumference of the inner tubular member.

12. The method of claim 1 wherein the coupling the outer coupling tube directly to the outer tubular member comprises welding the outer coupling tube directly to the outer tubular member.

13. The method of claim 1 wherein the coupling the outer coupling tube directly to the outer tubular member comprises coupling the circumference of the outer coupling tube directly to the circumference of the outer tubular member.

14. The method of claim 13 wherein the coupling the circumference of the outer coupling tube directly to the circumference of the outer tubular member comprises welding the circumference of the outer coupling tube directly to the circumference of the outer tubular member.

15. The method of claim 1 wherein translation of the inner tubular member relative to the outer tubular member in the first or second direction comprises engaging the outer tubular member with a friction support tool to hold the outer tubular member stationary.

16. The method of claim 1 wherein the inner tubular member comprises an inner tubular member collar positioned on an outer surface of the inner tubular member, whereby translation of the inner tubular member a predetermined distance comprises holding the inner tubular member stationary at the predetermined distance by engaging the inner tubular member collar and a distal end of the outer tubular member.

17. The method of claim 16 wherein engaging the inner tubular member collar and a distal end of the outer tubular member comprises positioning a bracket between the inner tubular member collar and the distal end of the outer tubular member.

18. The method of claim 1 wherein the inner tubular member comprises an inner tubular member collar positioned on an outer surface of the outer tubular member and the outer tubular member comprises an outer tubular member collar positioned on an inner surface of the outer tubular member, whereby translation of the inner tubular member a predetermined distance comprises holding the inner tubular member stationary at the predetermined distance by engaging the inner tubular member collar and the outer tubular member collar.

19. The method of claim 18 wherein the engaging the inner tubular member collar and the outer tubular member collar comprises positioning a bracket between the inner tubular member collar and the outer tubular member collar.

20. The method of claim 1 further comprising:
beveling a distal end of the outer tubular member.

21. The method of claim 1 wherein removing a predetermined portion of the inner tubular member on a distal end of the inner tubular member comprises removing a length of the inner tubular member such that, upon coupling the inner tubular member to the inner coupling tube and coupling the outer tubular member to the outer coupling tube, a predetermined stress distribution in the inner tubular member and a predetermined stress distribution in the outer tubular member is achieved.

22. A method for manufacturing a double walled pipeline comprising:
providing a pipeline comprising an outer tubular member and an inner tubular member coupled to the outer tubular member and positioned within the outer tubular member, the outer tubular member comprising an outer tubular member collar positioned on an outer surface of the outer tubular member, and the inner tubular member comprising a pulling head positioned on a distal end of the inner tubular member and an inner tubular member collar positioned on an outer surface of the inner tubular member;
providing a bulkhead section comprising a bulkhead, a bulkhead collar positioned on an outer surface of the bulkhead section, an outer coupling tube extending from the bulkhead, and an inner coupling tube extending from the bulkhead and positioned within the outer coupling tube;
holding the outer tubular member stationary by engaging the outer tubular member collar;
axially translating the distal end of the inner tubular member a predetermined distance along a first direction relative to the outer tubular member by engaging the pulling head;
positioning a bracket between the outer tubular member collar and the inner tubular member collar;
removing a predetermined portion of the inner tubular member on the distal end of the inner tubular member, whereby removal of the predetermined portion removes the pulling head from the inner tubular member;
welding the inner coupling tube directly to the inner tubular member;
removing the bracket from between the outer tubular member collar and the inner tubular member collar;

axially translating the distal end of the inner tubular member along a second direction relative to the outer tubular member by engaging the bulkhead collar, the second direction opposite the first direction; and welding the outer coupling tube directly to the outer tubular member.

23. A method for manufacturing a double walled pipeline comprising:

providing a pipeline comprising an outer tubular member and an inner tubular member coupled to the outer tubular member and positioned within the outer tubular member, the inner tubular member comprising an inner tubular member pulling head positioned on a distal end of the inner tubular member and an inner tubular member collar positioned on an outer surface of the inner tubular member;

providing a bulkhead section comprising a bulkhead, a bulkhead pulling head positioned on a distal end of the bulkhead, an outer coupling tube extending from the bulkhead, and an inner coupling tube extending from the bulkhead and positioned within the outer coupling tube;

holding the outer tubular member stationary by engaging the outer tubular member with a friction support tool;

axially translating the distal end of the inner tubular member a predetermined distance along a first direction relative to the outer tubular member by engaging the inner tubular member pulling head;

positioning a bracket between the inner tubular member collar and a distal end of the outer tubular member;

removing a predetermined portion of the inner tubular member on the distal end of the inner tubular member, whereby removal of the predetermined portion removes the inner tubular member pulling head from the inner tubular member;

welding the inner coupling tube directly to the inner tubular member;

removing the bracket from between the inner tubular member collar and the distal end of the outer tubular member;

beveling the distal end of the outer tubular member;

axially translating the distal end of the inner tubular member along a second direction relative to the outer tubular member by engaging the bulkhead pulling head, the second direction opposite the first direction; and welding the outer coupling tube directly to the outer tubular member.

24. A method for manufacturing a double walled pipeline comprising:

providing a pipeline comprising an outer tubular member and an inner tubular member coupled to the outer tubular member and positioned within the outer tubular member, the outer tubular member comprising an outer tubular member collar on an inner surface of the outer tubular member, and the inner tubular member comprising an inner tubular member pulling head positioned on a distal end of the inner tubular member and an inner tubular member collar positioned on an outer surface of the inner tubular member;

providing a bulkhead section comprising a bulkhead, a bulkhead pulling head positioned on a distal end of the bulkhead, an outer coupling tube extending from the bulkhead, and an inner coupling tube extending from the bulkhead and positioned within the outer coupling tube;

holding the outer tubular member stationary by engaging the outer tubular member with a friction support tool;

axially translating the distal end of the inner tubular member a predetermined distance along a first direction relative to the outer tubular member by engaging the inner tubular member pulling head;

positioning a bracket between the inner tubular member collar and the outer tubular member collar;

removing a predetermined portion of the inner tubular member on the distal end of the inner tubular member, whereby removal of the predetermined portion removes the pulling head from the inner tubular member;

welding the inner coupling tube directly to the inner tubular member;

removing the bracket from between the inner tubular member collar and the outer tubular member collar;

axially translating the distal end of the inner tubular member along a second direction relative to the outer tubular member by engaging the bulkhead pulling head, the second direction opposite the first direction; and welding the outer coupling tube directly to the outer tubular member.

\* \* \* \* \*